(12) United States Patent
Kim

(10) Patent No.: US 12,150,196 B2
(45) Date of Patent: *Nov. 19, 2024

(54) METHOD AND APPARATUS FOR REDUCING OVERHEAD OF ETHERNET FRAME IN NEXT GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,239

(22) Filed: May 30, 2023

(65) Prior Publication Data

US 2023/0309173 A1    Sep. 28, 2023

Related U.S. Application Data

(63) Continuation of application No. 16/669,042, filed on Oct. 30, 2019, now Pat. No. 11,665,766.

(30) Foreign Application Priority Data

Oct. 30, 2018   (KR) ........................ 10-2018-0131296
Nov. 16, 2018   (KR) ........................ 10-2018-0141859
Mar. 4, 2019    (KR) ........................ 10-2019-0024881

(51) Int. Cl.
*H04W 76/19*     (2018.01)
*H04W 28/06*     (2009.01)
(Continued)

(52) U.S. Cl.
CPC ........... *H04W 76/19* (2018.02); *H04W 28/06* (2013.01); *H04W 76/27* (2018.02); *H04W 76/36* (2018.02); *H04W 80/02* (2013.01); *H04W 80/08* (2013.01)

(58) Field of Classification Search
CPC ..... H04W 76/19; H04W 76/27; H04W 76/36; H04W 80/02; H04W 28/06; H04W 80/08; H04W 4/70
See application file for complete search history.

(56) References Cited

U.S. PATENT DOCUMENTS

2008/0123655 A1   5/2008   Kim et al.
2009/0103478 A1   4/2009   Sammour et al.
(Continued)

FOREIGN PATENT DOCUMENTS

CN   101965705 A   2/2011
CN   104272671 A   1/2015
(Continued)

OTHER PUBLICATIONS

The European Search Report dated Nov. 9, 2023, in connection with European Patent Application No. 23187598.0, 11 pages.
(Continued)

*Primary Examiner* — Yu-Wen Chang

(57) ABSTRACT

The disclosure relates to a communication method and system for converging a 5$^{th}$-Generation (5G) communication system for supporting higher data rates beyond a 4$^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure discloses a method and apparatus for reducing overhead of an Ethernet frame, a method and apparatus for
(Continued)

efficiently performing a connection resume procedure of a terminal, and a method and apparatus for preventing a loss of data when performing an uplink user data compression procedure.

20 Claims, 33 Drawing Sheets

(51) Int. Cl.
*H04W 76/27* (2018.01)
*H04W 76/36* (2018.01)
*H04W 80/02* (2009.01)
*H04W 80/08* (2009.01)

(56) References Cited

U.S. PATENT DOCUMENTS

| | | |
|---|---|---|
| 2012/0201228 A1 | 8/2012 | Wu |
| 2013/0148490 A1 | 6/2013 | Yi et al. |
| 2013/0301611 A1 | 11/2013 | Baghel et al. |
| 2015/0215987 A1 | 7/2015 | Kim et al. |
| 2017/0215225 A1 | 7/2017 | Yi et al. |
| 2018/0070227 A1 | 3/2018 | Wang et al. |
| 2019/0053098 A1 | 2/2019 | Jo et al. |
| 2019/0075613 A1 | 3/2019 | Teyeb et al. |
| 2019/0090156 A1 | 3/2019 | Kim et al. |
| 2019/0124710 A1* | 4/2019 | Stattin .................. H04W 76/27 |
| 2019/0320316 A1 | 10/2019 | Mildh et al. |
| 2019/0349810 A1 | 11/2019 | Cho et al. |
| 2020/0037151 A1 | 1/2020 | Du et al. |
| 2020/0169912 A1 | 5/2020 | Chang et al. |
| 2023/0319630 A1* | 10/2023 | Kanamarlapudi .... H04W 28/02 370/235 |

FOREIGN PATENT DOCUMENTS

| | | |
|---|---|---|
| CN | 106134099 A | 11/2016 |
| KR | 10-2019-0032167 A | 3/2019 |
| WO | 2017/119377 A1 | 7/2017 |
| WO | 2018050958 A1 | 3/2018 |

OTHER PUBLICATIONS

Ericsson, "PDCP handling of RRC suspend", 3GPP TSG-RAN WG2 #103bis, Oct. 8-12, 2018, Tdoc R2-1814772, 3 pages.
LG Electronics Inc., "Introducing PDCP suspend procedure", 3GPP TSG-RAN WG2 #103bis, Oct. 8-12, 2018, R2-1815130, 4 pages.
"3rd Generation Partnership Project; Technical Specification Group Radio Access Network; NR; Packet Data Convergence Protocol (PDCP) specification (Release 15)", 3GPP TS 38.323 V15.3.0 (Sep. 2018), 26 pages.
LG Electronics Inc., "Open issues in PDCP suspend procedure", 3GPP TSG-RAN WG2 #103bis, Oct. 8-12, 2018, R2-1815129, 3 pages.
International Search Report dated Feb. 11, 2020 in connection with International Patent Application No. PCT/KR2019/014450, 3 pages.
Written Opinion of the International Searching Authority dated Feb. 11, 2020 in connection with International Patent Application No. PCT/KR2019/014450, 4 pages.
Supplementary European Search Report dated Jun. 8, 2021 in connection with European Patent Application No. 19 87 8583, 8 pages.
5G; NR; Packet Data Convergence Protocol (PDCP) specification (3GPP TS 38.323 version 15.2.0 Release 15) (Sep. 2018), 28 pages.
5G; NR; Radio Resource Control (RRC); Protocol specification (3GPP TS 38.331 version 15.3.0 Release 15) (Oct. 2018), 441 pages.
Intellectual Property India, "Examination report under sections 12&13 of the Patents Act," dated Oct. 12, 2022, in connection with Indian Patent Application No. 202137016334, 6 pages.
China National Intellectual Property Administration, "The First Office Action," issued Nov. 3, 2022, in connection with Chinese Patent Application No. 201980072460.6, 20 pages.
Office Action dated Mar. 4, 2024, in connection with Korean Patent Application No. 10-2019-0024881, 9 pages.

* cited by examiner

METHOD AND APPARATUS FOR REDUCING OVERHEAD OF ETHERNET FRAME IN NEXT GENERATION MOBILE COMMUNICATION SYSTEM

CROSS-REFERENCE TO RELATED APPLICATIONS

This application is a continuation of U.S. patent application Ser. No. 16/669,042 filed on Oct. 30, 2019, which is based on and claims priority under 35 U.S.C. § 119 to Korean Patent Application No. 10-2018-0131296 filed on Oct. 30, 2018, Korean Patent Application No. 10-2018-0141859 filed on Nov. 16, 2018, and Korean Patent Application No. 10-2019-0024881 filed on Mar. 4, 2019 in the Korean Intellectual Property Office, the disclosures of which are herein incorporated by reference herein in their entirety.

BACKGROUND

1. Field

The disclosure relates to next-generation wireless communication. Specifically, the disclosure relates to a method and apparatus for reducing overhead of an Ethernet frame for supporting a high-reliability and low-latency terminal in a next-generation communication system. Furthermore, the disclosure relates to a method and apparatus for efficiently performing a connection resume procedure of a terminal in a wireless communication system. Furthermore, the disclosure relates to a method and apparatus for preventing a loss of data when performing an uplink user data compression procedure in a wireless communication system.

2. Description of Related Art

To meet the needs for increased wireless data traffic since the deployment of 4G communication systems, efforts have been made to develop an enhanced 5G or pre-5G communication system. Therefore, the 5G or pre-5G communication system is also called a "Beyond 4G Network" or a "Post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. The application of a cloud radio access network (RAN) as the big data processing technology may also be considered to be as an example of the convergence of the 5G technology and the IoT technology.

In next-generation communication systems, needs for various improvements of an Ethernet protocol are growing daily.

SUMMARY

In a next-generation mobile communication system, it is necessary to efficiently use a transmission resource in order to support services (e.g., ultra reliable low latency communication (URLLC) or industrial IoT (IIoT) service) having low transmission latency and high reliability. Furthermore, an event to suspend the bearer or protocol layer apparatuses (e.g., service data adaptation protocol (SDAP)) layer apparatus or packet data convergence protocol (PDCP) layer apparatus or radio link control (RLC) layer apparatus or medium access control (MAC) layer apparatus or physical (PHY) layer apparatus) of a terminal in a next-generation mobile communication system.

Specifically, if a terminal changes a mode to a radio resource control (RRC) inactive mode in response to an instruction from a network, the terminal needs to efficiently handle the bearer or protocol layer apparatuses suitably for the instruction from the network. However, the terminal needs to differently handle the bearer or protocol layer apparatuses depending on whether the terminal is a terminal supporting common services or a terminal using a narrow band and supporting limited services. Accordingly, a network needs to instruct different terminals (narrowband (NB)-IoT terminals or common terminals) to change their modes to an RRC suspension mode or an RRC inactive mode or an RRC idle mode through different indicators and to instruct a corresponding protocol processing procedure.

In addition, in a wireless communication system, downlink can secure more transmission resources because it uses a high frequency band and wide bandwidth. Furthermore, a base station can obtain a beamforming gain and high signal intensity because more antennas can be installed in the base station physically. Accordingly, the base station can transmit data to a terminal through the downlink by carrying more data on the same frequency/time resource. In the case of uplink, however, an uplink transmission resource may experience a bottleneck phenomenon compared to a downlink transmission resource because a terminal physically has a small size and it is difficult for a high frequency band and wide bandwidth to be used for an uplink frequency. Furthermore, there is a problem in that coverage is reduced upon uplink data transmission because maximum transmission power of a terminal is much smaller than that of a base station. Accordingly, it is necessary to efficiently use a transmission resource by compressing uplink data.

A method of compressing uplink data is a method of sequentially performing data compression based on previous data. Accordingly, if one of a series of compressed data is lost or discarded or the decompression of data fails halfway, data decompression for all data after the lost or discarded data or data whose decompression has failed.

A transmission stage PDCP layer apparatus may drive a PDCP discard timer for each datum whenever data is received from a higher layer apparatus, may perform an uplink compression procedure if an uplink compression procedure has been configured, may configure a user data compression (UDC) header, may perform ciphering on data (other than UDC header) on which the uplink data compression has been performed, may assign a PDCP serial number, and may generate a PDCP PDU by configuring a PDCP header. In the above description, when the PDCP discard timer expires, the PDCP layer apparatus discards data corresponding to the timer by considering that the data is no longer valid.

Accordingly, if a transmission PDCP layer apparatus discards previously generated data (e.g., PDCP protocol data unit (PDU)) due to the expiration of a PDCP discard timer, any data of a series of compressed data is discarded. As a result, a consecutive uplink data decompression failure phenomenon may occur in a reception PDCP layer apparatus due to the discard or loss of compressed data halfway.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3O illustrates a diagram of a terminal operation proposed in an embodiment of the disclosure.

DETAILED DESCRIPTION

Figure 1A:
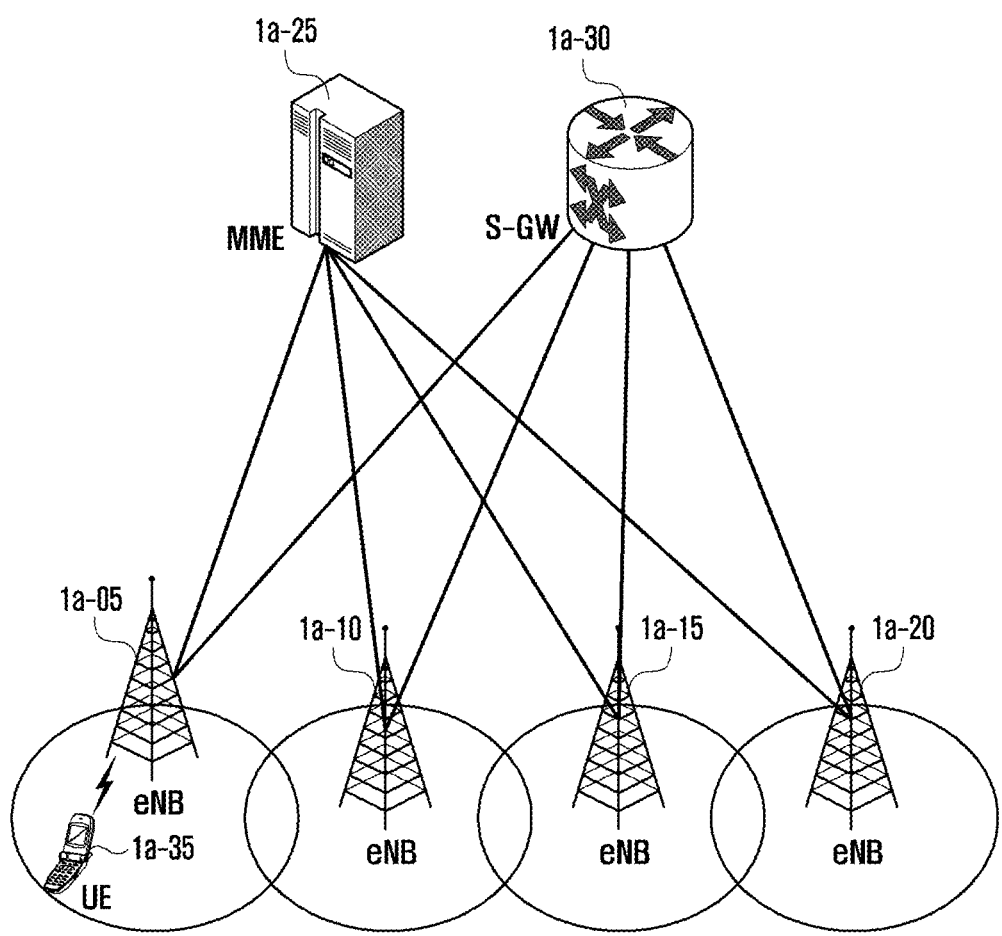
FIG. 1A illustrates a diagram of the configuration of an LTE system related to an embodiment of the disclosure.

FIGS. 1A through 3P, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described in detail with reference to the accompanying drawings. It is to be noted that the same reference numbers are used throughout the drawings to refer to the same elements. Furthermore, a detailed description of known functions or constructions that may make the gist of the disclosure vague is omitted.

In this specification, in describing embodiments, a description of contents that are well known in the art to which the disclosure pertains and not directly related to the disclosure is omitted in order to make the gist of the disclosure clearer. For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as an FPGA or an ASIC, and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

Hereinafter, a base station is the subject that performs resource assignment to a terminal, and may be at least one of a gNode B (gNB), an eNode B (eNB), a Node B, a base station (BS), a radio access unit, a base station controller or a node on a network. A terminal may include a user equipment (UE), a mobile station (MS), a cellular phone, a smartphone, a computer or a multimedia system capable of performing a communication function, but is not limited to the examples.

In the disclosure, a transmission stage is an apparatus for transmitting data, and may include a base station, a terminal, a network entity and a transmission PDCP layer apparatus. Furthermore, in the disclosure, a reception stage is an apparatus for receiving data, and may include a base station, a terminal, a network entity and a reception PDCP layer apparatus.

Hereinafter, for convenience of description, in embodiments of the disclosure, terms and names defined in the 3$^{rd}$ generation partnership project long term evolution (3GPP LTE) standard or terms and names modified from the defined terms and names are used. However, the disclosure is not limited to the terms and names and may be identically applied to systems based on other standards. In one embodiment of the disclosure, an eNB may be interchangeably used with a gNB for convenience of description. That is, a base station described as an eNB may indicate a gNB.

First Embodiment

FIG. 1A illustrates a diagram of the configuration of an LTE system related to an embodiment of the disclosure.

Referring to FIG. 1A, the radio access network of the LTE system includes next-generation evolved Node Bs (hereinafter referred to as "ENBs", "Node Bs" or "base stations") 1a-05, 1a-10, 1a-15, and 1a-20, a mobility management entity (MME) 1a-25, and a serving-gate (S-GW) 1a-30. A user equipment (hereinafter referred to as a "UE" or "terminal") 1a-35 accesses an external network through the ENBs 1a-05~1a-20 and the S-GW 1a-30.

In FIG. 1A, the ENBs 1a-05~1a-20 correspond to the Node Bs of the existing UMTS system. The ENB is connected to the UE 1a-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, is necessary. The ENBs 1a-05~1a-20 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 1a-30 provides a data bearer and generates or removes a data bearer under the control of the MME 1a-25. The MME is in charge of various control functions in addition to a mobility management function for a UE, and is connected to multiple ENBs.

Figure 1B:
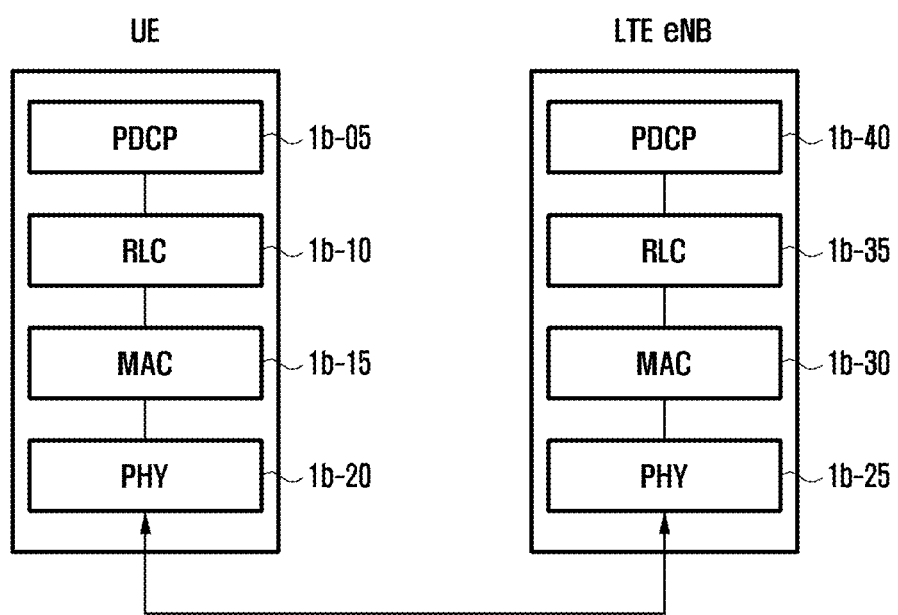
FIG. 1B illustrates a diagram of a radio protocol structure in an LTE system related to an embodiment of the disclosure.

FIG. 1B illustrates a diagram of a radio protocol structure in an LTE system related to an embodiment of the disclosure.

Referring to FIG. 1B, the radio protocol of the LTE system includes packet data convergence protocols (PDCPs) 1b-05 and 1b-40, radio link control (RLC) 1b-10 and 1b-35, and medium access control (MAC) 1b-15 and 1b-30 in a UE and an ENB, respectively. The PDCPs 1b-05 and 1b-40 are in charge of an operation, such as IP header compression/restoration. Major functions of the PDCP 1b-05, 1b-40 are summarized as follows.

A header compression and decompression function (Header compression and decompression: ROHC only)

A user data transmission function (Transfer of user data)

An in-sequence delivery function (In-sequence delivery of upper layer PDUs at PDCP re-establishment procedure for RLC AM)

A sequence reordering function (For split bearers in DC (only support for RLC AM): PDCP PDU routing for transmission and PDCP PDU reordering for reception)

A duplicate detection function (Duplicate detection of lower layer SDUs at PDCP re-establishment procedure for RLC AM)

A retransmission function (Retransmission of PDCP SDUs at handover and, for split bearers in DC, of PDCP PDUs at PDCP data-recovery procedure, for RLC AM)

An ciphering and deciphering function (Ciphering and deciphering)

A timer-based SDU discard function (Timer-based SDU discard in uplink.)

The RLC 1b-10, 1b-35 reconfigures a PDCP packet data unit (PDU) in a proper size and performs an ARQ operation. Major functions of the RLC are summarized as follows.

A data transmission function (Transfer of upper layer PDUs)

An ARQ function (Error Correction through ARQ (only for AM data transfer))

A concatenation, segmentation and reassembly function (Concatenation, segmentation and reassembly of RLC SDUs (only for UM and AM data transfer))

A re-segmentation function (Re-segmentation of RLC data PDUs (only for AM data transfer))

A sequence reordering function (Reordering of RLC data PDUs (only for UM and AM data transfer)

A duplicate detection function (Duplicate detection (only for UM and AM data transfer))

An error detection function (Protocol error detection (only for AM data transfer))

An RLC SDU discard function (RLC SDU discard (only for UM and AM data transfer))

An RLC re-establishment function (RLC re-establishment)

The MAC 1b-15, 1b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

A mapping function (Mapping between logical channels and transport channels)

A multiplexing/demultiplexing function (Multiplexing/demultiplexing of MAC SDUs belonging to one or different logical channels into/from transport blocks (TB) delivered to/from the physical layer on transport channels)

A scheduling information reporting function (Scheduling information reporting)

An HARQ function (Error correction through HARQ)

An inter-logical channel priority handling function (Priority handling between logical channels of one UE)

An inter-UEs priority handling function (Priority handling between UEs by means of dynamic scheduling)

An MBMS service identification function (MBMS service identification)

A transport format selection function (Transport format selection)

A padding function (Padding)

A physical layer 1b-20, 1b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 1C:
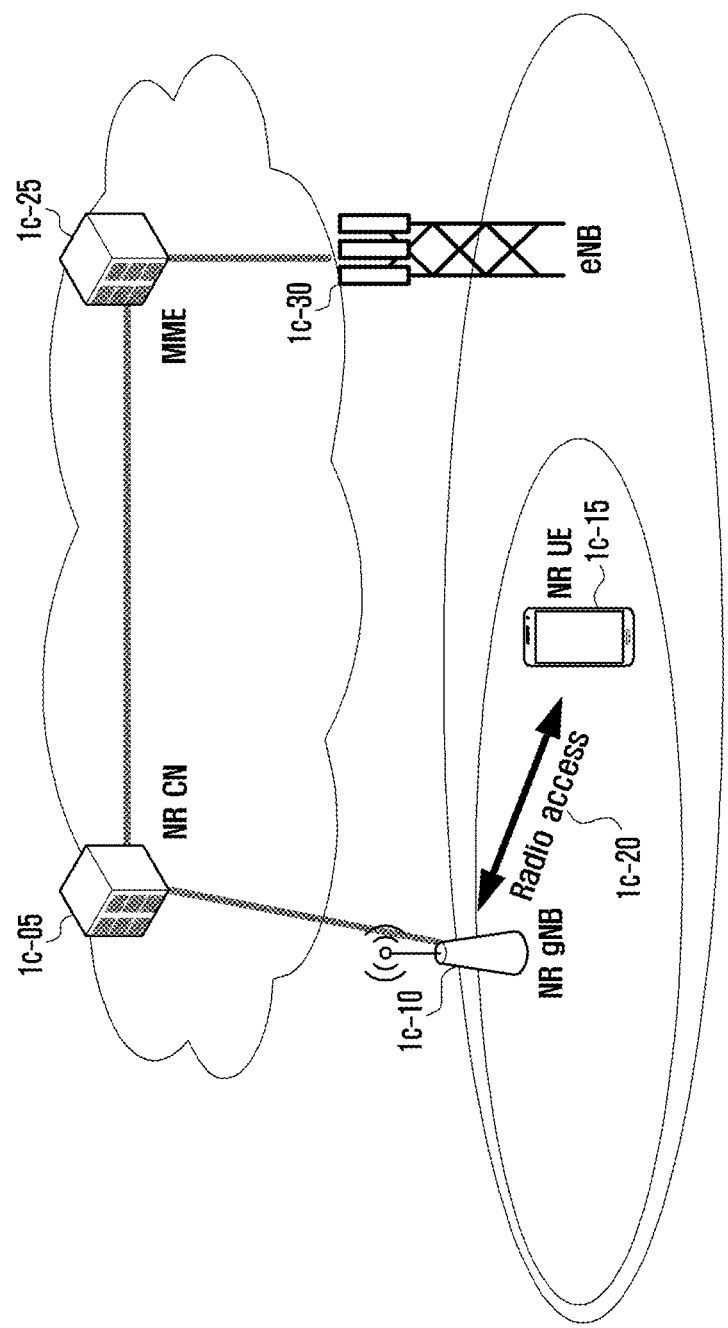
FIG. 1C illustrates a diagram of the configuration of a next-generation mobile communication system related to an embodiment of the disclosure.

FIG. 1C illustrates a diagram of the configuration of a next-generation mobile communication system related to an embodiment of the disclosure.

Referring to FIG. 1C, the radio access network of a next-generation mobile communication system (hereinafter referred to as an "NR" or "5G") includes a new radio Node B (hereinafter referred to as an "NR gNB" or an "NR base station") 1c-10 and a new radio core network (NR CN) 1c-05. A new radio user equipment (hereinafter referred to as an "NR UE" or a "terminal") 1c-15 accesses an external network through the NR gNB 1c-10 and the NR CN 1c-05.

In FIG. 1C, the NR gNB 1c-10 corresponds to an evolved Node B (ENB) of the existing LTE system. The NR gNB is connected to the NR UE 1c-15 through a radio channel, and may provide an excellent service compared to the existing Node B. The NR requires a device for performing scheduling by collecting state information, such as the buffer state, available transmission power state, and channel state of UEs, because all of types of user traffic are served through a shared channel. The NR gNB 1c-10 is in charge of the device. In general, one NR gNB controls multiple cells. In order to implement ultra-high speed data transfer compared to the existing LTE, the NR may have the existing maximum bandwidth or more and may additionally graft the beam-forming technology using OFDM as a radio access technology. Furthermore, the NR adopts the AMC scheme that determines a modulation scheme and a channel coding rate based on the channel state of a UE. The NR CN 1c-05 performs functions, such as mobility support, a bearer setup, and a QoS configuration. The NR CN 1c-05 is in charge of various control functions in addition to a mobility management function for a UE, and is connected to multiple ENBs. Furthermore, the NR may also operate in conjunction with the existing LTE system. The NR CN is connected to an MME 1c-25 through a network interface. The MME is connected to an ENB 1c-30, that is, the existing ENB.

Figure 1D:
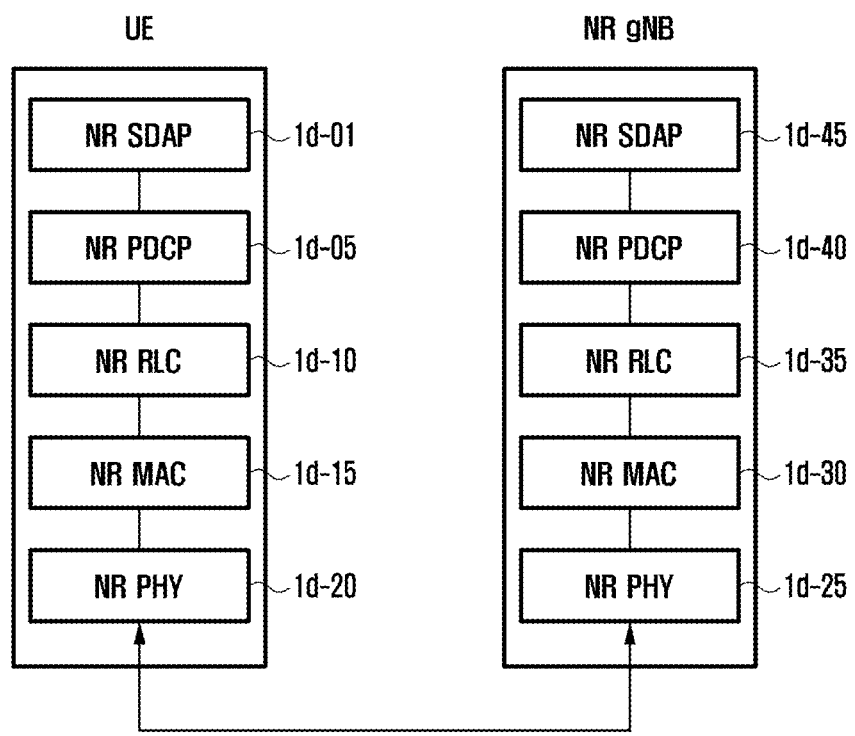
FIG. 1D illustrates a diagram of a radio protocol structure of a next-generation mobile communication system related to an embodiment of the disclosure.

FIG. 1D illustrates a diagram of a radio protocol structure of a next-generation mobile communication system to which an embodiment of the disclosure may be applied.

Referring to FIG. 1D, the radio protocol of the NR includes NR SDAPs 1d-01 and 1d-45, NR PDCPs 1d-05 and 1d-40, NR RLC 1d-10 and 1d-35, and NR MAC 1d-15 and 1d-30, respectively, in a UE and an NR base station.

Major functions of the NR SDAPs 1d-01 and 1d-45 may include some of the following functions.

A function for transferring user data (transfer of user plane data)

A mapping function of a QoS flow and data bearer for both uplink and downlink (mapping between a QoS flow and a DRB for both DL and UL)

A marking function of a QoS flow ID for both uplink and downlink (marking QoS flow ID in both DL and UL packets)

A function of mapping a reflective QoS flow to a data bearer with respect to uplink SDAP PDUs (reflective QoS flow to the DRB mapping for the UL SDAP PDUs).

Whether to use the header of the SDAP layer apparatus or whether to use a function of the SDAP layer apparatus may be configured in a terminal for each PDCP layer apparatus or for each bearer or for each logical channel through an RRC message with respect to the SDAP layer apparatus. If an SDAP header has been configured, an indication may be performed so that the terminal update or reconfigure mapping information for QoS flow and data bearer for uplink and downlink based on the NAS QoS reflective setting 1-bit indicator (NAS reflective QoS) and AS QoS reflective setting 1-bit indicator (AS reflective QoS) of the SDAP header. The SDAP header may include QoS flow ID information indicative of QoS. The QoS information may be used as data processing priority or scheduling information for supporting smooth services.

Major functions of the NR PDCP 1d-05, 1d-40 may include some of the following functions.

A header compression and decompression function (Header compression and decompression: ROHC only)

A user data transmission function (Transfer of user data)

An in-sequence delivery function (In-sequence delivery of upper layer PDUs)

An out-of-sequence delivery function (Out-of-sequence delivery of upper layer PDUs)

A sequence reordering function (PDCP PDU reordering for reception)

A duplicate detection function (Duplicate detection of lower layer SDUs)

A retransmission function (Retransmission of PDCP SDUs)

A ciphering and deciphering function (Ciphering and deciphering)

A timer-based SDU discard function (Timer-based SDU discard in uplink.)

In the above description, the reordering function of the NR PDCP entity refers to a function of sequentially reordering PDCP PDUs received from a lower layer based on a PDCP sequence number (SN). The reordering function may include a function of transmitting data to a higher layer in a reordered sequence, a function of directly transmitting data to a higher layer without taking the sequence into consideration, a function of reordering the sequence and recording lost PDCP PDUs, a function of making a status report on lost PDCP PDUs to the transmission side, and a function of requesting the retransmission of lost PDCP PDUs.

Major functions of the NR RLC 1d-10, 1d-35 may include some of the following functions.

A data transmission function (Transfer of upper layer PDUs)

An in-sequence delivery function (In-sequence delivery of upper layer PDUs)

An out-of-sequence delivery function (Out-of-sequence delivery of upper layer PDUs)

ARQ function (Error Correction through ARQ)

A concatenation, segmentation and reassembly function (Concatenation, segmentation and reassembly of RLC SDUs)

A re-segmentation function (Re-segmentation of RLC data PDUs)

A sequence reordering function (Reordering of RLC data PDUs)

A duplicate detection function (Duplicate detection)

An error detection function (Protocol error detection)

An RLC SDU discard function (RLC SDU discard)

An RLC re-establishment function (RLC re-establishment)

In the above description, the in-sequence delivery function of the NR RLC entity refers to a function of transmitting RLC SDUs received from a lower layer to a higher layer in sequence, and may include a function of reassembling and transmitting multiple RLC SDUs if one RLC SDU has been originally segmented into the multiple RLC SDUs and received. The in-sequence delivery function may include a function of reordering received RLC PDUs based on an RLC SN (SN) or a PDCP SN, a function of reordering the sequence and recording lost RLC PDUs, a function of transmitting a status report on lost RLC PDUs to the transmission side, a function of requesting the retransmission of lost RLC PDUs, and a function of transmitting only RLC SDUs prior to a lost RLC SDU to a higher layer in sequence if a lost RLC SDU is present or a function of transmitting all of RLC SDUs received before a given timer expires to a higher layer in sequence when the timer expires although there is a lost RLC SDU or a function of transmitting all of RLC SDUs received so far to a higher layer when a given timer expires although there is a lost RLC SDU. Furthermore, the in-sequence delivery function may include a function of processing RLC PDUs in the sequence that they are received (in order of arrival regardless of the sequence of a sequence number) and transmitting the RLC PDUs to a PDCP entity regardless of their sequence (i.e., out-of sequence delivery). The in-sequence delivery function may include a function of receiving segments placed in a buffer or segments to be received subsequently, reconfiguring the segments into one complete RLC PDU, processing the RLC PDU, and transmitting the RLC PDU to the PDCP entity. The NR RLC layer may not include a concatenation function. The concatenation function may be performed by the NR MAC layer or may be substituted with the multiplexing function of the NR MAC layer.

In the above description, the out-of-sequence delivery function of the NR RLC entity refers to a function of directly transmitting RLC SDUs received from a lower layer to a higher layer regardless of their sequence. The out-of-sequence delivery function may include a function of reassembling multiple RLC SDUs if one RLC SDU has been originally segmented into the multiple RLC SDUs and received. The out-of-sequence delivery function may include a function of storing the RLC SN or PDCP SN of received RLC PDUs, reordering their sequence, and recording lost RLC PDUs.

The NR MAC 1d-15, 1d-30 may be connected to multiple NR RLC layer devices configured in one UE. Major functions of the NR MAC may include some of the following functions.

A mapping function (Mapping between logical channels and transport channels)

A multiplexing/demultiplexing function (Multiplexing/demultiplexing of MAC SDUs)

A scheduling information reporting function (Scheduling information reporting)

An HARQ function (Error correction through HARQ)

An inter-logical channel priority handling function (Priority handling between logical channels of one UE)

An inter-UEs priority handling function (Priority handling between UEs by means of dynamic scheduling)

An MBMS service identification function (MBMS service identification)

A transport format selection function (Transport format selection)

A padding function (Padding)

The NR PHY layer 1d-20, 1d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

The disclosure proposes a method of performing compression and decompression on an Ethernet header when using an Ethernet protocol in a next-generation mobile communication system.

Figure 1E:
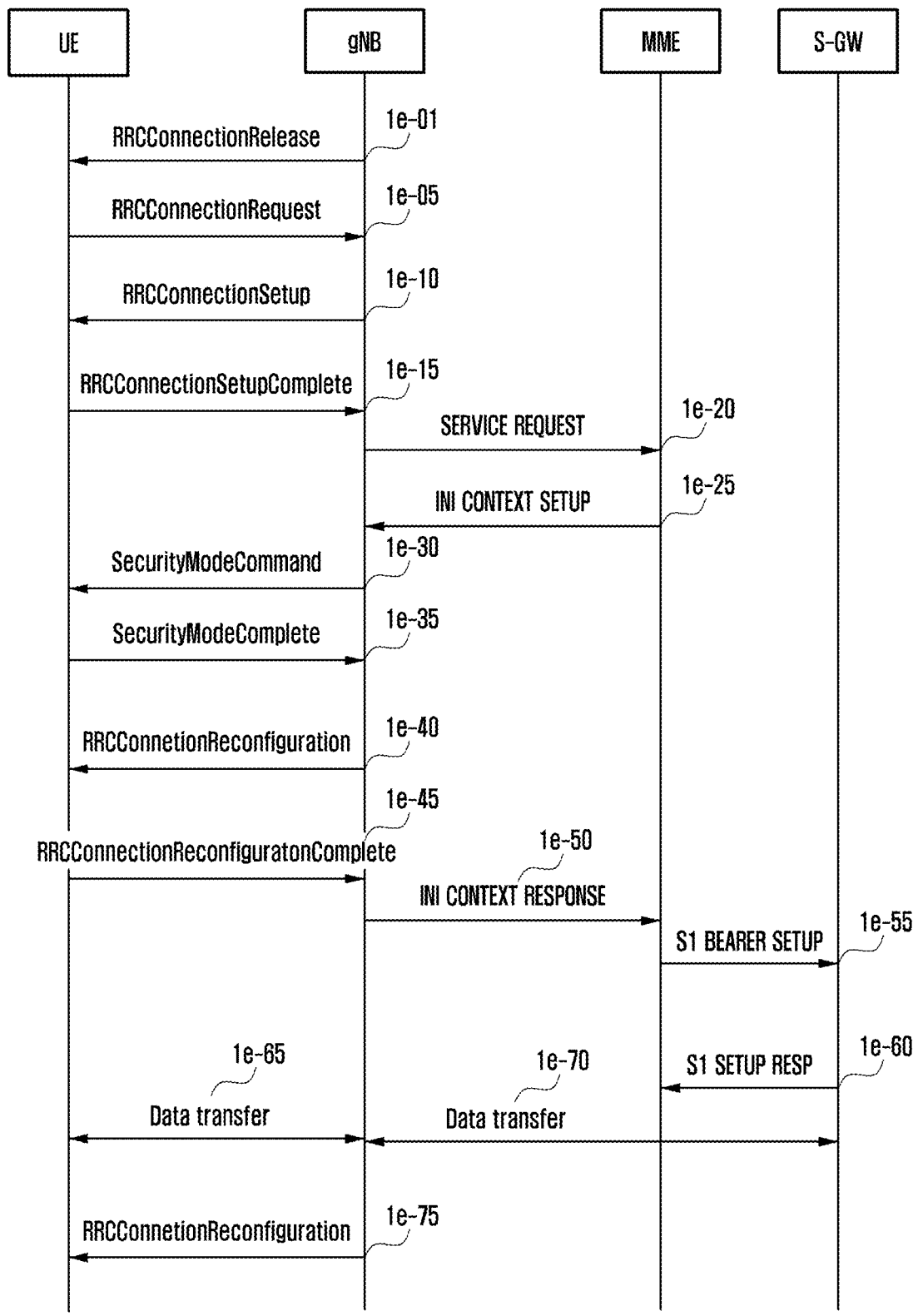
FIG. 1E illustrates a diagram of a procedure for a base station to configure Ethernet header protocol-related configuration information in a terminal when the terminal sets up a connection with a network in relation to an embodiment of the disclosure.

FIG. 1E illustrates a diagram of a procedure for a base station to configure Ethernet header protocol-related configuration information in a terminal when the terminal sets up a connection with a network in relation to an embodiment of the disclosure.

FIG. 1E illustrates a procedure for a terminal to switch from an RRC idle mode or RC inactive mode (or lightly-connected mode) to an RRC connected mode and to set up a connection with a network in the disclosure, and illustrates a procedure for a base station to configure Ethernet protocol-related configuration information in a terminal.

Specifically, a base station may indicate whether to perform an Ethernet header compression and decompression procedure in an SDAP layer apparatus or a PDCP layer apparatus, may indicate whether to use the Ethernet header compression and decompression procedure only in the downlink or the uplink or in both the downlink and uplink bilaterally, and may configure Ethernet header protocol-related configuration information only in a terminal having a UE capability capable of using an Ethernet protocol or a terminal having a UE capability capable of using an Ethernet header compression and decompression procedure. When the terminal reports its UE capability to the base station, it may define a new indicator, and may report, to the base station, whether the terminal can use an Ethernet protocol or an Ethernet header compression and decompression procedure through the indicator. Furthermore, the base station may configure what type of an Ethernet frame or Ethernet header will be used for each bearer or for each logical channel, and may configure which fields have been configured in the Ethernet header or how many bytes the size of the Ethernet header has or how many bits the size of each field of the Ethernet header has or how the fields of the Ethernet header are configured. Furthermore, the base station may indicate that a function for enabling a transmission stage to remove padding and a reception stage to add padding so that the padding is not transmitted in an actual radio link if the padding is added to an Ethernet frame will be used or not.

In FIG. 1E, if a terminal that transmits and receives data in an RRC connected mode does not have data to be transmitted and received for a given cause or for a given time, a base station may indicate that the terminal should switch to an RRC idle mode or an RRC inactive mode by transmitting an RRCConnectionRelease message to the terminal (1e-01). Thereafter, a terminal for which a connection has not been currently set up (hereinafter an idle mode UE or INACTIVE UE) performs an RRC connection setup process or RRC Connection Resume procedure with the base station if the terminal has data to be transmitted. The terminal sets up reverse direction transmission synchronization with the base station through a random access process, and transmits an RRCConnectionRequest message (RRCResumeRequest message in the case of a Resume procedure) to the base station (1e-05). The message contains the ID of the terminal and a cause of establishing a connection (establishmentCause).

The base station transmits an RRCConnectionSetup message (RRCResume message in the case of a Resume procedure) so that the terminal sets up an RRC connection (1e-10). The message may include information indicative of whether to use an Ethernet protocol or whether to use an Ethernet header compression and decompression procedure for each logical channel (logicalchannelconfig) or for each bearer or for each PDCP apparatus (PDCP-config) or for each SDAP layer apparatus. Furthermore, more specifically, the base station may indicate whether to use an Ethernet protocol or Ethernet header compression and decompression procedure for which IP flow or QoS flow only in each logical channel or bearer or each PDCP apparatus (or SDAP apparatus) (i.e., the base station may configure information on whether to apply an Ethernet protocol or an IP flow or QoS flow for which an EthHC method is not used in the SDAP apparatus, and thus the SDAP apparatus may indicate whether to apply the Ethernet protocol or whether to use the EthHC method in the PDCP apparatus with respect to each QoS flow. As another method, the SDAP layer apparatus or the PDCP apparatus may autonomously identify each QoS flow, and may determine whether to apply the Ethernet protocol or whether to apply the EthHC method).

Furthermore, in the above description, if whether to apply the Ethernet protocol or whether to use the EthHC method is indicated, the base station may indicate whether to apply the Ethernet protocol or the ID of a pre-defined library or dictionary to be used in the EthHC method. Furthermore, the message may include a command to set up or release whether to apply the Ethernet protocol or whether to perform the EthHC method. Furthermore, in the above description, when the base station configures whether to apply the Ethernet protocol or whether to use the EthHC method, the base station may always configure whether to apply the Ethernet protocol or whether to use the EthHC method using an RLC AM bearer (a mode not having loss of data because it includes an ARQ function or retransmission function) or an RLC UM bearer, may configure whether to apply the Ethernet protocol or whether to use the EthHC method along with a header compression protocol (ROHC), and may not configure them at the same time according to circumstances.

Furthermore, the base station may indicate whether to use a function of the SDAP layer apparatus or whether to use an SDAP header for each logical channel (logicalchannelconfig) or for each bearer or for each PDCP apparatus (PDCP-config) through the message, may indicate whether to apply IP packet header compression (ROHC) for each logical channel (logicalchannelconfig) or for each bearer or for each PDCP apparatus (PDCP-config) through the message, and may configure whether to apply ROHC through an indicator for each of the uplink and downlink. Furthermore, the base station may configure whether to use a user data compression (UDC) method for each logical channel for each bearer or in each PDCP apparatus configuration or SDAP apparatus configuration with respect to each of the uplink and downlink. That is, the base station may configure that the user data compression (UDC) method is used in the uplink and is not used in the downlink or may configure that the user data compression (UDC) method is not used in the uplink and is used in the downlink or may configure that the user data compression (UDC) method is used in both the uplink and downlink.

Furthermore, the base station may configure an EthHC procedure and an ROHC header compression procedure at the same time through the message. Furthermore, in the case of handover (e.g., handover within a base station) or when a mode switches from the RRC inactive mode to the RRC connected mode, the base station may define and indicate an indicator (drbEthHCContinue), indicating that EthHC protocol-related configuration information or context should continue to be used without being reset. When a terminal that has received the indicator re-configures the SDAP layer apparatus or the PDCP layer apparatus, the terminal may continue to use EthHC protocol-related configuration information or context without resetting it by considering the indicator. In this case, overhead attributable to EthHC protocol resetting can be reduced.

Furthermore, the base station may define a new indicator through the message, and may indicate that EthHC protocol-related configuration information or context should be reset. Furthermore, the base station may configure whether to configure an SDAP protocol or SDAP header through the RRC message. Furthermore, the base station may configure which type of an Ethernet frame or Ethernet header will be used for each bearer or for each logical channel through the message, and may configure which fields have been configured in the Ethernet header or how many bytes the size of the Ethernet header has or how many bits the size of each field of the Ethernet header has or how the fields of the Ethernet header are configured. Furthermore, the base station may indicate that a function for enabling a transmission stage to remove padding and a reception stage to add padding so that the padding is not transmitted in an actual radio link if the padding is added to an Ethernet frame will be used or not.

Furthermore, the message contains RRC connection setup information, etc. An RRC connection is also called a signaling radio bearer (SRB), and is used to transmit and receive RRC messages, that is, control messages between the terminal and the base station. The terminal with which the RRC connection has been set up transmits an RRCConnetionSetupComplete message to the base station (1e-15). If the base station is unaware of the UE capability of a terminal with which a connection has now been set up or wants to check the UE capability of the terminal, it may transmit a message to ask the UE capability. Furthermore, the terminal may transmit a message that reports its capability. The message may indicate whether the terminal can use an Ethernet protocol or whether the terminal can use an Ethernet header compression and decompression procedure. The base station may transmit the message, including an indicator for whether the terminal can use an Ethernet protocol or whether the terminal can use an Ethernet header compression and decompression procedure.

The RRCConnetionSetupComplete message includes a control message called SERVICE REQUEST through which the terminal requests a bearer setup for a given service from an MME. The base station transmits, to the MME, the SERVICE REQUEST message included in the RRCConnetionSetupComplete message (1e-20). The MME determines whether to provide the service requested by the terminal. If, as a result of the determination, the MME has determined to provide the service requested by the terminal, the MME transmits, to the base station, a message called INITIAL CONTEXT SETUP REQUEST (1e-25). The message includes information, such as quality of service (QoS) information to be applied when a data radio bearer (DRB) is configured and security-related information (e.g., Security Key, Security Algorithm) to be applied to the DRB. The base station exchanges a SecurityModeCommand message 1e-30 and a SecurityModeComplete message 1e-35 in order to set up security with the terminal. When the security setting is completed, the base station transmits an RRCConnection-Reconfiguration message to the terminal (1e-40).

The base station may include information indicative of whether to use an Ethernet protocol or whether to use an Ethernet header compression and decompression procedure for each logical channel (logicalchannelconfig) or for each bearer or for each PDCP apparatus (PDCP-config) or for each SDAP layer apparatus in the message. Furthermore, more specifically, the base station may indicate whether to use an Ethernet protocol or Ethernet header compression and decompression procedure for which IP flow or QoS flow only in each logical channel or bearer or each PDCP apparatus (or SDAP apparatus) (i.e., the base station may configure information on whether to apply an Ethernet protocol or an IP flow or QoS flow for which an EthHC method is not used in the SDAP apparatus, and thus the SDAP apparatus may indicate whether to apply the Ethernet protocol or whether to use the EthHC method in the PDCP apparatus with respect to each QoS flow. As another method, the SDAP layer apparatus or the PDCP apparatus may autonomously identify each QoS flow, and may determine whether to apply the Ethernet protocol or whether to apply the EthHC method).

Furthermore, in the above description, if whether to apply the Ethernet protocol or whether to use the EthHC method is indicated, the base station may indicate whether to apply the Ethernet protocol or the ID of a pre-defined library or dictionary to be used in the EthHC method. Furthermore, the message may include a command to set up or release whether to apply the Ethernet protocol or whether to perform the EthHC method.

Furthermore, in the above description, when the base station configures whether to apply the Ethernet protocol or whether to use the EthHC method, the base station may always configure whether to apply the Ethernet protocol or whether to use the EthHC method using an RLC AM bearer (a mode not having loss of data because it includes an ARQ function or retransmission function) or an RLC UM bearer, may configure whether to apply the Ethernet protocol or whether to use the EthHC method along with a header compression protocol (ROHC), and may not configure them at the same time according to circumstances. Furthermore, the base station may indicate whether to use a function of the SDAP layer apparatus or whether to use an SDAP header for each logical channel (logicalchannelconfig) or for each bearer or for each PDCP apparatus (PDCP-config) through the message, may indicate whether to apply IP packet header compression (ROHC) for each logical channel (logicalchannelconfig) or for each bearer or for each PDCP apparatus (PDCP-config) through the message, and may configure whether to apply ROHC through an indicator for each of the uplink and downlink. Furthermore, the base station may configure whether to use a user data compression (UDC) method for each logical channel for each bearer or in each PDCP apparatus configuration or SDAP apparatus configuration with respect to each of the uplink and downlink. That is, the base station may configure that the user data compression (UDC) method is used in the uplink and is not used in the downlink or may configure that the user data compression (UDC) method is not used in the uplink and is used in the downlink or may configure that the user data compression (UDC) method is used in both the uplink and downlink.

Furthermore, the base station may configure an EthHC procedure and an ROHC header compression procedure at the same time through the message. Furthermore, in the case of handover (e.g., handover within a base station) or when a mode switches from the RRC inactive mode to the RRC connected mode, the base station may define and indicate an indicator (drbEthHCContinue), indicating that EthHC protocol-related configuration information or context should continue to be used without being reset. When a terminal that has received the indicator re-configures the SDAP layer apparatus or the PDCP layer apparatus, the terminal may continue to use EthHC protocol-related configuration information or context without resetting it by considering the indicator. In this case, overhead attributable to EthHC protocol resetting can be reduced.

Furthermore, the base station may define a new indicator through the message, and may indicate that EthHC protocol-related configuration information or context should be reset. Furthermore, the base station may configure whether to configure an SDAP protocol or SDAP header through the RRC message. Furthermore, the base station may configure which type of an Ethernet frame or Ethernet header will be used for each bearer or for each logical channel through the message, and may configure which fields have been configured in the Ethernet header or how many bytes the size of the Ethernet header has or how many bits the size of each field of the Ethernet header has or how the fields of the Ethernet header are configured. Furthermore, the base station may indicate that a function for enabling a transmission stage to remove padding and a reception stage to add padding so that the padding is not transmitted in an actual radio link if the padding is added to an Ethernet frame will be used or not.

Furthermore, the message includes configuration information of a DRB in which user data will be processed. The terminal configures a DRB by applying the information, and transmits an RRCConnectionReconfigurationComplete message to the base station (1e-45). The base station that has completed DRB setup with the terminal transmits an INITIAL CONTEXT SETUP COMPLETE message to the MME (1e-50). The MME that has received the INITIAL CONTEXT SETUP COMPLETE message exchanges an S1 BEARER SETUP message and an S1 BEARER SETUP RESPONSE message with an S-GW in order to set up an S1 bearer (1e-055 and 1e-60). The S1 bearer is a connection for data transmission set up between the S-GW and the base station, and corresponds to the DRB in a one-to-one manner. When the process is completed, the terminal transmits and receives data to and from the base station through the S-GW (1e-65 and 1e-70). As described above, a common data transmission process is basically configured with the three steps of RRC connection establishment, security setting, and DRB setup. Furthermore, the base station may transmit, to the terminal, an RRCConnectionReconfiguration message in order to newly provide a configuration to the terminal or to add or change a configuration for a given cause (1e-75).

The message may include information indicative of whether to use an Ethernet protocol or whether to use an Ethernet header compression and decompression procedure for each logical channel (logicalchannelconfig) or for each bearer or for each PDCP apparatus (PDCP-config) or for each SDAP layer apparatus. Furthermore, more specifically, the base station may indicate whether to use an Ethernet protocol or Ethernet header compression and decompression procedure for which IP flow or QoS flow only in each logical channel or bearer or each PDCP apparatus (or SDAP apparatus) (i.e., the base station may configure information on whether to apply an Ethernet protocol or an IP flow or QoS flow for which an EthHC method is not used in the SDAP apparatus, and thus the SDAP apparatus may indicate whether to apply the Ethernet protocol or whether to use the EthHC method in the PDCP apparatus with respect to each QoS flow. As another method, the SDAP layer apparatus or the PDCP apparatus may autonomously identify each QoS flow, and may determine whether to apply the Ethernet protocol or whether to apply the EthHC method).

Furthermore, in the above description, if whether to apply the Ethernet protocol or whether to use the EthHC method is indicated, the base station may indicate whether to apply the Ethernet protocol or the ID of a pre-defined library or dictionary to be used in the EthHC method. Furthermore, the message may include a command to set up or release whether to apply the Ethernet protocol or whether to perform the EthHC method. Furthermore, in the above description, when the base station configures whether to apply the Ethernet protocol or whether to use the EthHC method, the base station may always configure whether to apply the Ethernet protocol or whether to use the EthHC method using an RLC AM bearer (a mode not having loss of data because it includes an ARQ function or retransmission function) or an RLC UM bearer, may configure whether to apply the Ethernet protocol or whether to use the EthHC method along with a header compression protocol (ROHC), and may not configure them at the same time according to circumstances.

Furthermore, the base station may indicate whether to use a function of the SDAP layer apparatus or whether to use an SDAP header for each logical channel (logicalchannelconfig) or for each bearer or for each PDCP apparatus (PDCP-config) through the message, may indicate whether to apply IP packet header compression (ROHC) for each logical channel (logicalchannelconfig) or for each bearer or for each PDCP apparatus (PDCP-config) through the message, and may configure whether to apply ROHC through an indicator for each of the uplink and downlink. Furthermore, the base station may configure whether to use a user data compression (UDC) method for each logical channel for each bearer or in each PDCP apparatus configuration or SDAP apparatus configuration with respect to each of the uplink and downlink. That is, the base station may configure that the user data compression (UDC) method is used in the uplink and is not used in the downlink or may configure that the user data compression (UDC) method is not used in the uplink and is used in the downlink or may configure that the user data compression (UDC) method is used in both the uplink and downlink.

Furthermore, the base station may configure an EthHC procedure and an ROHC header compression procedure at the same time through the message. Furthermore, in the case of handover (e.g., handover within a base station) or when a mode switches from the RRC inactive mode to the RRC connected mode, the base station may define and indicate an indicator (drbEthHCContinue), indicating that EthHC protocol-related configuration information or context should continue to be used without being reset. When a terminal that has received the indicator re-configures the SDAP layer apparatus or the PDCP layer apparatus, the terminal may continue to use EthHC protocol-related configuration information or context without resetting it by considering the indicator. In this case, overhead attributable to EthHC protocol resetting can be reduced.

Furthermore, the base station may define a new indicator through the message, and may indicate that EthHC protocol-related configuration information or context should be reset. Furthermore, the base station may configure whether to configure an SDAP protocol or SDAP header through the RRC message. Furthermore, the base station may configure which type of an Ethernet frame or Ethernet header will be used for each bearer or for each logical channel through the message, and may configure which fields have been configured in the Ethernet header or how many bytes the size of the Ethernet header has or how many bits the size of each field of the Ethernet header has or how the fields of the Ethernet header are configured. Furthermore, the base station may indicate that a function for enabling a transmission stage to remove padding and a reception stage to add padding so that the padding is not transmitted in an actual radio link if the padding is added to an Ethernet frame will be used or not.

Figure 1F:
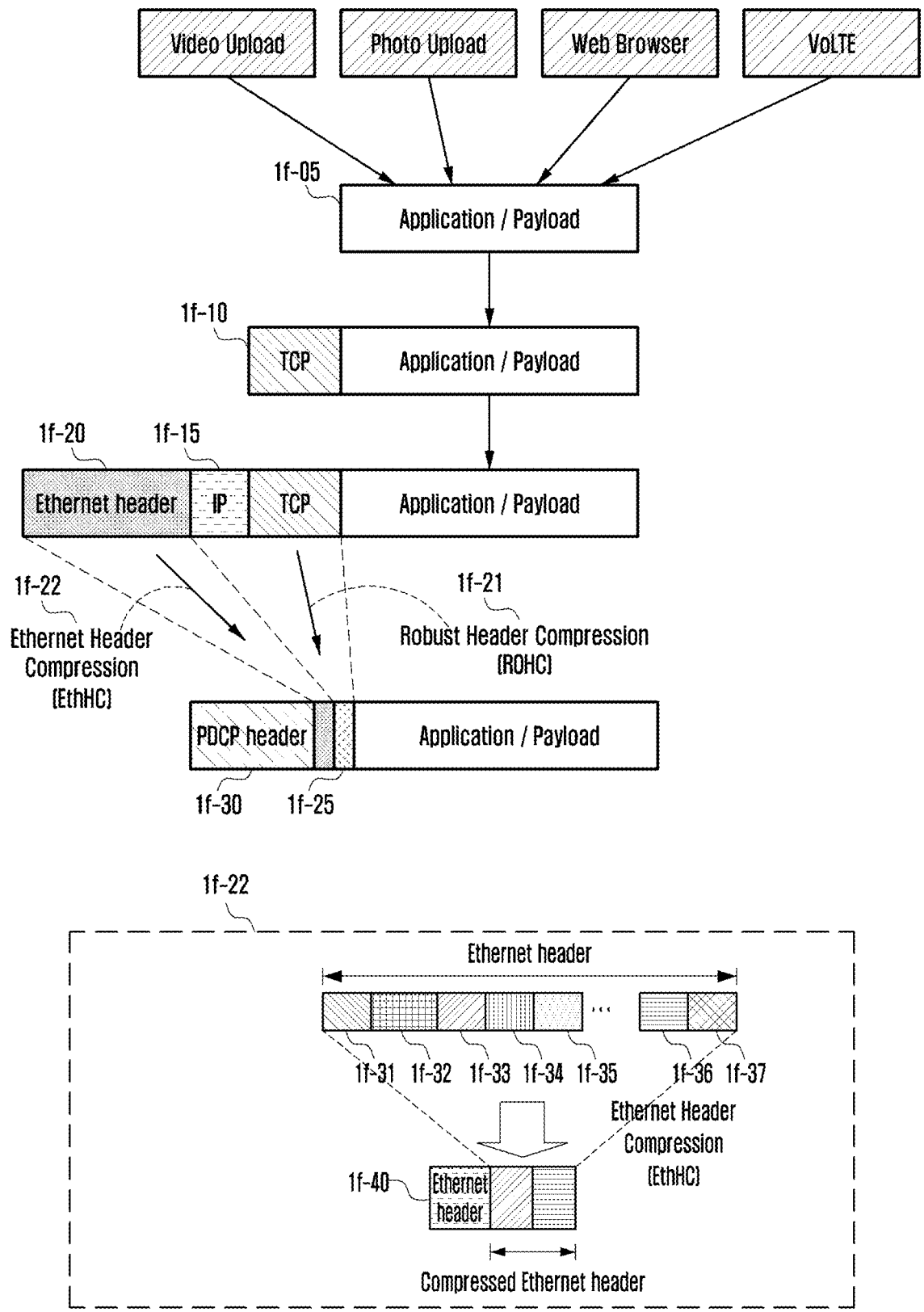
FIG. 1F illustrates a diagram of an Ethernet header compression (EthHC) method according to an embodiment of the disclosure.

FIG. 1F illustrates a diagram of an Ethernet header compression (EthHC) method proposed in the disclosure.

In FIG. 1F, higher layer data 1f-05 may be generated as data corresponding to services, such as video transmission, photo transmission, web search or VoLTE. Data generated from an application layer apparatus may be processed through a TCP/IP or UDP corresponding to a network data transport layer or may be processed through an Ethernet protocol to configure headers 1f-10, 1f-15 and 1f-20 (higher layer headers or Ethernet headers), and may be delivered to a PDCP layer. When the data (e.g., PDCP SDU) is received from a higher layer, the PDCP layer may perform the following procedure.

If a header compression (ROHC) or an EthHC procedure has been configured to be used in an SDAP layer apparatus or PDCP layer through an RRC message, such as 1e-10 or 1e-40 or 1e-75, in FIG. 1E, a transmission stage may perform the EthHC procedure on the Ethernet header 1f-20 in the SDAP layer apparatus or the PDCP layer apparatus like 1f-22. If integrity verification has been configured, integrity protection may be performed, ciphering may be performed, and a PDCP PDU may be configured by configuring a PDCP header 1f-30. In the above description, the SDAP layer apparatus or the PDCP layer apparatus includes a header compression/decompression apparatus, determines whether to perform header compression on each datum as configured in the RRC message, and uses the header compression/decompression apparatus. The transmission stage performs compression on an Ethernet header or a higher layer header (e.g., TCP/IP header) using the header compression apparatus in the transmission SDAP layer apparatus or the PDCP layer apparatus. A reception stage performs header decompression on the Ethernet header or higher layer header (e.g., TCP/IP header) using the header decompression apparatus in the reception SDAP layer apparatus or the PDCP layer apparatus.

A terminal may apply the procedure of FIG. 1F to perform uplink header compression, and a base station may also apply the procedure of FIG. 1F to perform header compression on downlink data. Furthermore, the description of the uplink data may be identically applied to downlink data.

A method of performing EthHC on an Ethernet header, which is proposed in the disclosure, is a method of reducing the size of a header by omitting fields indicative of fixed information and indicating only changed information. Accordingly, a transmission stage may transmit the entire header information and configuration information for compression (e.g., an ID (type) for each traffic (or service) or a serial number for each traffic (or service) for an Ethernet protocol, compression ratio-related information) at first (i.e., upon first transmission). Furthermore, upon performing subsequent transmission, the transmission stage may configure a header by omitting fields corresponding to information not changed compared to all pieces of the first transmitted information (e.g., a transmission address field or a reception address field (MAC address) or the start of frame delimiter (SFD) or a frame checksum (FCS) or Ethernet type field) or including only fields corresponding to changed information without being transmitted, so the size of the header can be reduced.

In the EthHC method of the disclosure, specifically, how the Ethernet header is compressed (1f-22) is proposed below.

In the EthHC protocol 1f-22, when receiving data from a higher layer apparatus, the SDAP layer apparatus or the PDCP layer apparatus (of the transmission stage) may identify an Ethernet header, may compress the Ethernet header using a protocol that will compress the Ethernet header, and may define and use a new header 1f-40 ahead of the compressed Ethernet header. In the above description, the transmission stage may not perform ciphering on the new header 1f-40. The reason for this is that if ciphering is not performed on the new header 1f-40, when the PDCP layer apparatus delivers data to a lower layer apparatus after performing data processing such as integrity protection or a ciphering procedure, a terminal implementation can be easily performed because all of an SDAP header or a PDCP header or the new header can be attached together at a time if then SDAP header has been configured.

As proposed above, the method of compressing an Ethernet header is a method of selectively transmitting only required fields or valid fields by omitting a field value that belongs to a plurality of header fields 1f-31, 1f-32, 1f-33, 1f-34, 1f-35, 1f-36, and 1f-37 included in the Ethernet header and that has not been changed, or a field value not changed compared to a previously transmitted Ethernet header, or an Ethernet header field value that does not need to be transmitted. Accordingly, the method is a method for a transmission stage to transmit only a third field 1f-33 and a sixth field 1f-36 if a first field 1f-31, a second field 1f-32, a fourth field 1f-34, a fifth field 1f-35, and a seventh field 1f-37, among a plurality of fields included in an Ethernet header, for example, the first field 1f-31, second field 1f-32, third field 1f-33, fourth field 1f-34, fifth field 1f-35, sixth field 1f-36, and seventh field 1f-37, can be omitted or do not need to be transmitted or are the same as previously transmitted Ethernet header field values.

However, the reception side needs to be aware of which fields have not been compressed or omitted or transmitted in order to decompress a compressed Ethernet header. Accordingly, when the transmission side compresses an Ethernet header, it may define a new header (e.g., EthHC header), and may transmit the new header by attaching it to the front of the compressed Ethernet header. The transmission stage may define a new first field in the new EthHC header, and may indicate that which one of the plurality of fields of the Ethernet header has been compressed or whether the field has been omitted been transmitted. The new field may indicate whether a given field has been compressed (or omitted or not been transmitted) or has not been compressed (or included or transmitted) for each bit through a bitmap format. Furthermore, the first field can indicate which field has been compressed (or omitted) or has not been compressed (or included) in the Ethernet header. Accordingly, the reception side may calculate the size of the compressed Ethernet header using the first field. That is, the reception stage can be aware of the size of the compressed Ethernet header by subtracting the size of an omitted header field from an original Ethernet header size.

Furthermore, the first field may have mapping for indicating whether all the fields of an Ethernet header have been compressed (or omitted), but may mapping for indicating whether only fields capable of being compressed (or omitted), among the fields of an Ethernet header, have been compressed (or omitted), thereby being capable of reducing overhead of a new EthHC header.

Furthermore, the EthHC header may indicate the size or length of a compressed Ethernet header using a second field so that the size of the compressed Ethernet header can be accurately indicated (e.g., for convenience of an implementation). Furthermore, if the size of an Ethernet header can have a plurality of types, the EthHC header may indicate that the type is which kind using the second field. Alternatively, a new third field, indicating whether EthHC has been performed on an EthHC header, may be defined.

Furthermore, in the above description, a base station may configure that the configuration of Ethernet header fields according to the type of Ethernet header is configured with which type of Ethernet header or header fields for each bearer through the RRC message as described in FIG. 1E. Alternatively, an identifier or indicator indicative of the type of Ethernet header in the new header may be defined and used between a base station and a terminal.

Another EthHC method may be used based on the new EthHC header. For example, when a transmission stage compresses an Ethernet header, if a value of header fields has not been changed compared to the fields of an Ethernet header that has been previously transmitted when compression is sequentially performed, the Ethernet header may be compressed (omitted), and a first field may be configured accordingly. If a value of an Ethernet header field is different from a value of a previously transmitted Ethernet header field, the Ethernet header is not compressed (included), and a first field may be configured accordingly, thereby being completing EthHC. In the above description, the term "sequentially" may include determining the sequence in ascending order based on a PDCP serial number or a COUNT value. The previous Ethernet header may indicate an Ethernet header corresponding to data whose PDCP serial number or COUNT value has a value as much as 1.

When a compressed Ethernet header is received, a reception stage may identify the first field, may restore fields compressed (omitted) in the Ethernet header accordingly because the fields have the same values as the fields of a previously received Ethernet header, and may newly update fields that have not been compressed (included). A transmission stage and a reception stage may have separate buffers for compressing an Ethernet header, may update the buffers whenever an Ethernet header is compressed, and may update the buffers whenever an Ethernet header is decompressed. If the compressed Ethernet header is restored, the reception stage may remove a new EthHC header and deliver restored data to a higher layer. Furthermore, when an Ethernet header is first transmitted, the transmission stage may transmit the entire Ethernet header information. That is, in the beginning, the transmission stage may transmit the entire Ethernet header information so that the reception stage can be aware of the entire Ethernet header information without performing EthHC.

Figure 1G:
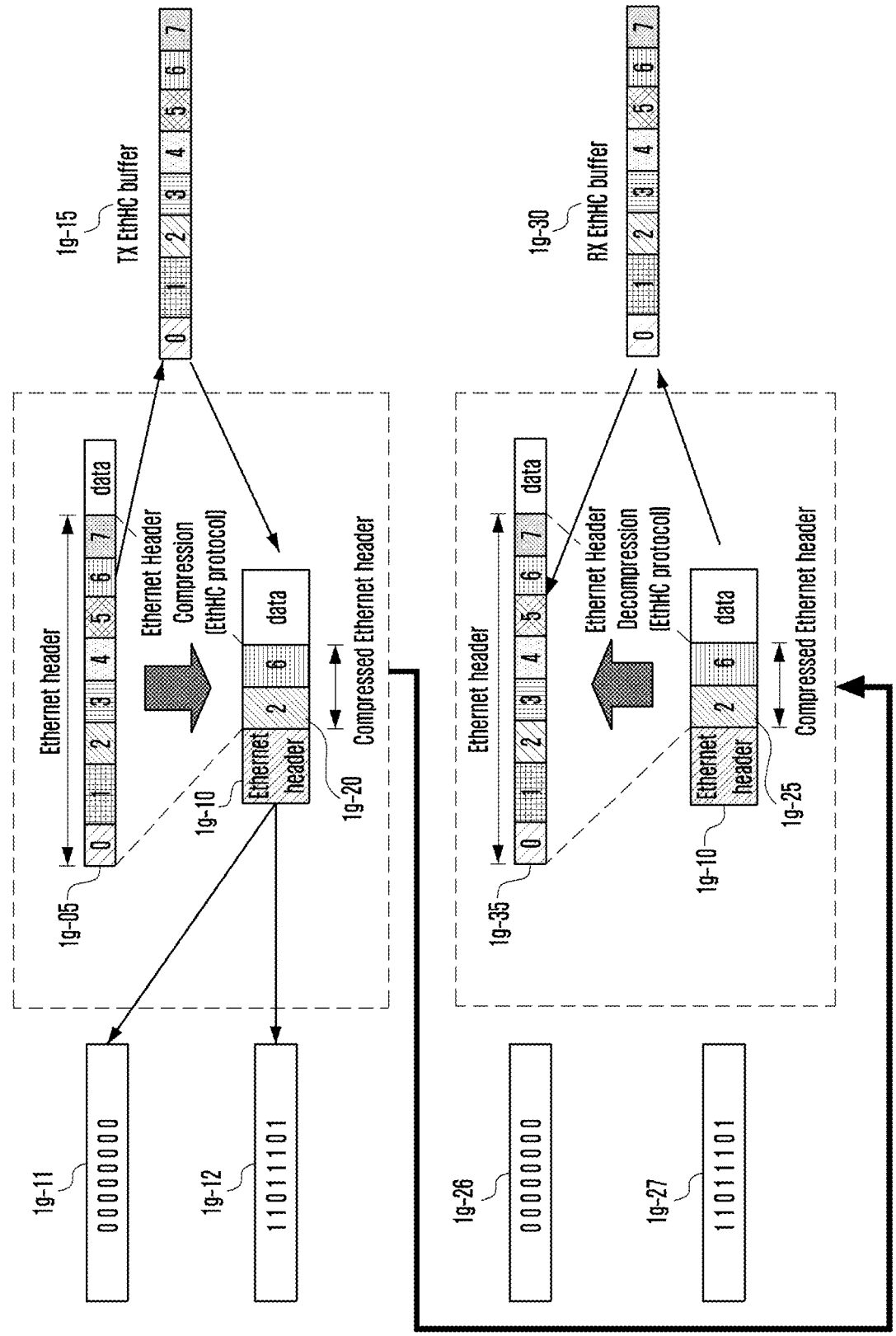
FIG. 1G illustrates a diagram of a detailed embodiment of an EthHC method according to an embodiment of the disclosure.

FIG. 1G illustrates a diagram of a detailed embodiment of an EthHC method proposed in the disclosure.

In FIG. 1G, the PDCP layer apparatus or SDAP layer apparatus of a transmission stage receives an Ethernet frame 1g-05 from a higher layer apparatus. If an EthHC procedure has been configured, the PDCP layer apparatus or SDAP layer apparatus may store field values of the Ethernet header of a first received Ethernet frame in a buffer 1g-15 for transmission Ethernet compression. Furthermore, the PDCP layer apparatus or SDAP layer apparatus may transmit the first Ethernet frame without EthHC. Furthermore, when a second Ethernet frame is received, the transmission stage may compare each of the field values of an Ethernet header with each of the field values stored in the transmission buffer for Ethernet compression. If, as a result of the comparison, there is a field having the same value, the transmission stage may omit a corresponding field, may set a bit, corresponding or mapped to the omitted field, to 1 (or 0), and may indicate that the field has been omitted. As a result of a comparison between each of the fields values of an Ethernet header of a second Ethernet frame and each of fields stored in the transmission buffer for Ethernet compression, if a field having a different value is present, the transmission stage may not omit a corresponding field, may set a bit, corresponding or mapped to the not-omitted field, to 0 (or 1), and may indicate that the field has not been omitted.

Furthermore, if integrity protection has been configured, the transmission stage may perform integrity protection, may perform a ciphering procedure, may configure a new header 1g-10, may configure a PDCP header, may attach the new header and the PDCP header, and may transmit them to a reception stage by delivering them to a lower layer apparatus.

In the above description, the new header 1g-10 may indicate that each bit is included (has not been compressed) in which field of an Ethernet header or is not included (has been compressed) in which field of an Ethernet header like a bitmap.

In the above description, the transmission stage may indicate whether an EthHC procedure has been performed by defining a new field (e.g., a 1-bit indicator) in the new header 1g-10. A case where EthHC has not been performed may be directly indicated through a 1-bit indicator, so the reception stage does not perform processing for a new header. Furthermore, in the above description, the transmission stage may define and use, in an SDAP header or PDCP header, a 1-bit indicator indicating whether an EthHC procedure has been performed. If a transmission stage and a reception stage define the 1-bit indicator in the SDAP header or the PDCP header, overhead can be reduced because the new header 1g-10 itself for EthHC can be omitted if an EthHC procedure is not performed.

In FIG. 1G, the PDCP layer apparatus or SDAP layer apparatus of a reception stage may receive a compressed Ethernet frame 1g-25 from a lower layer apparatus. If an EthHC procedure has been configured, the PDCP layer apparatus or SDAP layer apparatus may identify each of the field values of an Ethernet header of a first received Ethernet frame, and may store the field values in a buffer 1g-30 for reception Ethernet decompression. Furthermore, the reception stage may deliver the first Ethernet frame to a higher layer apparatus without Ethernet header decompression. Furthermore, when a second Ethernet frame is received, the reception stage may identify which fields have been omitted (compressed) and which fields have not been omitted (not been compressed) by checking a field value of the new header 1g-10 for Ethernet compression. The reception stage restores (performs decompression on) an Ethernet header prior to compression by restoring fields, indicated to have been omitted (compressed) in the above description, to field values stored in the reception buffer for decompression. Furthermore, the reception stage stores new or changed values in the reception buffer for decompression based on fields because values of fields indicated to have not been omitted (not compressed) in the above description are new or changed values. Furthermore, the reception stage performs deciphering, performs integrity verification if integrity protection has been configured, configures an Ethernet frame along with the Ethernet header restored in the above description if there is no error, and delivers the Ethernet frame to a higher layer apparatus.

In the disclosure, to generate and add a separate header like 1g-10 is proposed. The separate header may have a fixed size (e.g., 1 byte or 2 bytes), and may be assigned a separate name like an EthHC header. Specifically, after performing an EthHC procedure on an Ethernet header, a transmission stage may generate a separate header and add it ahead of a compressed header. Furthermore, the separate header may include a length field capable of indicating the size of a compressed Ethernet header, and may include an indicator field indicating whether an EthHC procedure has been performed, and may include a checksum field so that a reception stage can identify whether Ethernet header decompression is successful. Alternatively, a transmission stage and a reception stage may define an indicator field to reset an EthHC protocol, and may use the indicator field to synchronize the protocols of the transmission stage and the reception stage. Alternatively, the transmission stage and the reception stage may define and use a field indicating that an EthHC protocol has been reset. Alternatively, the transmission stage and the reception stage may define and use a field indicating that the buffer of an EthHC protocol has been flushed.

In the above description, a length field capable of indicating the size of a compressed Ethernet header, an indicator field indicating whether an EthHC procedure has been performed, a checksum field that enables a reception stage to be aware of whether Ethernet header decompression is successful, an indicator field to reset an EthHC protocol, and a field indicating that an EthHC protocol has been reset, which have been proposed for a separate header, may be defined and used in the existing header (e.g., PDCP header or SDAP header) other than a separate header.

Alternatively, if an Ethernet decompression failure has occurred (e.g., a checksum error has occurred), an indicator or the indicator of a PDCP header may be defined and used in a new SDAP control PDU or PDCP control PDU or SDAP header so that a reception stage can deliver feedback in a transmission stage Ethernet compression protocol. The indicator of the newly defined SDAP control PDU or PDCP control PDU or SDAP header or the indicator of the PDCP header may indicate that a reception stage has failed in Ethernet decompression (or that a checksum error has occurred), and may indicate the flushing of a transmission buffer for transmission stage EthHC has to be performed. Furthermore, the corresponding indicator may indicate the PDCP serial number or COUNT value of data in which an Ethernet decompression failure has occurred in the newly defined SDAP control PDU or PDCP control PDU or SDAP header or PDCP header in order to prevent a loss of the data. That is, when a PDCP serial number or a COUNT value is received through the feedback, a transmission stage can be aware that data whose Ethernet decompression has failed is data corresponding to which PDCP serial number or COUNT value. Accordingly, the transmission stage may perform integrity protection or a ciphering procedure on the data and subsequent data using the existing PDCP serial number and COUNT value or using a new PDCP serial number and COUNT value, may process the data again, and may perform retransmission, thereby being capable of preventing a loss of the data.

Figure 1H:
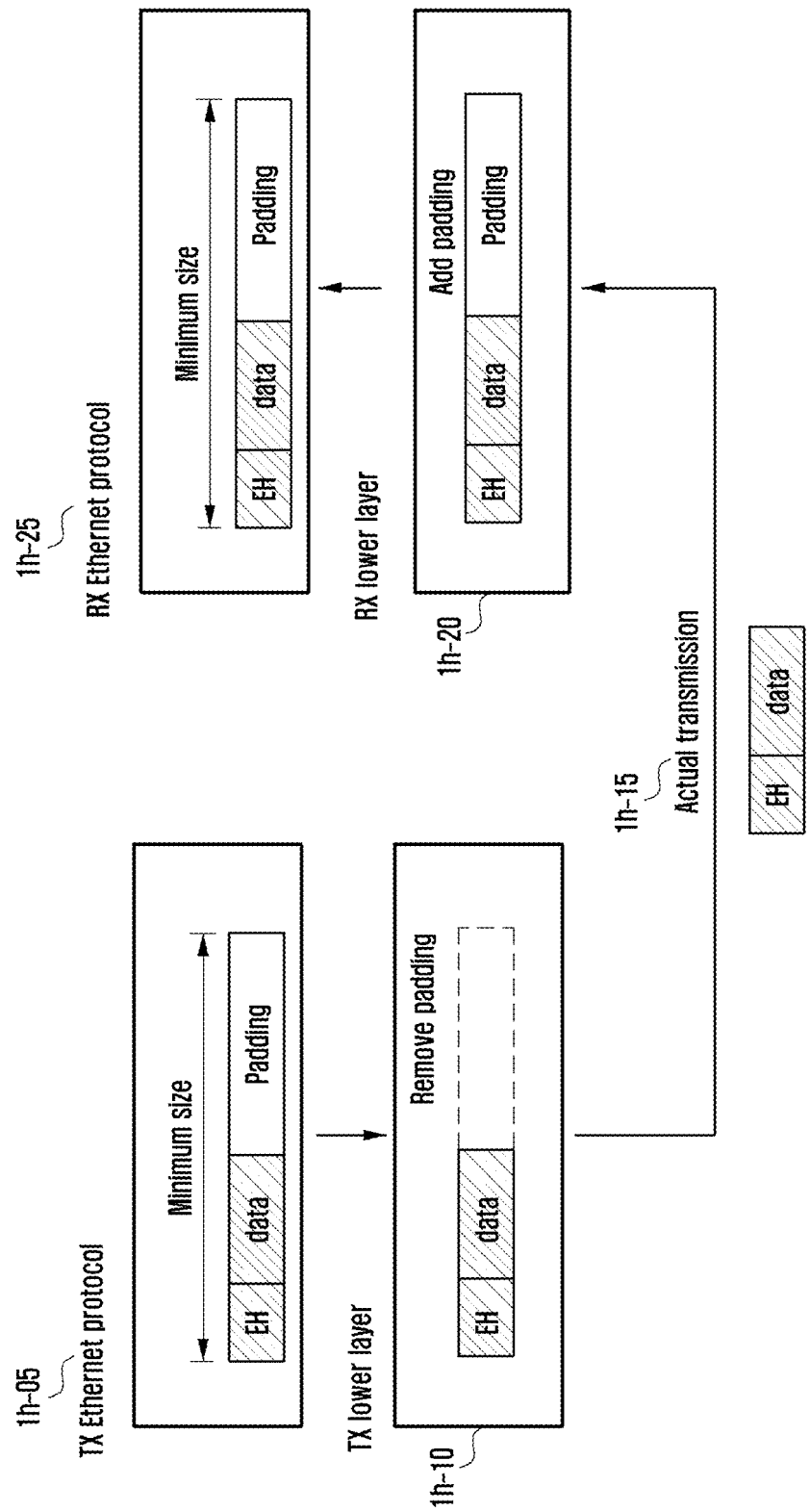
FIG. 1H illustrates a diagram of a method of supporting, by a transmission stage and a reception stage, low transmission latency and high reliability by efficiently using radio transmission resources in a wireless environment using an Ethernet protocol in a next-generation mobile communication system, which is related to an embodiment of the disclosure.

FIG. 1H illustrates a diagram of a method of supporting, by a transmission stage and a reception stage, low transmission latency and high reliability by efficiently using radio transmission resources in a wireless environment using an Ethernet protocol in a next-generation mobile communication system.

An Ethernet protocol designates a minimum size (e.g., 64 bytes). That is, if data to be transmitted is smaller than a pre-defined minimum size (e.g., 64 bytes), a transmission stage may add padding and transmit the data based on the minimum size. The reason for this is that a reception stage considers received data to be abnormal data and discards the data if the size of the received data is smaller than a pre-defined minimum size in an Ethernet protocol.

In the above description, if padding is added, a transmission stage Ethernet protocol indicates the length of the padding in an Ethernet header. Accordingly, a reception stage Ethernet protocol can identify the Ethernet header and check the size of padding.

In the disclosure, a method of efficiently using a transmission resource is proposed as follows.

If the size of data is smaller than a pre-defined minimum size like 1h-05, a transmission stage Ethernet protocol adds padding and delivers data to a lower layer apparatus based on the minimum size. Accordingly, an SDAP layer apparatus or a PDCP layer apparatus 1h-10, that is, a lower layer apparatus, reads an Ethernet header, removes padding if the padding is present, and performs transmission by performing data processing on only actual data. In the above description, the Ethernet header may have a field indicative of the size of the actual data. A reception stage can calculate the size of padding by subtracting the size of actual data from the size of received data. Alternatively, a transmission stage and a reception stage may define and use a field indicative of the size of padding in an Ethernet header or SDAP header or PDCP header.

A PDCP layer apparatus or SDAP layer apparatus 1h-20, that is, a reception stage a lower layer apparatus, reads an Ethernet header, checks the size of padding, adds padding based on a minimum size if padding is not present or if the size of data is smaller than the minimum size, and delivers an Ethernet frame through a higher layer Ethernet protocol. If the addition of padding is not necessary (e.g., if padding is not indicated in an Ethernet header, if a field indicative of actual data is not present, or if the size of actual data is greater than a minimum size supported by Ethernet), the reception stage may perform data processing and deliver the data to a higher layer apparatus. In the above description, the Ethernet header may have a field indicative of the size of the actual data. The reception stage can calculate the size of padding to be added by subtracting the size of the actual data from a minimum size of data supported by Ethernet. Alternatively, the reception stage can be directly aware of the size of padding through a field indicative of the size of padding in an Ethernet header or SDAP header or PDCP header.

As described above, when actual data is transmitted in a wireless environment, only the actual data other than padding is transmitted. Accordingly, low transmission latency and high reliability can be supported because a transmission resource can be efficiently used.

In FIG. 1H, padding may not be actually transmitted in the data of an Ethernet frame and may be omitted in a transmission stage, how much padding is omitted may be indicated, and only actual data may be transmitted. A reception stage checks how much padding has been omitted by checking the indication, restores and adds the omitted padding, and delivers it to a higher layer apparatus. That is, a transmission stage does not actually transmit fields that may be compressed or omitted among the fields of an Ethernet header. The transmission stage compresses or omits fields, indicates which fields have been omitted using a new header, and performs transmission on only actually valid or important fields. A reception stage identifies which fields have been omitted by checking the indicator of the new header, restores and adds the omitted fields, and delivers them to a higher layer apparatus. In the above description, when the fields of the Ethernet header are omitted in the transmission stage, they may be omitted based on the fields of a previously generated Ethernet header. When the reception stage restores the fields of the Ethernet header, it may restore the fields based on the fields of a previously received Ethernet header. As another method, if a transmission stage PDCP layer apparatus or SDAP layer apparatus and a reception stage PDCP layer apparatus or SDAP layer apparatus have configured or agreed to not use unnecessary Ethernet header fields, the PDCP layer apparatus or SDAP layer apparatus of the transmission stage may omit or remove unnecessary Ethernet header fields, and may transmit only necessary Ethernet header fields (compressed Ethernet header) along data. The reception stage may restore the fields configured to be omitted or removed because they are unnecessary Ethernet header fields in the above description, may configure an original Ethernet header, and may deliver it to a higher Ethernet protocol.

Figure 1I:
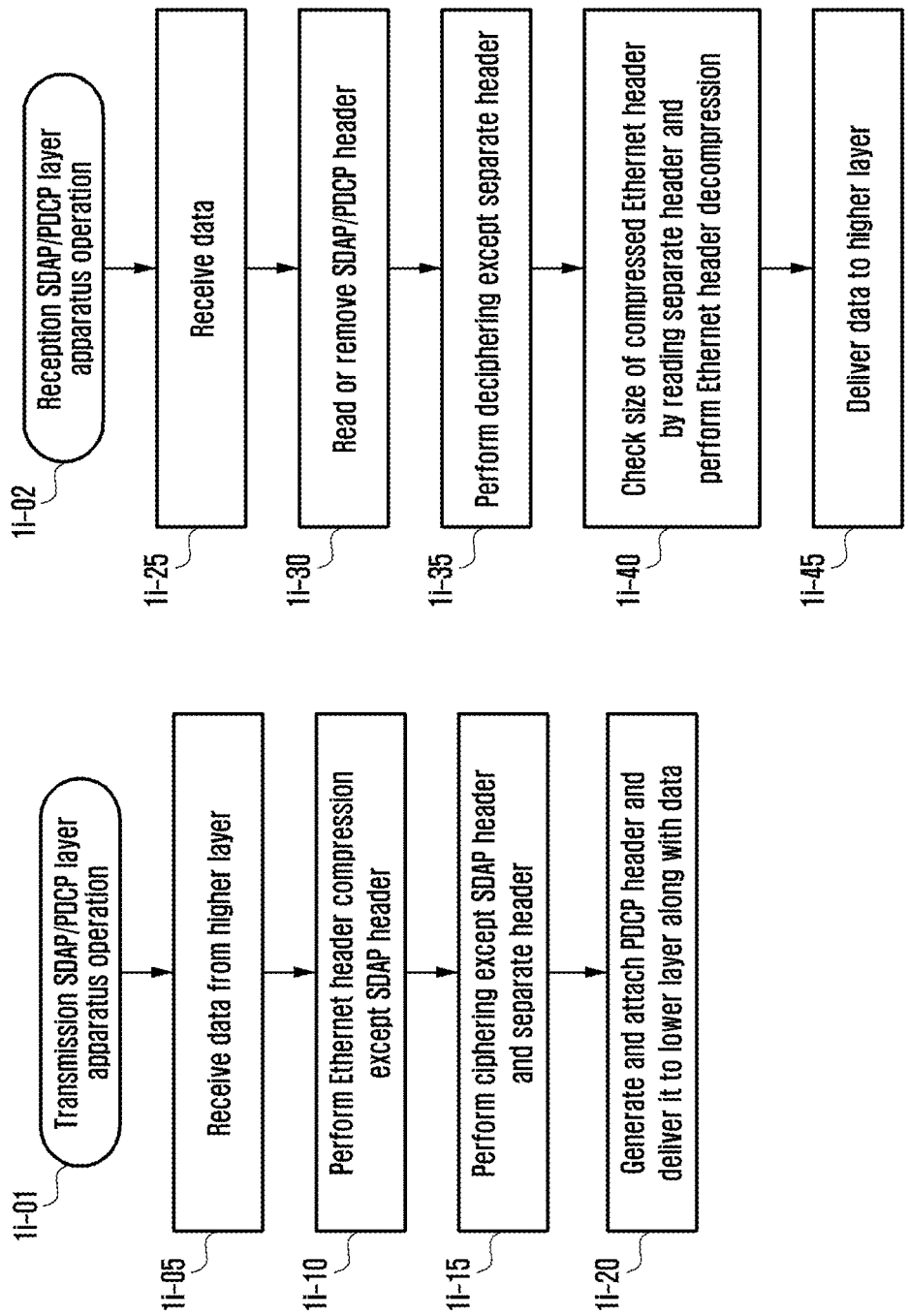
FIG. 1I illustrates a diagram of an operation of a transmission and reception SDAP layer apparatus or PDCP layer apparatus according to an embodiment of the disclosure.

FIG. 1I illustrates a diagram of an operation of a transmission and reception SDAP layer apparatus or PDCP layer apparatus proposed in the disclosure.

First, the transmission SDAP layer apparatus or PDCP layer apparatus performs an EthHC procedure on the Ethernet header of data received from a higher layer (1*i*-01). Specifically, if an SDAP header has been configured through an RRC message, in the above description, the EthHC procedure is performed on only the first given byte (e.g., 18 bytes), that is, an Ethernet header, except the SDAP header of the data (e.g., PDCP SDU) received from a higher layer apparatus (1*i*-10), and the EthHC procedure is not performed on an SDAP header or other higher layer headers other than Ethernet. Furthermore, if integrity protection and a verification procedure have been configured, integrity protection is performed on all of the SDAP header (1*i*-10), a compressed Ethernet header, and a compressed TCP/IP header, and a MAC-I is calculated and attached to the last part of data. A ciphering procedure is performed in the remaining parts except the SDAP header and a separate header for Ethernet compression (1*i*-15). Next, the transmission stage generates a PDCP header, concatenates the PDCP header and processed data, and delivers the PDCP header to a lower layer along with the data (1*i*-20).

A reception SDAP layer apparatus or PDCP layer apparatus (1*i*-02) first reads or excludes an SDAP header or PDCP header (1*i*-30), performs a deciphering procedure except a separate header for Ethernet compression (1*i*-35), checks the size of a compressed Ethernet header by reading the separate header, restores an Ethernet header by performing an Ethernet header decompression procedure (1*i*-40), and delivers data to a higher layer along with the restored Ethernet header and or an SDAP header (1*i*-45).

FIG. 1U illustrates the configuration of a terminal to which an embodiment of the disclosure may be applied.

Figure 1J:
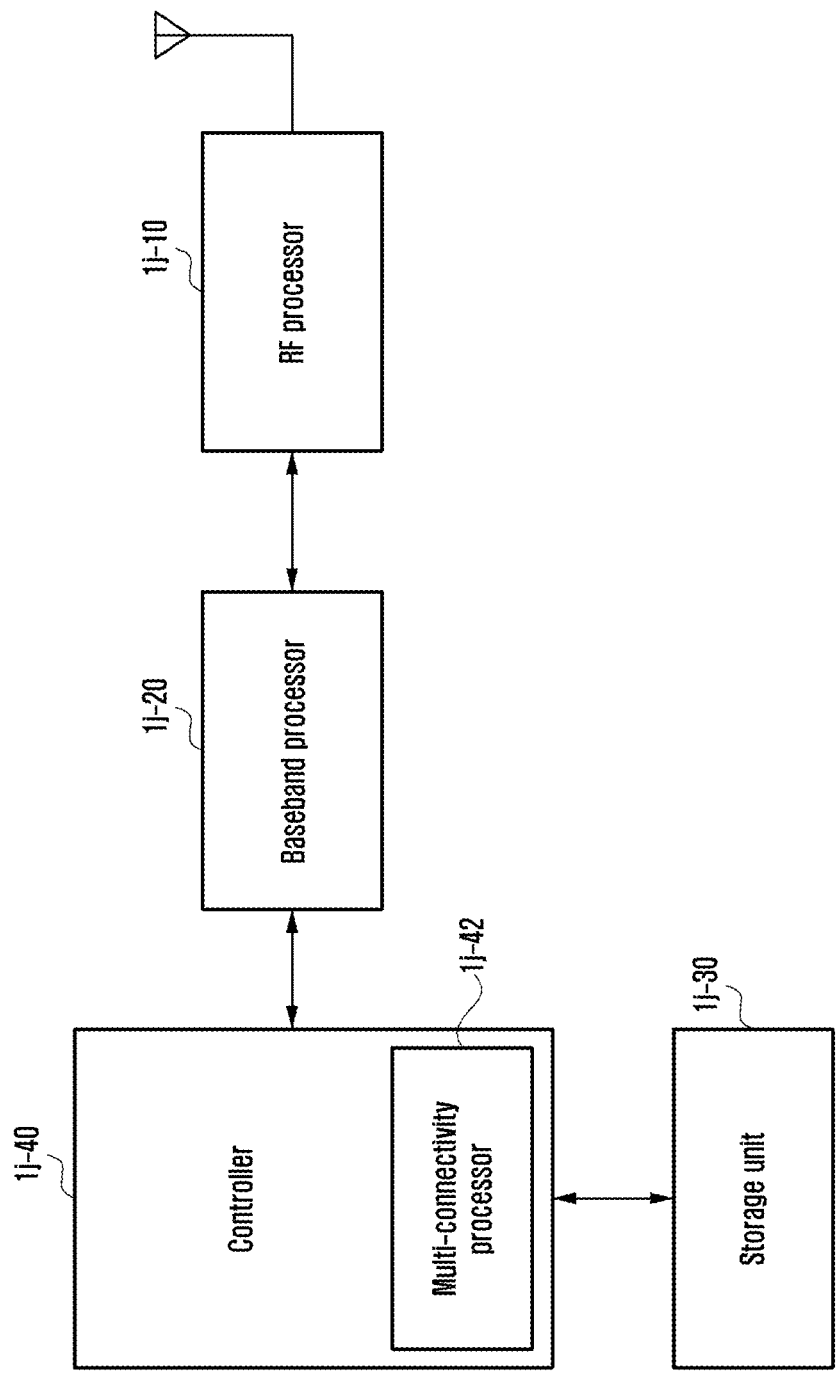
FIG. 1J illustrates the configuration of a terminal related to an embodiment of the disclosure.

Referring to FIG. 1J, the terminal includes a radio frequency (RF) processor 1*j*-10, a baseband processor 1*j*-20, a storage unit 1*j*-30, and a controller 1*j*-40.

The RF processor 1*j*-10 performs functions for transmitting/receiving a signal through a radio channel, such as the band conversion and amplification of a signal. That is, the RF processor 1*j*-10 up-converts a baseband signal received from the baseband processor 1*j*-20 into an RF band signal, transmits the RF band signal through an antenna, and down-converts an RF band signal received through the antenna into a baseband signal. For example, the RF processor 1*j*-10 may include a transmission filter, a reception filter, an amplifier, a mixer, an oscillator, a digital to analog convertor (DAC), and an analog to digital convertor (ADC). In FIG. 1J, only one antenna has been illustrated, but the UE may include multiple antennas. Furthermore, the RF processor 1*j*-10 may include multiple RF chains. Furthermore, the RF processor 1*j*-10 may perform beamforming. For the beamforming, the RF processor 1*j*-10 may adjust the phase and size of each of signals transmitted/received through multiple antennas or antenna elements. Furthermore, the RF processor may perform MIMO. When the MIMO operation is performed, the RF processor may receive multiple layers. The RF processor 1*j*-10 may properly configure multiple antenna or antenna elements under the control of the controller, and may perform received beam swiping or adjust the direction and beam width of the received beam so that the received beam cooperates with a transmitted beam.

The baseband processor 1*j*-20 performs a baseband signal and inter-bit stream conversion function based on the physical layer standard of a system. For example, when data is transmitted, the baseband processor 1*j*-20 generates complex symbols by coding and modulating a transmission bit stream. Furthermore, when data is received, the baseband processor 1*j*-20 reconstructs a reception bit stream from a baseband signal received from the RF processor 1*j*-10 through demodulation and decoding. For example, if an orthogonal frequency division multiplexing (OFDM) scheme is applied, when data is transmitted, the baseband processor 1*j*-20 generates complex symbols by coding and modulating a transmission bit stream, maps the complex symbols to subcarriers, and then configures OFDM symbols through inverse fast Fourier transform (IFFT) operation and cyclic prefix (CP) insertion. Furthermore, when data is received, the baseband processor 1*j*-20 segments a baseband signal received from the RF processor 1*j*-10 in an OFDM symbol unit, reconstructs signals mapped to subcarriers through fast Fourier transform (FFT) operation, and reconstructs a reception bit stream through demodulation and decoding.

The baseband processor 1*j*-20 and the RF processor 1*j*-10 transmit and receive signals as described above. Accordingly, the baseband processor 1*j*-20 and the RF processor 1*j*-10 may be called a transmitter, a receiver, a transceiver or a communication unit. Furthermore, at least one of the baseband processor 1*j*-20 and the RF processor 1*j*-10 may include multiple communication modules in order to support different multiple radio access technologies. Furthermore, at least one of the baseband processor 1*j*-20 and the RF processor 1*j*-10 may include different communication modules in order to process signals of different frequency bands. For example, the different radio access technologies may include an LTE network and an NR network. Furthermore, the different frequency bands may include a super high frequency (SHF) (e.g., 2.5 GHz, 5 GHz) band and a millimeter wave (e.g., 60 GHz) band.

The storage unit 1*j*-30 stores data, such as a basic program, an application program, and configuration information for the operation of the UE. The storage unit 1*j*-30 provides stored data in response to a request from the controller 1*j*-40.

The controller 1*j*-40 controls an overall operation of the UE. For example, the controller 1*j*-40 transmits/receives a signal through the baseband processor 1*j*-20 and the RF processor 1*j*-10. Furthermore, the controller 1*j*-40 writes data in the storage unit 1*j*-40 and reads data from the storage unit 1*j*-40. To this end, the controller 1*j*-40 may include at least one processor. For example, the controller 1*j*-40 may include a communication processor (CP) performing control for communication and an application processor (AP) controlling a higher layer, such as an application program. Furthermore, the controller 1*j*-40 may include a multi-connectivity processor 1*j*-42 configured to perform processing for an operation in a multi-connection mode.

Figure 1K:
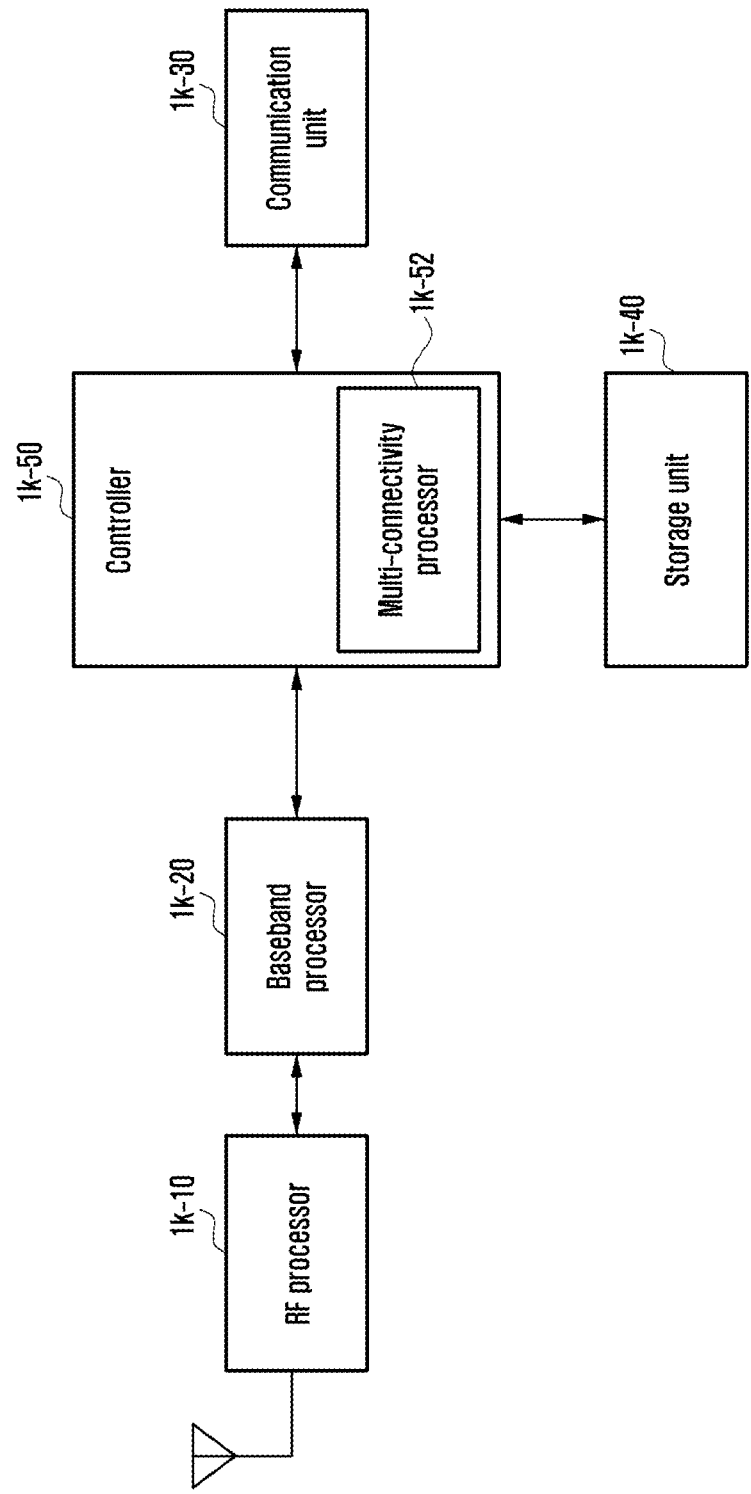
FIG. 1K illustrates a block diagram of a transmission reception point (TRP) in a wireless communication system related to an embodiment of the disclosure.

FIG. 1K illustrates a block diagram of a TRP in a wireless communication system to which an embodiment of the disclosure may be applied.

As shown in FIG. 1K, the base station is configured to include an RF processor 1*k*-10, a baseband processor 1*k*-20, a backhaul communication unit 1*k*-30, a storage unit 1*k*-40 and a controller 1*k*-50.

The RF processor 1*k*-10 performs a function for transmitting/receiving a signal through a radio channel, such as the band conversion and amplification of a signal. That is, the RF processor 1*k*-10 up-converts a baseband signal received from the baseband processor 1k-20 into an RF band signal, transmits the RF band signal through an antenna, and down-converts an RF band signal received through the antenna into a baseband signal. For example, the RF processor 1k-10 may include a transmission filter, a reception filter, an amplifier, a mixer, an oscillator, a DAC, and an ADC. In FIG. 1K, only one antenna has been illustrated, but the first access node may include multiple antennas. Furthermore, the RF processor 1k-10 may include multiple RF chains. Furthermore, the RF processor 1k-10 may perform beamforming. For the beamforming, the RF processor 1k-10 may adjust the phase and size of each of signals transmitted/received multiple antennas or antenna elements. The RF processor may perform a downlink MIMO operation by transmitting one or more layers.

The baseband processor 1k-20 performs a baseband signal and inter-bit stream conversion function based on the physical layer standard of a first radio access technology. For example, when data is transmitted, the baseband processor 1k-20 generates complex symbols by coding and modulating a transmission bit stream. Furthermore, when data is received, the baseband processor 1k-20 reconstructs a reception bit stream from a baseband signal received from the RF processor 1k-10 through demodulation and decoding. For example, if the OFDM scheme is applied, when data is transmitted, the baseband processor 1k-20 generates complex symbols by coding and modulating a transmission bit stream, maps the complex symbols to subcarriers, and configures OFDM symbols through IFFT operation and CP insertion. Furthermore, when data is received, the baseband processor 1k-20 segments a baseband signal received from the RF processor 1k-10 in an OFDM symbol unit, reconstructs signals mapped to subcarriers through FFT operation, and then reconstructs a reception bit stream through demodulation and decoding. The baseband processor 1k-20 and the RF processor 1k-10 transmit and receive signals as described above. Accordingly, the baseband processor 1k-20 and the RF processor 1k-10 may be called a transmitter, a receiver, a transceiver, a backhaul communication unit or a wireless backhaul communication unit.

The backhaul communication unit 1k-30 provides an interface for performing communication with other nodes within a network.

The storage unit 1k-40 stores data, such as a basic program, an application program, and configuration information for the operation of the base station. Specifically, the storage unit 1k-40 may store information on a bearer allocated to an accessed UE and measurement results reported by an accessed UE. Furthermore, the storage unit 1k-40 may store information, that is, a criterion by which whether to provide a UE with multiple connections is determined. Furthermore, the storage unit 1k-40 provides stored data in response to a request from the controller 1k-50.

The controller 1k-50 controls an overall operation of the primary base station. For example, the controller 1k-50 transmits/receives a signal through the baseband processor 1k-20 and the RF processor 1k-10 or through the backhaul communication unit 1k-30. Furthermore, the controller 1k-50 writes data in the storage unit 1k-40 and reads data from the storage unit 1k-40. To this end, the controller 1k-50 may include at least one processor. Furthermore, the controller 1k-50 may include a multi-connectivity processor 1k-52 configured to perform processing for an operation in a multi-connection mode.

Second Embodiment

Figure 2A:
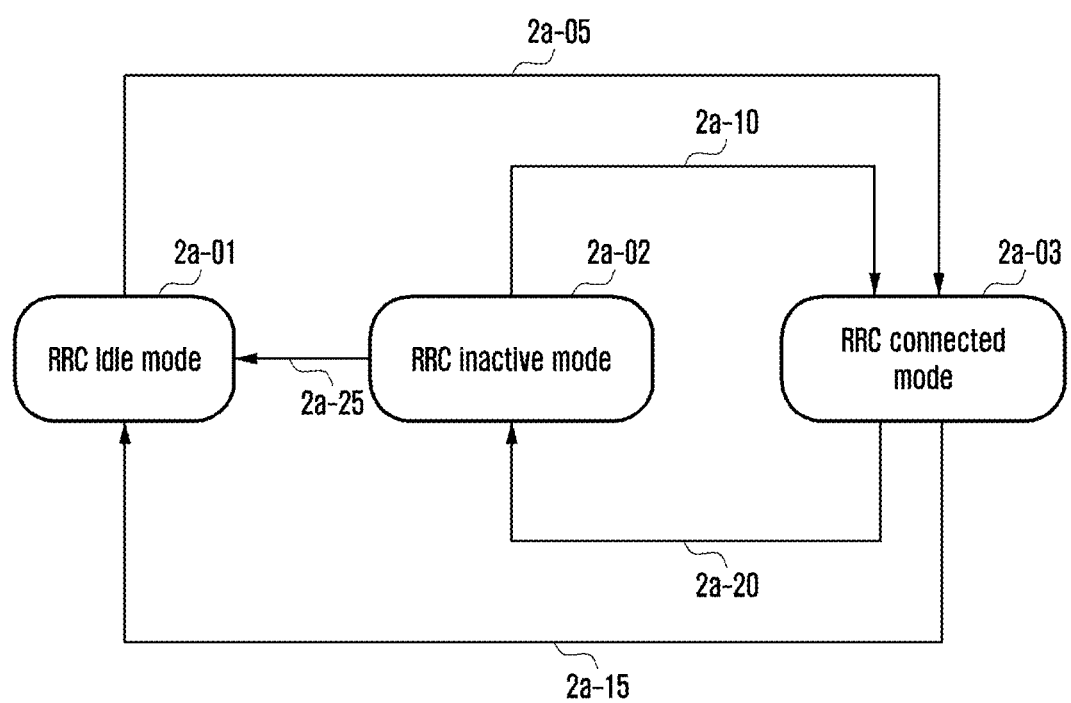
FIG. 2A illustrates a diagram of modes in which a terminal may stay in a next-generation mobile communication system related to an embodiment of the disclosure.

FIG. 2A illustrates a diagram of modes in which a terminal may stay in a next-generation mobile communication system related to an embodiment of the disclosure.

In FIG. 2A, the terminal may stay in an RRC connected mode 2a-03 or an RRC inactive mode 2a-02 or an RRC idle mode 2a-01, and may experience processes 2a-05, 2a-10, 2a-15, 2a-20 and 2a-25 of switching to different modes. That is, if data to be transmitted in uplink is generated or a paging message is received due to the arrival of downlink data or in order to transmit and receive data by setting up a connection with a network so as to update a tracking area or RAN paging area (periodically or if the terminal deviates from a tracking area), the terminal in the RRC idle mode 2a-01 may switch to the RRC connected mode 2a-03 (2a-05). In the above description, if a RAN paging area is updated, the terminal may perform the update by exchanging messages while maintaining the RRC inactive mode. If data is not generated for a give time after data is transmitted and received, the terminal in the RRC connected mode may switch to the RRC idle mode by a network (2a-15). Furthermore, if data is not generated for a give time, the terminal in the RRC connected mode 2a-03 may switch to the RRC inactive mode 2a-02 (2a-20) by changing a mode by a network or autonomously for the purpose of a battery power reduction and supporting a fast connection (e.g., when a timer value set by a network expires).

If data to be transmitted in uplink is generated or a paging message is received due to the arrival of downlink data or in order to transmit and receive data by setting up a connection with a network so as to update a tracking area (or a RAN Notification area) (periodically or if the terminal deviates from a tracking area (or RAN Notification area)), the terminal in the RRC inactive mode 2a-03 may switch to the RRC connected mode 2a-03 (2a-10). The terminal in the RRC inactive mode 2a-03 may change the mode to the RRC idle mode 2a-01 in response to an instruction from a network or according to a pre-agreed configuration or autonomously (e.g., when a timer value set by a network expires) (2a-25). The above operation is an operation that needs to be supported because signaling overhead of a network may be increased due to frequent RAN Notification area update procedures if many terminals in the RRC inactive mode are present in the network. A terminal having a given object may transmit data even in RRC inactive mode 2a-03 even without switching to the RRC connected mode, may repeatedly switch between only the RRC inactive mode and the RRC idle mode in response to an instruction from a network, and may switch to the RRC connected mode, in the case of need.

The procedure has an advantage in that the terminal in the RRC inactive mode can have very short transmission latency and very small signaling overhead by transmitting data in the RRC inactive mode. In the above description, the given object may correspond to a case where a terminal periodically transmits data intermittently or in a very long cycle if the terminal attempts to transmit only small data. Furthermore, the terminal in the RRC idle mode 2a-01 may immediately switch to the RRC inactive mode 2a-03 by a network, and may switch to the RRC connection mode and then to the RRC inactive mode (2a-03, 2a-20).

In the above description, when the terminal switches between modes, an additional timer (or inactive timer) may be configured in the terminal in order to solve a state mismatch problem between a mode of the terminal and a mode of the terminal recognized by a network. Furthermore, an additional timer may also be driven in a base station.

Figure 2B:
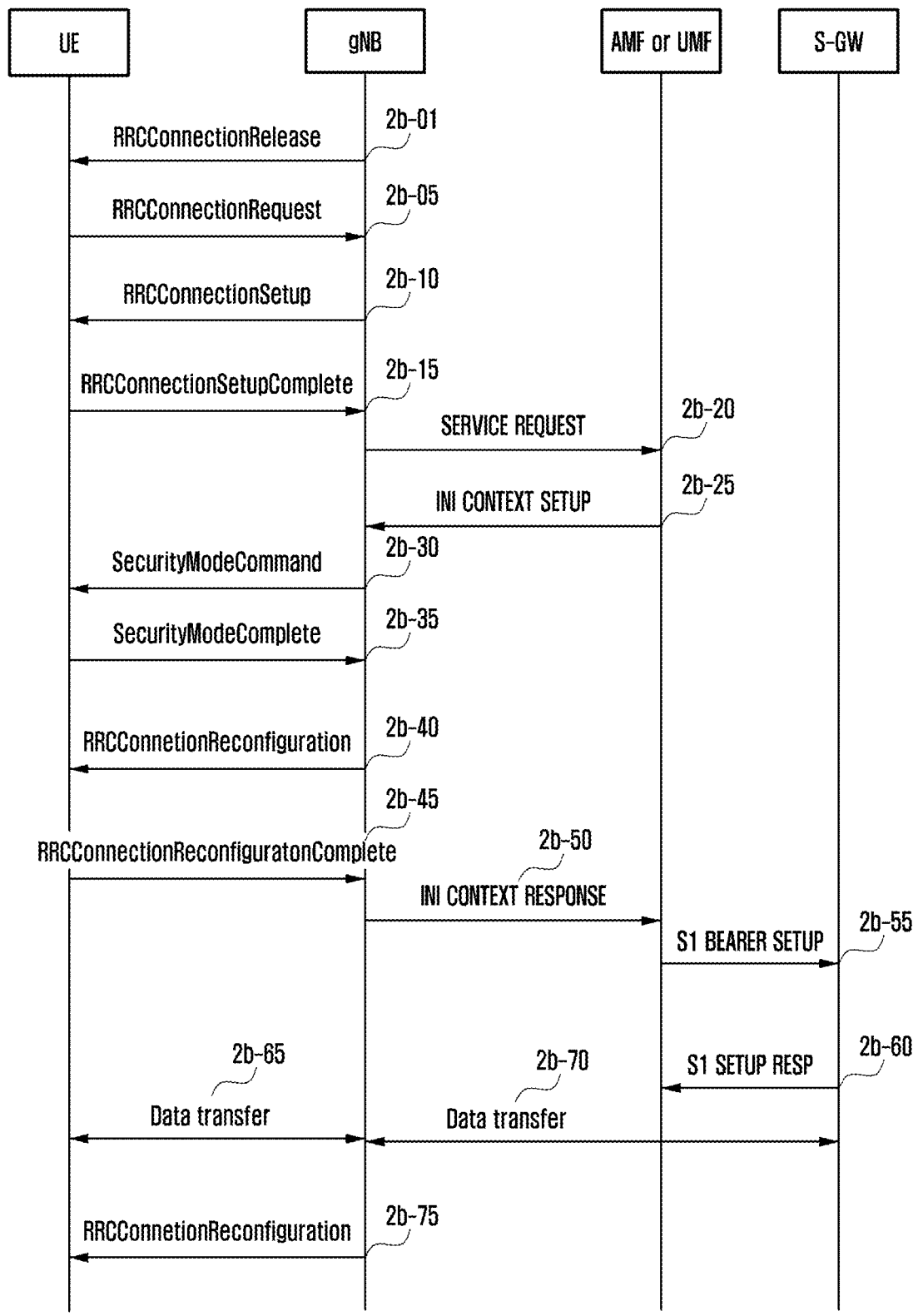
FIG. 2B illustrates a diagram of a procedure for a terminal to switch from an RRC connected mode to an RRC idle mode and a procedure for a terminal to switch from an RRC idle mode to an RRC connected mode, which are related to an embodiment of the disclosure.

FIG. 2B illustrates a diagram of a procedure for a terminal to switch from an RRC connected mode to an RRC idle mode and a procedure for a terminal to switch from an RRC idle mode to an RRC connected mode in the disclosure.

In FIG. 2B, if a terminal that transmits and receives data in an RRC connected mode does not perform the transmission and reception of data for a given cause or for a given time, a base station may transmit an RRCConnectionRelease message to the terminal so that the terminal switches to an RRC idle mode (2b-01). Thereafter, if a terminal (hereinafter an idle mode UE) for which a connection has not been currently set up has data to be transmitted, the terminal performs an RRC connection setup process with the base station. The terminal sets up reverse direction transmission synchronization with the base station through a random access process, and transmits an RRCConnectionRequest message to the base station (2b-05). The message contains the ID of the terminal and a cause (establishmentCause) for setting up a connection.

The base station transmits an RRCConnectionSetup message to the terminal so that the terminal sets up an RRC connection (2b-10). The message contains RRC connection setup information. The RRC connection is also called a signaling radio bearer (SRB), and is used to transmit and receive RRC messages, that is, control messages between the terminal and the base station. The terminal that has set up the RRC connection transmits an RRCConnetionSetupComplete message to the base station (2b-15). The message includes a control message called SERVICE REQUEST that the terminal requests a bearer setup for a given service from an MME. The base station transmits, to the MME, the SERVICE REQUEST message included in the RRCConnetionSetupComplete message (2b-20). The MME determines whether to provide the service requested by the terminal. If, as a result of the determination, the MME has determined to provide the service requested by the terminal, the MME transmits, to the base station, a message called INITIAL CONTEXT SETUP REQUEST (2b-25). The message includes information, such as quality of service (QoS) information to be applied when a data radio bearer (DRB) is configured and security-related information (e.g., Security Key, Security Algorithm) to be applied to the DRB. The base station exchanges a SecurityModeCommand message 2b-30 and a SecurityModeComplete message 2b-35 in order to set up security with the terminal.

When the security setting is completed, the base station transmits an RRCConnectionReconfiguration message to the terminal (2b-40). The message includes configuration information of a DRB in which user data will be process. The terminal configures a DRB by applying the information, and transmits an RRCConnectionReconfigurationComplete message to the base station (2b-45). The base station that has completed the DRB configuration with the terminal transmits an INITIAL CONTEXT SETUP COMPLETE message to the MME (2b-50). The MME that has received the message exchanges an S1 BEARER SETUP message and an S1 BEARER SETUP RESPONSE message in order to set up an S1 bearer with an S-GW (2b-055, 2b-60). The S1 bearer is a connection for data transmission set up between the S-GW and the base station, and corresponds to a DRB in a one-to-one manner. When the process is completed, the terminal transmits and receives data to and from the base station through the S-GW (2b-65, 2b-70). As described above, a common data transmission process is basically configured with three steps of RRC connection setup, a security configuration, and DRB setup. Furthermore, the base station may transmit an RRCConnectionReconfiguration message in order to newly provide a configuration in the terminal or to add or change a configuration for a given cause (2b-75).

In the bearer setup, a bearer may be meant to include an SRB and a DRB. The SRB refers to a signaling radio bearer that transmits a control message (RRC message), and the DRB refers to a data radio bearer that transmits data. Furthermore, a UM DRB means a DRB that uses an RLC layer apparatus operating in a unacknowledged mode (UM) mode. An AM DRB means a DRB using an RLC layer apparatus operating in an acknowledged mode (AM).

As described above, in order to switch from the RRC idle mode to the RRC connected mode, many signaling procedures are necessary. Accordingly, in a next-generation mobile communication system, an RRC inactive mode may be newly defined. In such a new mode, a terminal and a base station may store the context of the terminal and may maintain an S1 bearer if necessary. Accordingly, a terminal and a base station can be accessed more rapidly through a less signaling procedure.

Figure 2C:
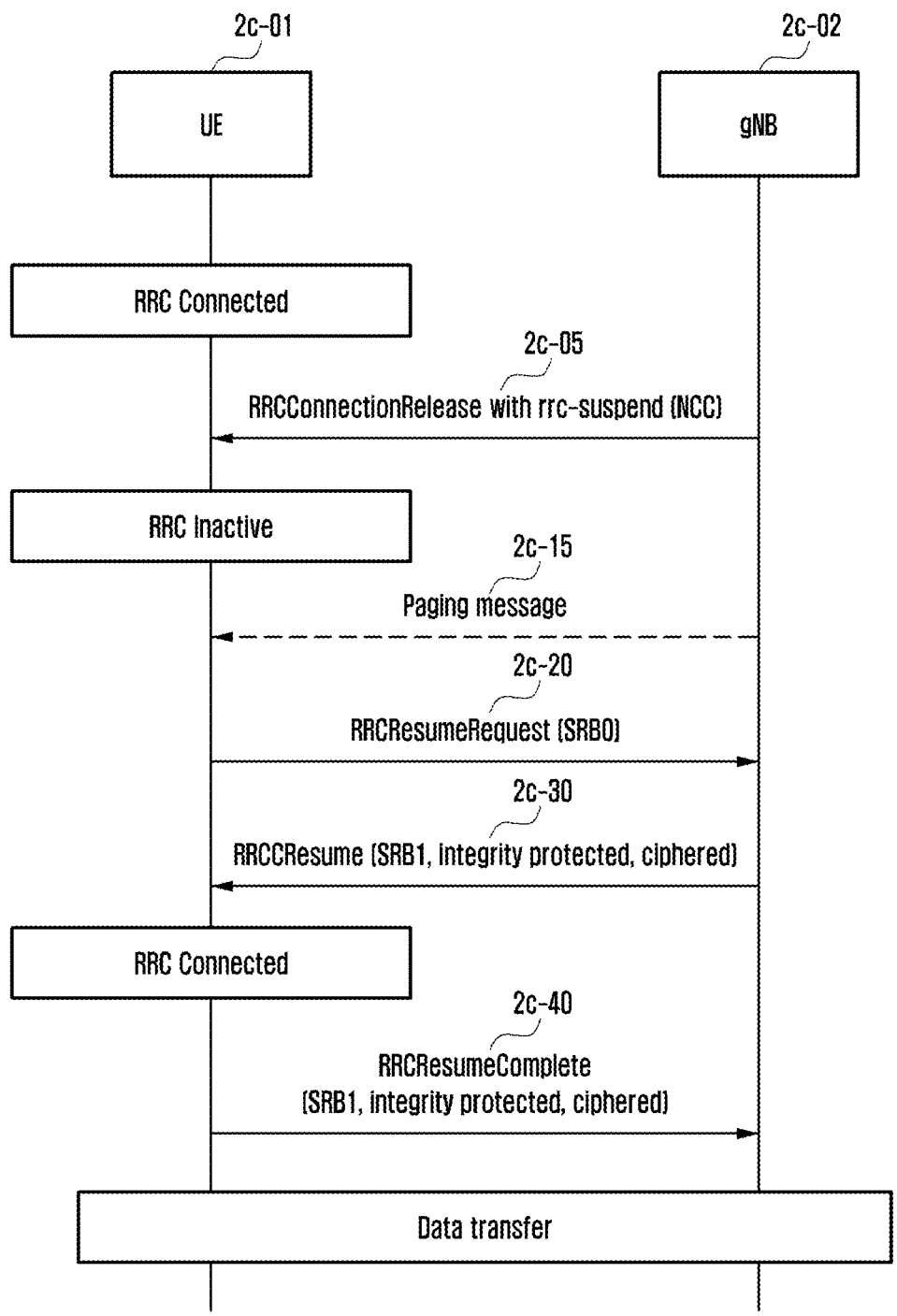
FIG. 2C illustrates a diagram of a terminal mode switching indication method of a network according to an embodiment of the disclosure.

FIG. 2C illustrates a diagram of a terminal mode switching indication method of a network proposed in the disclosure.

Specifically, the disclosure proposes that a network defines and uses different indicators of an RRCConnectionRelease message and changes the modes of different terminals (e.g., an NB-IoT terminal or a common terminal) to an RRC idle mode or an RRC suspension mode (or suspended state/mode) or an RRC inactive mode and a data processing method of a corresponding protocol layer.

A terminal described in FIG. 2C may refer to several wireless devices, such as an NB-IoT terminal or a common terminal or an MTC terminal.

In FIG. 2C, a base station may change the RRC connected mode of the terminal 2c-01 to an RRC mode by transmitting an RRC message 2c-05 for a given cause. In the above description, the given cause may result from scheduling for using an efficient transmission resource of a network or may correspond to a case where downlink data toward the terminal or uplink data has not been generated or is not expected to be generated for a while.

In the above description, the base station (network) may define and use a connection release cause (releaseCause) in order to indicate that the terminal switches to an RRC idle mode or an RRC suspension mode (or suspended state/mode) or an RRC inactive mode.

Specifically, if a connection release cause indicates others, it may indicate that the terminal switches to the RRC idle mode. In the above description, if the connection release cause is RRC connection suspension (rrc-Suspend), it may indicate that the terminal switches to an RRC suspension mode or an RRC inactive mode. Furthermore, the base station may define and use configuration information (rrc-InactiveConfig) for the RRC inactive mode.

When the terminal receives the RRCConnectionRelease message, if the connection release cause (releaseCause) is RRC connection suspension (rrc-Suspend) and configuration information (rrc-InactiveConfig) for the RRC inactive mode is not present, the terminal may switch to the RRC suspension mode and perform a corresponding operation of a protocol layer apparatus.

However, when the terminal receives the RRCConnectionRelease message, if the connection release cause (releaseCause) is RRC connection suspension (rrc-Suspend) and configuration information (rrc-InactiveConfig) for the RRC inactive mode is included, the terminal switches to the RRC inactive mode and perform a corresponding operation of a protocol layer apparatus.

As proposed in the above description, in the disclosure, a network can change the mode of a terminal to an RRC idle mode or an RRC suspension mode (or suspended state/mode) or an RRC inactive mode based on a connection release cause (releaseCause) included in an RRCConnectionRelease message and configuration information (rrc-InactiveConfig) for an RRC inactive mode.

The disclosure proposes an efficient operation of the protocol layer apparatus of a terminal when the RRC mode of the terminal switches based on a connection release cause (releaseCause) included in the RRCConnectionRelease message 2c-05 and configuration information (rrc-InactiveConfig) for an RRC inactive mode.

When the RRCConnectionRelease message is received, if the connection release cause (releaseCause) is RRC connection suspension (rrc-Suspend) and configuration information (rrc-InactiveConfig) for an RRC inactive mode is included, a terminal performs the following operations and switches to the RRC inactive mode.

As another method, if configuration information (rrc-InactiveConfig) for an RRC inactive mode is included in the RRCConnectionRelease message, a terminal performs the following operations and switches to the RRC inactive mode. That is, the terminal may perform the following procedures if configuration information (rrc-InactiveConfig) for an RRC inactive mode is included although a connection release cause (releaseCause) is not RRC connection suspension (rrc-Suspend).

As yet another method, a terminal may perform the following procedures when receiving an indication to switch to an RRC inactive mode from a base station.

May store a connection resume identifier (a full connection resume identifier (full I-radio network temporary identifier (RNTI)) or a short connection resume identifier (short I-RNTI), a value (NextchiningCount (NCC)) for deriving a security key or a period value for RAN paging calculation.

May reset a MAC layer apparatus in order to prevent data, stored in the buffer of the MAC layer apparatus, from being unnecessarily HARQ-retransmitted (MAC reset). In the above description, the procedure of resetting the MAC layer apparatus may include a procedure of discarding stored data (MAC SDU or MAC PDU), flushing and resetting an HARQ buffer, resetting an HARQ processor identifier or a related timer or resetting a logical channel identifier.

When a terminal subsequently sets up a reconnection with a network, it may receive an RRCResume message through an SRB1 and transmit an RRCResumeComplete message. Accordingly, if data stored in the RLC layer apparatus is present, in order to prevent unnecessary retransmission and for the efficiency of buffer management, the terminal may discard the stored data (e.g., RLC SDU or RLC SDU segment or RLC PDU) and reset RLC window state parameters (e.g., transmission window parameters or reception window parameters), and may perform an RLC layer apparatus re-establishment (RLC re-establishment) procedure on the SRB1. Furthermore, if data stored in the RLC layer apparatus is present with respect to other SRBs and DRBs, in order to prevent unnecessary retransmission and efficiency of buffer management, the terminal may discard the stored data (e.g., RLC SDU or RLC SDU segment or RLC PDU), and may perform an RLC layer apparatus re-establishment procedure on other SRBs and DRBs so that RLC window state parameters (e.g., transmission window parameters or reception window parameters) are reset. In the above description, the RLC layer apparatus re-establishment procedure performed on other SRBs and DRBs may be performed after the terminal receives an RRCResume message when attempting a reconnection with a network. However, in order to maximize efficiency of buffer management, when an RRCRelease message is received, an RLC layer apparatus re-establishment procedure may be performed on other SRBs and DRBs (i.e., a network may determine an RLC re-establishment procedure indication for each bearer through an indicator).

The terminal may store current terminal context. The terminal context may include RRC configuration information, security setting information, the ROHC context of a PDCP layer apparatus, configuration information of an SDAP layer apparatus, a cell identifier (C-RNTI), etc.

When the procedure is completed, bearers (SRB or the DRB) other than an SRB0 may be suspended because the SRB0 is a bearer that needs to always transmit a message without a security procedure in a random access procedure.

In the above description, the data discard and parameter setting of the PDCP layer apparatus may be performed because data processing has been suspended by suspending bearers. Accordingly, the terminal indicates or triggers a PDCP layer apparatus resetting procedure or suspension procedure (PDCP reset or PDCP suspend) for the PDCP layer apparatus of DRBs. The resetting procedure or suspension procedure of the PDCP layer apparatus may be applied to an AM DRB. The terminal may previously perform a procedure, such as parameter resetting and data discard, in the same manner although the resetting procedure or suspension procedure is applied to a UM DRB. Accordingly, the resetting procedure or suspension procedure may be expanded and applied to a UM DRB (or SRB).

In the above description, the PDCP layer apparatus resetting procedure or suspension procedure (PDCP reset or PDCP suspend) may be materialized as follows, and some or all of the following procedures may be performed.

A terminal may reset a COUNT value used in a security key, and may reset a transmission window state parameter (TX_NEXT) to an initial value so that parameter synchronization with a base station can be performed upon performing a subsequent reconnection with a network.

In order to discard long data for an efficient buffer operation, a terminal may discard data (e.g., PDCP PDU) stored in a transmission PDCP layer apparatus.

If data (e.g., PDCP SDUs) whose COUNT value has already been allocated is stored in a transmission PDCP layer apparatus (i.e., if data has not yet been discarded because a PDCP data discard timer has not expired or a PDCP state report has not been received), a terminal may consider the stored data (e.g., PDCP SDUs) to be data newly received from a higher layer, and may newly assign COUNT values (e.g., may use a TX_NEXT value, that is, a transmission state parameter) sequentially in ascending order from the above reset COUNT value (e.g., from 0) (the reason for this is that an error occurs in the reception stage if data ciphered based on a previously assigned COUNT value is transmitted). As described above, a terminal may receive an RRCRelease message and perform the proposed procedure. However, in order to resume an RRC connection, a terminal may perform an RRC connection resume procedure, may receive an RRCResume message from a base station, and may perform the proposed procedure while performing a PDCP re-establishment procedure. As proposed in the disclosure, however, if a procedure of newly assigning a reset COUNT value is performed when an RRCRelease message is received, there is an advantage in that the above-described procedure can be previously performed prior to connection resumption. Data newly allocated based on the reset COUNT value may be transmitted and retransmitted when a terminal receives an RRCResume message and performs a PDCP re-establishment procedure. The procedure may be applied to the UM DRB or AM DRB of a terminal. Furthermore, in the procedure, if a PDCP discard timer of a transmission PDCP layer apparatus has been set in each of the data, the PDCP discard timer is not suspended or reset. When the PDCP discard timer that is basically driven expires, corresponding data may be discarded. Accordingly, unnecessary transmission can be prevented by discarding data based on a valid period of each datum.

As another method, in order to prevent transmission resource waste and unnecessary retransmission, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider only data whose successful delivery (RLC ACK) from a lower layer apparatus has not been confirmed, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). As described above, a terminal may receive an RRCRelease message and perform the proposed procedure. However, in order to resume an RRC connection, a terminal may perform an RRC connection resume procedure, may receive an RRCResume message from a base station, and may perform the proposed procedure while performing a PDCP re-establishment procedure. As proposed in the disclosure, however, if a procedure of newly assigning a reset COUNT value is performed when an RRCRelease message is received, there is an advantage in that the above-described procedure can be previously performed prior to connection resumption. Data newly allocated based on the reset COUNT value may be transmitted and retransmitted when a terminal receives an RRCResume message and performs a PDCP re-establishment procedure. The procedure may be applied to the UM DRB or AM DRB of a terminal. Furthermore, in the procedure, if a PDCP discard timer of a transmission PDCP layer apparatus has been set in each of the data, the PDCP discard timer is not suspended or reset. When the PDCP discard timer that is basically driven expires, corresponding data may be discarded. Accordingly, unnecessary transmission can be prevented by discarding data based on a valid period of each datum.

As yet another method, in order to prevent transmission resource waste and unnecessary retransmission, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider data (e.g., PDCP SDUs) having a COUNT value or PDCP serial number equal to or greater than that of the first data (e.g., data having the smallest COUNT value or data having the smallest PDCP serial number) whose successful delivery (RLC ACK) from a lower layer apparatus has not been confirmed, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). As described above, a terminal may receive an RRCRelease message and perform the proposed procedure. However, in order to resume an RRC connection, a terminal may perform an RRC connection resume procedure, may receive an RRCResume message from a base station, and may perform the proposed procedure while performing a PDCP re-establishment procedure. As proposed in the disclosure, however, if a procedure of newly assigning a reset COUNT value is performed when an RRCRelease message is received, there is an advantage in that the above-described procedure can be previously performed prior to connection resumption. Data newly allocated based on the reset COUNT value may be transmitted and retransmitted when a terminal receives an RRCResume message and performs a PDCP re-establishment procedure. The procedure may be applied to the UM DRB or AM DRB of a terminal. Furthermore, in the procedure, if a PDCP discard timer of a transmission PDCP layer apparatus has been set in each of the data, the PDCP discard timer is not suspended or reset. When the PDCP discard timer that is basically driven expires, corresponding data may be discarded. Accordingly, unnecessary transmission can be prevented by discarding data based on a valid period of each datum.

As yet another method, in order to prevent transmission resource waste and unnecessary retransmission, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider data not yet delivered from a lower layer apparatus, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). As described above, a terminal may receive an RRCRelease message and perform the proposed procedure.

However, in order to resume an RRC connection, a terminal may perform an RRC connection resume procedure, may receive an RRCResume message from a base station, and may perform the proposed procedure while performing a PDCP re-establishment procedure. As proposed in the disclosure, however, if a procedure of newly assigning a reset COUNT value is performed when an RRCRelease message is received, there is an advantage in that the above-described procedure can be previously performed prior to connection resumption. Data newly allocated based on the reset COUNT value may be transmitted and retransmitted when a terminal receives an RRCResume message and performs a PDCP re-establishment procedure. The procedure may be applied to the UM DRB or AM DRB of a terminal. Furthermore, in the procedure, if a PDCP discard timer of a transmission PDCP layer apparatus has been set in each of the data, the PDCP discard timer is not suspended or reset. When the PDCP discard timer that is basically driven expires, corresponding data may be discarded. Accordingly, unnecessary transmission can be prevented by discarding data based on a valid period of each datum.

As yet another method, in order to prevent the transmission resource waste and unnecessary retransmission of an AM DRB, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider only data whose successful delivery (RLC ACK) from a lower layer apparatus has not been confirmed, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). Furthermore, in order to prevent the transmission resource waste and unnecessary retransmission of a UM DRB, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider only data not yet delivered from a lower layer apparatus, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). As described above, a terminal may receive an RRCRelease message and perform the proposed procedure. However, in order to resume an RRC connection, a terminal may perform an RRC connection resume procedure, may receive an RRCResume message from a base station, and may perform the proposed procedure while performing a PDCP re-establishment procedure. As proposed in the disclosure, however, if a procedure of newly assigning a reset COUNT value is performed when an RRCRelease message is received, there is an advantage in that the above-described procedure can be previously performed prior to connection resumption. Data newly allocated based on the reset COUNT value may be transmitted and retransmitted when a terminal receives an RRCResume message and performs a PDCP re-establishment procedure. The procedure may be applied to the UM DRB or AM DRB of a terminal. Furthermore, in the procedure, if a PDCP discard timer of a transmission PDCP layer apparatus has been set in each of the data, the PDCP discard timer is not suspended or reset. When the PDCP discard timer that is basically driven expires, corresponding data may be discarded. Accordingly, unnecessary transmission can be prevented by discarding data based on a valid period of each datum.

As yet another method, in order to prevent the transmission resource waste and unnecessary retransmission of an AM DRB, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider data (e.g., PDCP SDUs) having a COUNT value or PDCP serial number equal to or greater than that of the first data (e.g., data having the smallest COUNT value or data having the smallest PDCP serial number) whose successful delivery (RLC ACK) from a lower layer apparatus has not been confirmed, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). Furthermore, in order to prevent the transmission resource waste and unnecessary retransmission of a UM DRB, if data (e.g., PDCP SDUs) to which a COUNT value has already been assigned is stored in a transmission PDCP layer apparatus (if data has not yet been discarded because a PDCP data discard timer has not expired or a PDCP state report has not been received), a terminal may consider only data not yet delivered from a lower layer apparatus, among the data (e.g., PDCP SDUs), to be data newly received from a higher layer, and may newly assign COUNT values (e.g., may use a TX_NEXT value, that is, a transmission state parameter) sequentially in ascending order from the reset COUNT value (e.g., from 0) (the reason for this is that an error occurs in a reception stage if data ciphered based on a previously assigned COUNT value is transmitted). As described above, a terminal may receive an RRCRelease message and perform the proposed procedure. However, in order to resume an RRC connection, a terminal may perform an RRC connection resume procedure, may receive an RRCResume message from a base station, and may perform the proposed procedure while performing a PDCP re-establishment procedure. As proposed in the disclosure, however, if a procedure of newly assigning a reset COUNT value is performed when an RRCRelease message is received, there is an advantage in that the above-described procedure can be previously performed prior to connection resumption. Data newly allocated based on the reset COUNT value may be transmitted and retransmitted when a terminal receives an RRCResume message and performs a PDCP re-establishment procedure. The procedure may be applied to the UM DRB or AM DRB of a terminal. Furthermore, in the procedure, if a PDCP discard timer of a transmission PDCP layer apparatus has been set in each of the data, the PDCP discard timer is not suspended or reset. When the PDCP discard timer that is basically driven expires, corresponding data may be discarded. Accordingly, unnecessary transmission can be prevented by discarding data based on a valid period of each datum.

With respect to the reception PDCP layer apparatus, in order to rapidly deliver stored data (e.g., PDCP SDU or PDCP PDU) to a higher layer apparatus while a PDCP reordering timer operates, a terminal may suspend and reset a reception PDCP layer apparatus if the PDCP reordering timer operates. If the stored data has been header-compressed, the terminal may release header compression and deliver the data to a higher layer in ascending order of COUNT values.

A terminal may reset a COUNT value used in a security key, and may reset a reception window state parameter (e.g., RX_NEXT and RX_DELIV) to an initial value so that parameters can be synchronized with a base station upon performing a subsequent reconnection with a network.

If a reception PDCP layer apparatus receives data from a lower layer apparatus (RLC layer apparatus) by an RLC re-establishment procedure, a terminal may also decode the received data, may perform integrity verification if necessary, may release header compression if necessary, may suspend and reset a PDCP reordering timer, may align the data along with data to be transmitted to a higher layer in ascending order of COUNT values with the data is transmitted to a higher layer, and may transmit them (this is an operation useful if it is connected to EN-DC (LTE base station and NR base station) or if an NR PDCP layer apparatus is used in an LTE base station, that is, when the NR PDCP layer apparatus is connected to an LTE RLC layer apparatus and an LTE RLC layer apparatus is re-established).

When the procedure is completed, the terminal may report, to a higher layer apparatus (NAS layer apparatus), that the RRC connection has been suspended, and may switch to the RRC inactive mode.

When the terminal receives the RRCConnectionRelease message (2c-05), if the connection release cause indicates others or the connection release cause of the message is not RRC connection suspension (rrc-Suspend), the terminal may perform the following operations and switch to an RRC idle mode.

The terminal resets the MAC layer apparatus.
The terminal releases all radio transmission resources, releases MAC-related configuration information, releases the RLC layer apparatuses, releases the PDCP layer apparatuses, and releases the connection of bearers.
Furthermore, the terminal indicates, to a higher layer apparatus (NAS), that the RRC connection has been released, and switches to an RRC idle mode.

When the terminal receives the RRCConnectionRelease message (2c-05), if the connection release cause (releaseCause) is RRC connection suspension (rrc-Suspend) and configuration information (rrc-InactiveConfig) for an RRC inactive mode is not present, the terminal performs the following operations and switches to an RRC suspension mode.

The terminal resets the MAC layer apparatus.
The terminal re-establishes the RLC layer apparatus with respect to SRBs and DRBs.
The terminal stores terminal context (e.g., RRC configuration information, security setting information, ROHC context, a C-RNTI, or a cell identifier or physical cell identifier of a source cell).
The terminal stores a connection resume identifier (resumeIdentiy) or NCC (nextHopChainingCount) or ROHC context continuation use indicator (drb-ContinueROHC) stored in the RRCConnectionRelease message.
The terminal suspends SRBs and DRBs other than the SRB0.
The terminal suspends the RRC connection and reports, to a higher layer apparatus, that the RRC connection has been suspended.
The terminal suspends integrity protection or ciphering for a lower layer apparatus.

In the above description, the terminal that has switched to the RRC mode may perform connection resumption (RRC Connection resume procedure) with a network for a given cause. In the above description, the given cause may correspond to a case where the terminal receives a paging message (2c-15) or a case where uplink data is generated in the terminal. In order to perform connection resumption with a network due to the cause, the terminal may perform some of or all the following operations (actions related to transmission of the RRCResumeRequest message) before or when or after the terminal transmits an RRC Resume Request message 2c-20.

The terminal puts a stored connection resume identifier (full connection resume identifier (full I-RNTI) or short connection resume identifier (short I-RNTI)) into the RRCResumeRequest message, sets a connection resumption (resumeCause) cause, and derives and puts a connection resumption MAC-I based on a currently set security key.
The terminal restores RRC configuration and security setting information from stored terminal context, derives a new security key based on a value (NextchiningCount (NCC)) for deriving a security key, and applies the new security key to integrity protection and a ciphering algorithm with respect to bearers (other SRBs and DRBs) except the SRB0.
The terminal restores PDCP configuration information (e.g., ROHC context) of the PDCP layer apparatus, transmits the RRCResumeRequest message through the SRB0, and receives a response message (RRCResume) thereof through an SRB1. In order to perform integrity check or a deciphering procedure, the terminal may perform a PDCP re-establishment procedure on the SRB1 so that the derived new security key can be applied.
The terminal starts again (resumes) the SRB1 when the security key is updated according to the PDCP re-establishment procedure for the SRB1 (i.e., resume).

In the above description, the terminal may transmit the RRC Resume Request message 2c-20. In response thereto, the base station may transmit, to the terminal, an RRC Resume message or an RRCResume message 2c-30 having an rrc-suspend indicator. In the disclosure, when the base station transmits the RRCResume message 2c-30, it may generate and update a security key based on the NCC delivered to the terminal through the RRC message 2c-05 in order to enhance security, may perform a ciphering procedure on the RRC message 2c-30, may perform an integrity protection procedure, and may transmit the RRCRelease message.

When the terminal receives the RRCResume message 2c-30 from the base station, the terminal may perform some of or all the following procedures (Reception of the RRCResume by the UE).

- When the terminal receives the RRCResume message, it may restore the PDCP state of an SRB2 or all DRBs. In the above description, the PDCP state may include context or security key information for a header compression protocol (ROHC). Furthermore, when the terminal transmits the RRCResumeRequest message, in order to apply a newly derived key to a ciphering and integrity protection algorithm, the terminal may perform a PDCP re-establishment procedure on the SRB2 or all DRBs.
- The terminal discards the connection resume identifier or stored terminal context other than RAN Notification area information because it has received a response, indicating that the terminal can be connected to a network, through the RRCResume message.
- The terminal resumes or starts again the SRB2 or all DRBs. In the above description, the term "resume" may mean that the terminal starts data processing and transmission or reception again. In the above description, the term "suspend" may mean that the terminal suspends data processing and transmission or reception.
- The terminal enters an RRC connected mode, and may indicate, to a higher layer apparatus, that the suspended RRC connection has been resumed.
- The terminal terminates the connection resume procedure by transmitting an RRCResumeComplete message to the base station.

As described above, when the terminal receives the RRCResume message 2c-30, it switches to an RRC connected mode, transmits, to the base station, the RRCResumeComplete message 2c-40 indicating that RRC connection setup has been completed, and resumes data transmission and reception to and from the base station.

Figure 2D:
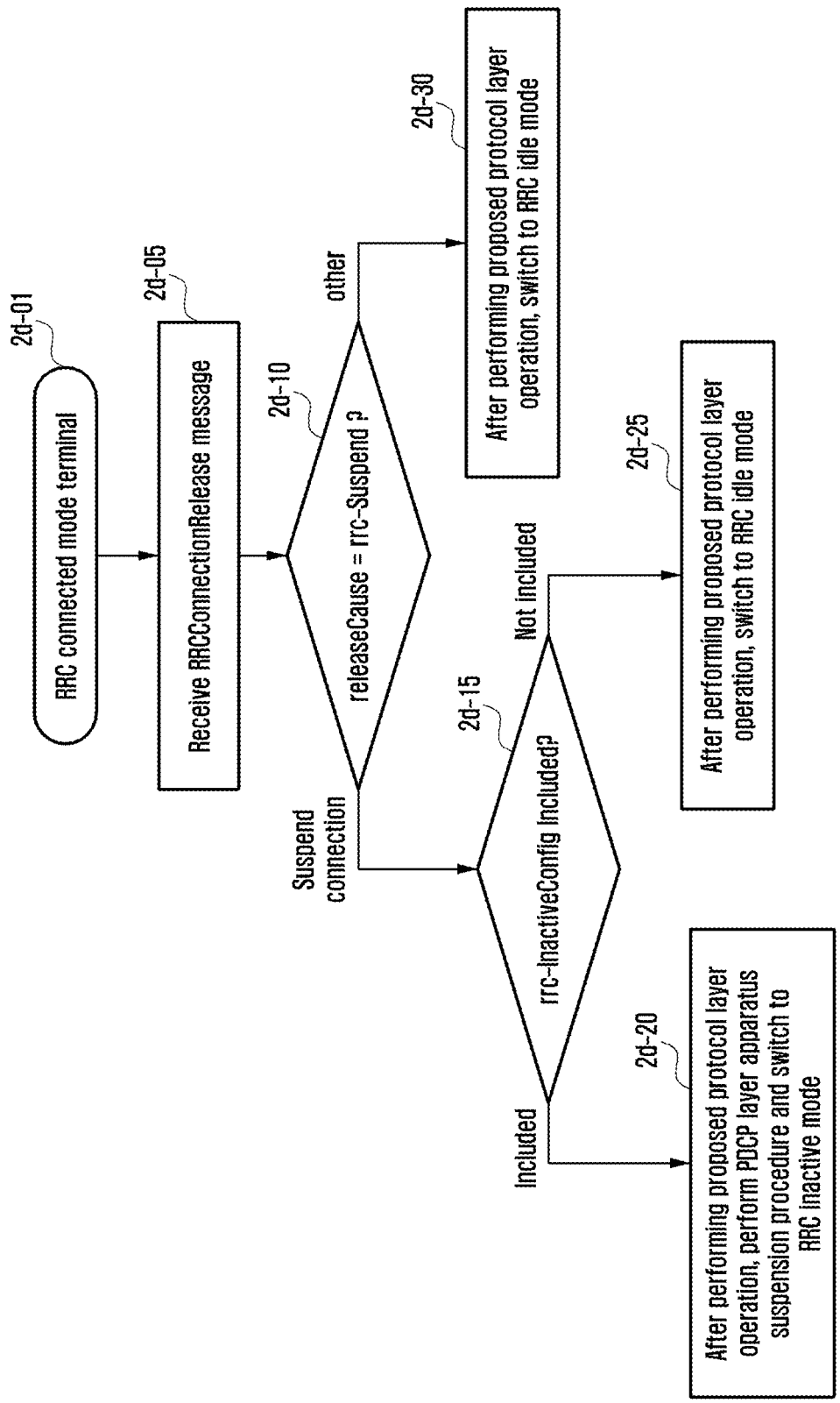
FIG. 2D illustrates a diagram of a terminal operation related to an embodiment of the disclosure.

FIG. 2D illustrates a diagram of a terminal operation proposed in the disclosure.

When an RRC connected mode terminal 2d-01 receives an RRCConnectionRelease message from a network (2d-05), the terminal performs a different procedure based on a connection release cause included in the message and whether configuration information for an RRC inactive mode has been included in the message, and switches to a different RRC mode.

When the terminal receives the RRCConnectionRelease message, if the connection release cause (releaseCause) is RRC connection suspension (rrc-Suspend) (2d-10) and configuration information (rrc-InactiveConfig) for an RRC inactive mode is included in the message (2d-15), the terminal performs the following operations and switches to an RRC inactive mode (2d-20).

- The terminal may store a connection resume identifier (full connection resume identifier (full I-RNTI) or short connection resume identifier (short I-RNTI)), a value (NextchiningCount (NCC)) for deriving a security key or a period value for RAN paging calculation.
- The terminal may reset the MAC layer apparatus (MAC reset) in order to prevent HARQ retransmission from being unnecessarily performed on data stored in the buffer of the MAC layer apparatus. In the above description, the procedure of resetting the MAC layer apparatus may include a procedure of discarding stored data (e.g., MAC SDU or MAC PDU), flushing and resetting an HARQ buffer, and resetting an HARQ processor identifier or a related timer or a logical channel identifier.
- When the terminal subsequently sets up a reconnection with a network, the terminal may receive an RRCResume message through an SRB1 and transmit an RRCResumeComplete message. If the terminal has data stored in the RLC layer apparatus, in order to prevent unnecessary retransmission and for the purpose of efficiency of buffer management, the terminal may discard the stored data (e.g., RLC SDU or RLC SDU segment or RLC PDU), and may perform an RLC layer apparatus re-establishment procedure on the SRB1 so that RLC window state parameters (e.g., transmission window parameters or reception window parameters) are reset. Furthermore, if the terminal has data stored in the RLC layer apparatus with respect to other SRBs and DRBs, in order to prevent unnecessary retransmission and for the purpose of efficiency of buffer management, the terminal may discard the stored data (e.g., RLC SDU or RLC SDU segment or RLC PDU), and may perform an RLC layer apparatus re-establishment (RLC re-establishment) procedure on other SRBs and DRBs so that RLC window state parameters (e.g., transmission window parameters or reception window parameters) are reset. In the above description, the RLC layer apparatus re-establishment procedure performed on other SRBs and DRBs may be performed after the terminal receives an RRCResume message when it subsequently attempts a reconnection with a network. However, in order to maximize efficiency of buffer management, the terminal may perform the RLC layer apparatus re-establishment procedure on other SRBs and DRBs when it receives an RRCRelease message (a network may determine an RLC re-establishment procedure indication for each bearer through an indicator).
- The terminal may store current terminal context. The terminal context may include RRC configuration information, security setting information, the ROHC context of a PDCP layer apparatus, configuration information of an SDAP layer apparatus, a cell identifier (C-RNTI), etc.
- When the procedure is completed, the terminal may suspend bearers (e.g., SRB or DRB) other than an SRB0 because the SRB0 is a bearer that should always transmit a message without a security procedure in a random access procedure.
- In the above description, the terminal may perform the data discard and parameter resetting of the PDCP layer apparatus because data processing has been suspended by suspending the bearers. Accordingly, the terminal indicates or triggers a PDCP layer apparatus resetting procedure or suspension procedure (PDCP reset or PDCP suspend) for the PDCP layer apparatus of DRBs. The PDCP layer apparatus resetting procedure or suspension procedure may be applied to an AM DRB. The terminal may extend the PDCP layer apparatus resetting procedure or suspension procedure and apply it to a UM DRB (or SRB) because the terminal can previously perform a procedure, such as parameter resetting and data discard, in the same manner although the PDCP layer apparatus resetting procedure or suspension procedure is applied to a UM DRB.

In the above description, the PDCP layer apparatus resetting procedure or suspension procedure (PDCP reset or PDCP suspend) may be materialized as follows, and some or all of the following procedures may be performed.

A terminal may reset a COUNT value used in a security key, and may reset a transmission window state parameter (TX_NEXT) to an initial value so that parameter synchronization with a base station can be performed upon performing a subsequent reconnection with a network.

In order to discard long data for an efficient buffer operation, a terminal may discard data (e.g., PDCP PDU) stored in a transmission PDCP layer apparatus.

In order to rapidly deliver stored data (e.g., PDCP SDU or PDCP PDU) to a higher layer apparatus while a PDCP reordering timer operates, a terminal may suspend and reset a reception PDCP layer apparatus if the PDCP reordering timer operates. If the stored data has been header-compressed, the terminal may release header compression and deliver the data to a higher layer in ascending order of COUNT values.

A terminal may reset a COUNT value used in a security key, and may reset a reception window state parameter (e.g., RX_NEXT and RX_DELIV) to an initial value so that parameters can be synchronized with a base station upon performing a subsequent reconnection with a network.

If a reception PDCP layer apparatus receives data from a lower layer apparatus (RLC layer apparatus) by an RLC re-establishment procedure, a terminal may also decode the received data, may perform integrity verification if necessary, may release header compression if necessary, may suspend and reset a PDCP reordering timer, may align the data along with data to be transmitted to a higher layer in ascending order of COUNT values with the data is transmitted to a higher layer, and may transmit them (this is an operation useful if it is connected to EN-DC (LTE base station and NR base station) or if an NR PDCP layer apparatus is used in an LTE base station, that is, when the NR PDCP layer apparatus is connected to an LTE RLC layer apparatus and an LTE RLC layer apparatus is re-established).

When the procedure is completed, the terminal may report, to a higher layer apparatus (NAS layer apparatus), that the RRC connection has been suspended, and may switch to the RRC inactive mode.

When the terminal receives the RRCConnectionRelease message (2d-05), if the connection release cause indicates others (2d-10) or the connection release cause of the message is not RRC connection suspension (rrc-Suspend), the terminal may perform the following operations and switch to an RRC idle mode (2d-30).

The terminal resets the MAC layer apparatus.

The terminal releases all radio transmission resources, releases MAC-related configuration information, releases the RLC layer apparatuses, releases the PDCP layer apparatuses, and releases the connection of bearers.

Furthermore, the terminal indicates, to a higher layer apparatus (NAS), that the RRC connection has been released, and switches to an RRC idle mode.

When the terminal receives the RRCConnectionRelease message (2c-05), if the connection release cause (releaseCause) is RRC connection suspension (rrc-Suspend) (2d-10) and configuration information (rrc-InactiveConfig) for an RRC inactive mode is not present (2d-15), the terminal performs the following operations and switches to an RRC suspension mode (2d-25).

The terminal resets the MAC layer apparatus.

The terminal re-establishes the RLC layer apparatus with respect to SRBs and DRBs.

The terminal stores terminal context (e.g., RRC configuration information, security setting information, ROHC context, a C-RNTI, or a cell identifier or physical cell identifier of a source cell).

The terminal stores a connection resume identifier (resumeIdentiy) or NCC (nextHopChainingCount) or ROHC context continuation use indicator (drb-ContinueROHC) stored in the RRCConnectionRelease message.

The terminal suspends SRBs and DRBs other than the SRB0.

The terminal suspends the RRC connection and reports, to a higher layer apparatus, that the RRC connection has been suspended.

The terminal suspends integrity protection or ciphering for a lower layer apparatus.

Figure 2E:
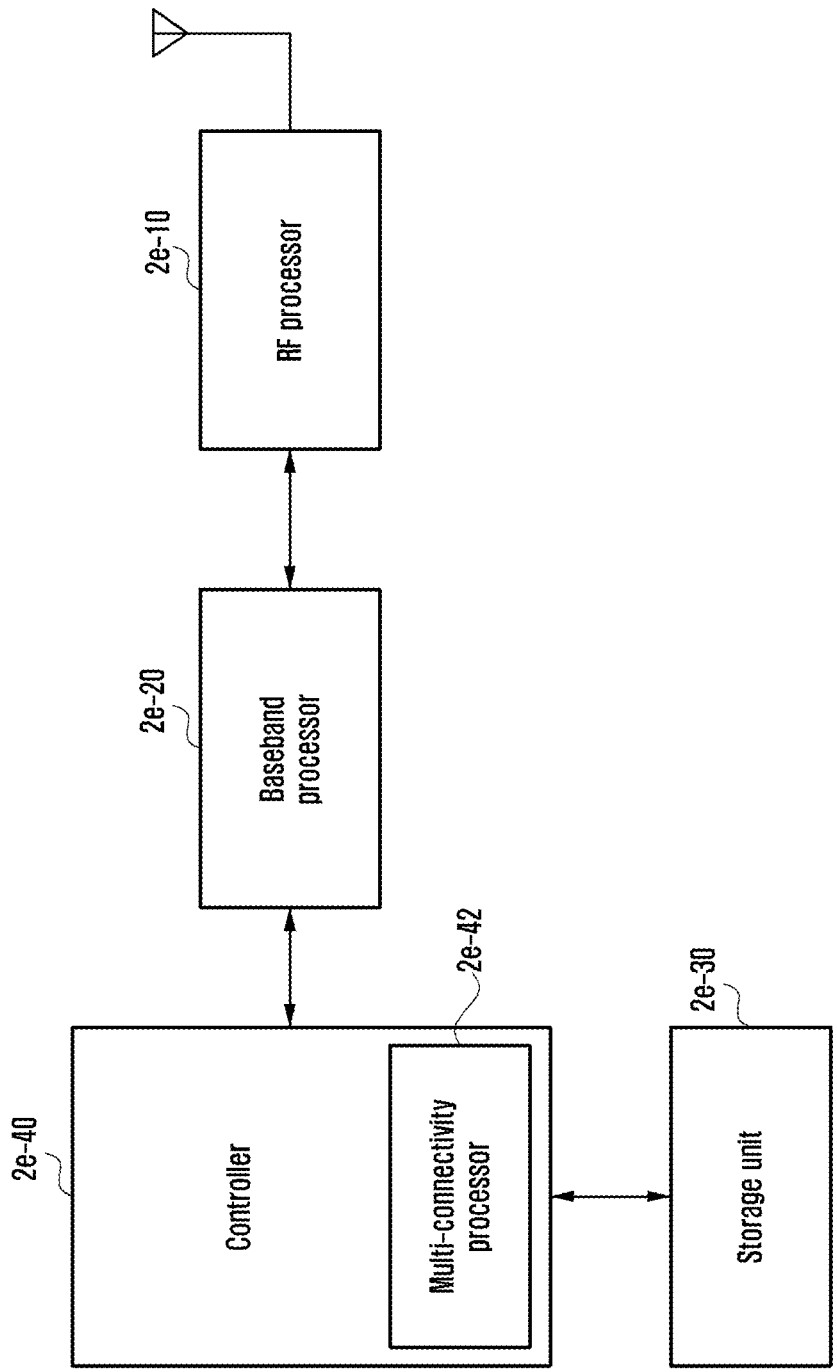
FIG. 2E illustrates the configuration of a terminal related to an embodiment of the disclosure.

FIG. 2E illustrates the configuration of a terminal to which an embodiment of the disclosure may be applied.

Referring to FIG. 2E, the terminal includes a radio frequency (RF) processor 2e-10, a baseband processor 2e-20, a storage unit 2e-30, and a controller 2e-40.

The RF processor 2e-10 performs functions for transmitting/receiving a signal through a radio channel, such as the band conversion and amplification of a signal. That is, the RF processor 2e-10 up-converts a baseband signal received from the baseband processor 2e-20 into an RF band signal, transmits the RF band signal through an antenna, and down-converts an RF band signal received through the antenna into a baseband signal. For example, the RF processor 2e-10 may include a transmission filter, a reception filter, an amplifier, a mixer, an oscillator, a digital to analog convertor (DAC), and an analog to digital convertor (ADC). In FIG. 2E, only one antenna has been illustrated, but the UE may include multiple antennas. Furthermore, the RF processor 2e-10 may include multiple RF chains. Furthermore, the RF processor 2e-10 may perform beamforming. For the beamforming, the RF processor 2e-10 may adjust the phase and size of each of signals transmitted/received through multiple antennas or antenna elements. Furthermore, the RF processor may perform MIMO. When the MIMO operation is performed, the RF processor may receive multiple layers. The RF processor 2e-10 may properly configure multiple antenna or antenna elements under the control of the controller, and may perform received beam swiping or adjust the direction and beam width of the received beam so that the received beam cooperates with a transmitted beam.

The baseband processor 2e-20 performs a baseband signal and inter-bit stream conversion function based on the physical layer standard of a system. For example, when data is transmitted, the baseband processor 2e-20 generates complex symbols by coding and modulating a transmission bit stream. Furthermore, when data is received, the baseband processor 2e-20 reconstructs a reception bit stream from a baseband signal received from the RF processor 2e-10 through demodulation and decoding. For example, if an orthogonal frequency division multiplexing (OFDM) scheme is applied, when data is transmitted, the baseband processor 2e-20 generates complex symbols by coding and modulating a transmission bit stream, maps the complex symbols to subcarriers, and then configures OFDM symbols through inverse fast Fourier transform (IFFT) operation and cyclic prefix (CP) insertion. Furthermore, when data is received, the baseband processor 2e-20 segments a baseband signal received from the RF processor 2e-10 in an OFDM symbol unit, reconstructs signals mapped to subcarriers through fast Fourier transform (FFT) operation, and reconstructs a reception bit stream through demodulation and decoding.

The baseband processor 2e-20 and the RF processor 2e-10 transmit and receive signals as described above. Accordingly, the baseband processor 2e-20 and the RF processor 2e-10 may be called a transmitter, a receiver, a transceiver or a communication unit. Furthermore, at least one of the baseband processor 2e-20 and the RF processor 2e-10 may include multiple communication modules in order to support different multiple radio access technologies. Furthermore, at least one of the baseband processor 2e-20 and the RF processor 2e-10 may include different communication modules in order to process signals of different frequency bands. For example, the different radio access technologies may include an LTE network and an NR network. Furthermore, the different frequency bands may include a super high frequency (SHF) (e.g., 2.5 GHz, 5 GHz) band and a millimeter wave (e.g., 60 GHz) band.

The storage unit 2e-30 stores data, such as a basic program, an application program, and configuration information for the operation of the UE. The storage unit 2e-30 provides stored data in response to a request from the controller 2e-40.

The controller 2e-40 controls an overall operation of the UE. For example, the controller 2e-40 transmits/receives a signal through the baseband processor 2e-20 and the RF processor 2e-10. Furthermore, the controller 2e-40 writes data in the storage unit 2e-40 and reads data from the storage unit 2e-40. To this end, the controller 2e-40 may include at least one processor. For example, the controller 2e-40 may include a communication processor (CP) performing control for communication and an application processor (AP) controlling a higher layer, such as an application program. Furthermore, the controller 2e-40 may include a multi-connectivity processor 2e-42 configured to perform processing for an operation in a multi-connection mode.

Figure 2F:
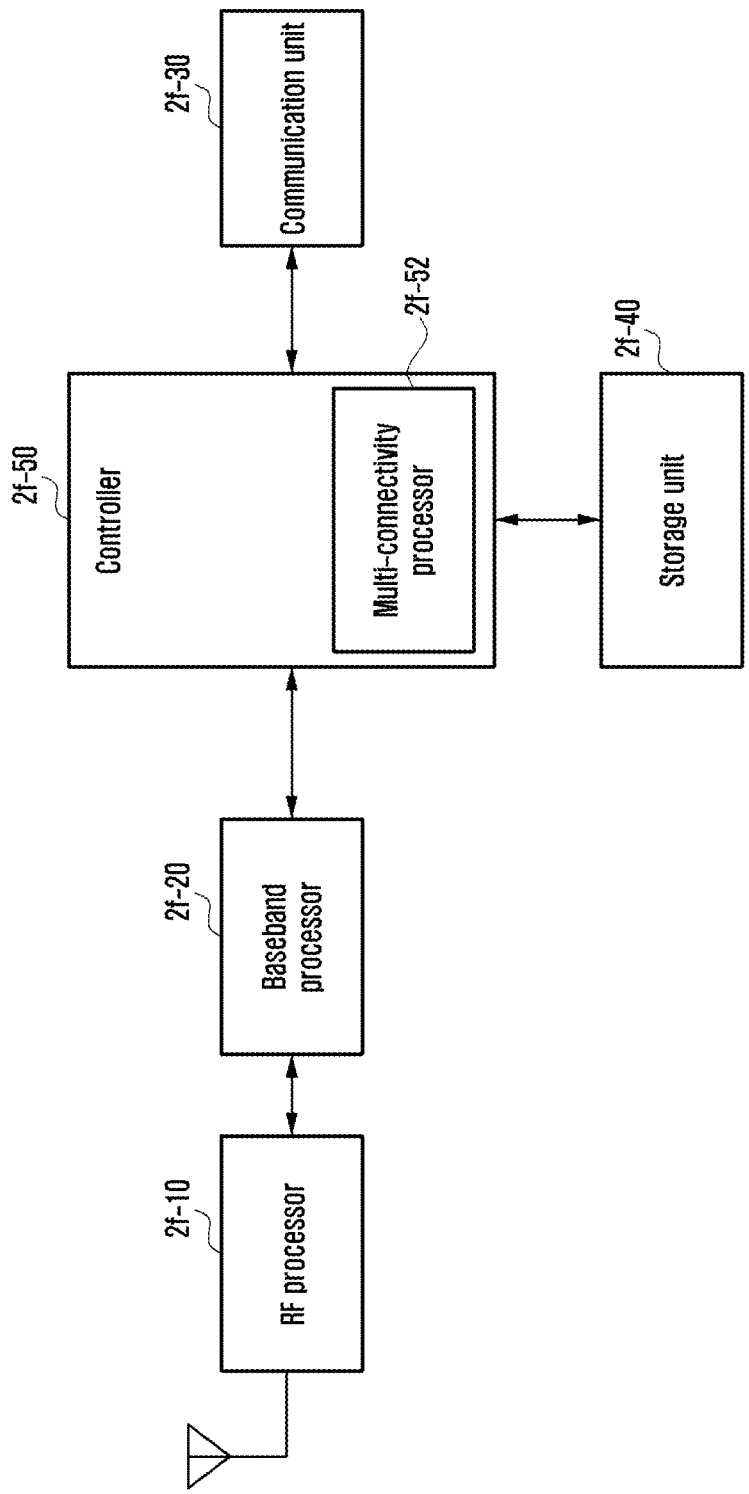
FIG. 2F illustrates a block diagram of a TRP in a wireless communication system related to an embodiment of the disclosure.

FIG. 2F illustrates a block diagram of a TRP in a wireless communication system to which an embodiment of the disclosure may be applied.

As shown in FIG. 2F, the base station is configured to include an RF processor 2f-10, a baseband processor 2f-20, a backhaul communication unit 2f-30, a storage unit 2f-40 and a controller 2f-50.

The RF processor 2f-10 performs a function for transmitting/receiving a signal through a radio channel, such as the band conversion and amplification of a signal. That is, the RF processor 2f-10 up-converts a baseband signal received from the baseband processor 2f-20 into an RF band signal, transmits the RF band signal through an antenna, and down-converts an RF band signal received through the antenna into a baseband signal. For example, the RF processor 2f-10 may include a transmission filter, a reception filter, an amplifier, a mixer, an oscillator, a DAC, and an ADC. In FIG. 2F, only one antenna has been illustrated, but the first access node may include multiple antennas. Furthermore, the RF processor 2f-10 may include multiple RF chains. Furthermore, the RF processor 2f-10 may perform beamforming. For the beamforming, the RF processor 2f-10 may adjust the phase and size of each of signals transmitted/received multiple antennas or antenna elements. The RF processor may perform a downlink MIMO operation by transmitting one or more layers.

The baseband processor 2f-20 performs a baseband signal and inter-bit stream conversion function based on the physical layer standard of a first radio access technology. For example, when data is transmitted, the baseband processor 2f-20 generates complex symbols by coding and modulating a transmission bit stream. Furthermore, when data is received, the baseband processor 2f-20 reconstructs a reception bit stream from a baseband signal received from the RF processor 2f-10 through demodulation and decoding. For example, if the OFDM scheme is applied, when data is transmitted, the baseband processor 2f-20 generates complex symbols by coding and modulating a transmission bit stream, maps the complex symbols to subcarriers, and configures OFDM symbols through IFFT operation and CP insertion. Furthermore, when data is received, the baseband processor 2f-20 segments a baseband signal received from the RF processor 2f-10 in an OFDM symbol unit, reconstructs signals mapped to subcarriers through FFT operation, and then reconstructs a reception bit stream through demodulation and decoding. The baseband processor 2f-20 and the RF processor 2f-10 transmit and receive signals as described above. Accordingly, the baseband processor 2f-20 and the RF processor 2f-10 may be called a transmitter, a receiver, a transceiver, a backhaul communication unit or a wireless backhaul communication unit.

The backhaul communication unit 2f-30 provides an interface for performing communication with other nodes within a network.

The storage unit 2f-40 stores data, such as a basic program, an application program, and configuration information for the operation of the base station. Specifically, the storage unit 2f-40 may store information on a bearer allocated to an accessed UE and measurement results reported by an accessed UE. Furthermore, the storage unit 2f-40 may store information, that is, a criterion by which whether to provide a UE with multiple connections is determined. Furthermore, the storage unit 2f-40 provides stored data in response to a request from the controller 2f-50.

The controller 2f-50 controls an overall operation of the primary base station. For example, the controller 2f-50 transmits/receives a signal through the baseband processor 2f-20 and the RF processor 2f-10 or through the backhaul communication unit 2f-30. Furthermore, the controller 2f-50 writes data in the storage unit 2f-40 and reads data from the storage unit 2f-40. To this end, the controller 2f-50 may include at least one processor. Furthermore, the controller 2f-50 may include a multi-connectivity processor 2f-52 configured to perform processing for an operation in a multi-connection mode.

Third Embodiment

The disclosure proposes a procedure for a terminal to compress data when transmitting the data in uplink and for a base station to decompress the data in a wireless communication system, and proposes a detailed header format and a support method for a data transmission and reception procedure in which a transmission stage compresses and transmits data and a reception stage decompresses the data, such as a solution upon decompression failure. Furthermore, the method proposed in the disclosure may also be applied to a procedure for a base station to compress and transmit downlink data when transmitting the data to a terminal and for a terminal to receive and decompress compressed downlink data. As described above, the disclosure may have an effect in that more data can be transmitted and coverage can be improved by compressing and transmitting, by a transmission stage, data.

Figure 3A:
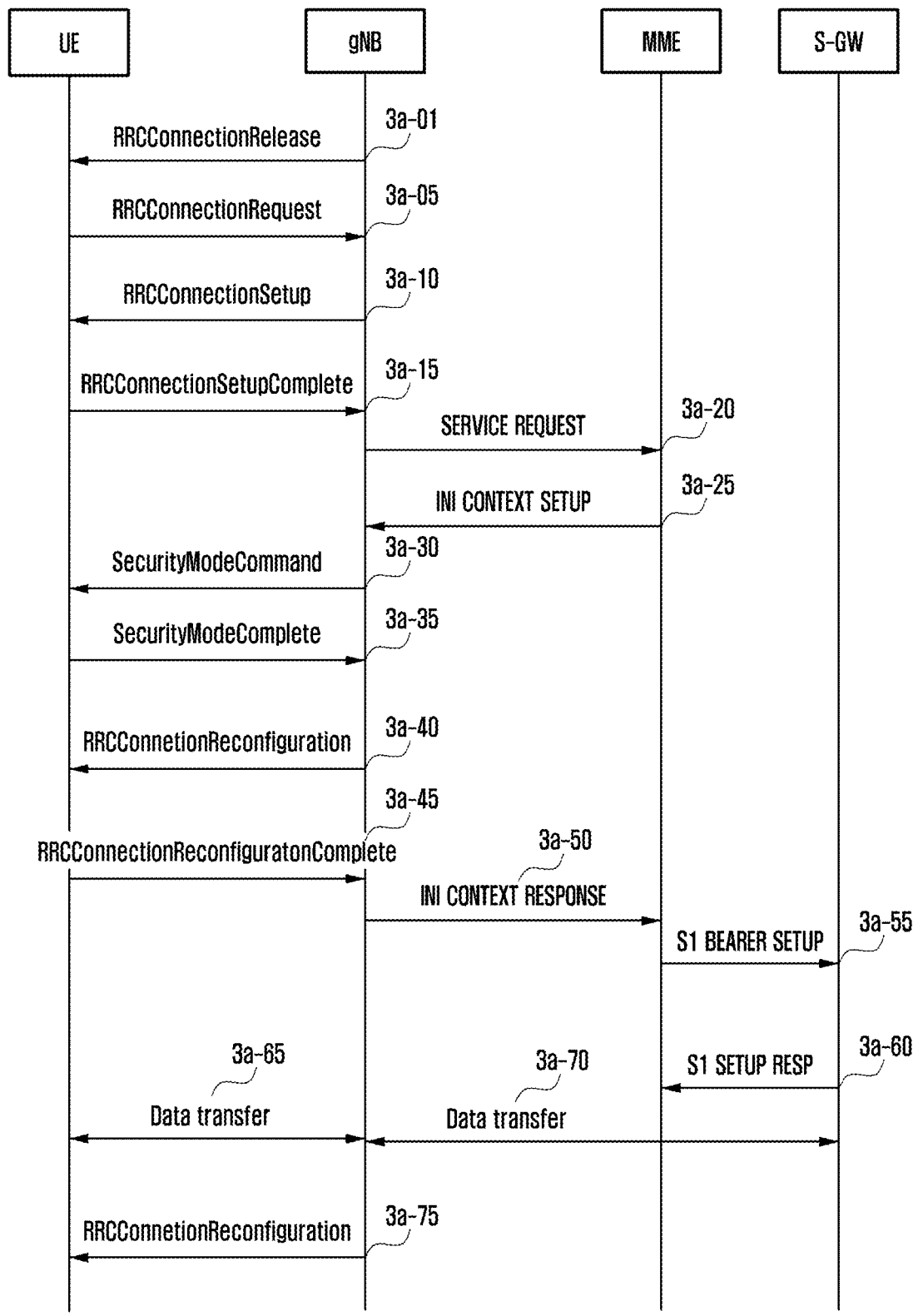
FIG. 3A illustrates a diagram of a procedure for a base station to configure whether to perform uplink data compression when a terminal sets up a connection with a network, which is related to an embodiment of the disclosure.

FIG. 3A illustrates a diagram of a procedure for a base station to configure whether to perform uplink data compression when a terminal sets up a connection with a network, which is proposed in the disclosure.

FIG. 3A illustrates a procedure for a terminal to switch from an RRC idle mode or RRC inactive mode (lightly-connected mode) to an RRC connected mode and to set up a connection with a network, and illustrates a procedure of configuring whether to perform uplink data compression (UDC).

In FIG. 3A, if a terminal that transmits and receives data in an RRC connected mode does not have data to be transmitted and received for a given cause or for a given time, a base station may indicate that the terminal should switch to an RRC idle mode by transmitting an RRCConnectionRelease message to the terminal (3a-01). Thereafter, a terminal for which a connection has not been currently set up (hereinafter an idle mode UE) performs an RRC connection establishment process with the base station if the terminal has data to be transmitted. The terminal sets up reverse direction transmission synchronization with the base station through a random access process, and transmits an RRCConnectionRequest message to the base station (3a-05). The message contains the ID of the terminal and a cause of establishing a connection (establishmentCause).

The base station transmits an RRCConnectionSetup message so that the terminal sets up an RRC connection (3a-10). The message may include information indicating whether to use an uplink data compression (UDC) method for each logical channel (logicalchannelconfig) or for each bearer or for each PDCP apparatus (PDCP-config). Furthermore, more specifically, the base station may indicate whether to use the UDC method for which IP flow or QoS flow only in each logical channel or bearer or each PDCP apparatus (or SDAP apparatus) (i.e., the base station may indicate each QoS flow regarding whether the SDAP apparatus will use the UDC method for the PDCP apparatus by configuring information on an IP flow or QoS flow for which whether the UDC method will be used or not in the SDAP apparatus or the PDCP apparatus may autonomously identify each QoS flow and determine whether to apply an uplink compression method). Furthermore, if the base station indicates that the UDC method should be used in the above description, it may indicate the ID of a pre-defined library or dictionary to be used in the UDC method or a buffer size to be used in the UDC method.

Furthermore, the message may include a command to set up or release uplink decompression so that the uplink decompression is performed. Furthermore, when the base station configures the UDC method in the above description, it may always configure the UDC method using an RLC AM bearer (a mode not having loss of data because it includes an ARQ function or retransmission function), and may not configure the UDC method along with a header compression protocol (ROHC). Furthermore, the message contains RRC connection setup information. The RRC connection is also called a signaling radio bearer (SRB), and is also used to transmit and receive RRC messages, that is, control messages between the terminal and the base station.

The terminal with which the RRC connection has been set up transmits an RRCConnetionSetupComplete message to the base station (3a-15). If the base station is unaware of the UE capability of a terminal with which a connection has now been set up or wants to check the UE capability of the terminal, it may transmit a message to ask the UE capability. Furthermore, the terminal may transmit a message that reports its capability. The message may indicate whether the terminal can use uplink data compression (UDC). The base station may transmit the message, including an indicator for whether the terminal can use uplink data compression (UDC). The RRCConnetionSetupComplete message includes a control message called SERVICE REQUEST through which the terminal requests a bearer setup for a given service from an MME. The base station transmits, to the MME, the SERVICE REQUEST message included in the RRCConnetionSetupComplete message (3a-20). The MME determines whether to provide the service requested by the terminal. If, as a result of the determination, the MME has determined to provide the service requested by the terminal, the MME transmits, to the base station, a message called INITIAL CONTEXT SETUP REQUEST (3a-25). The message includes information, such as quality of service (QoS) information to be applied when a data radio bearer (DRB) is configured and security-related information (e.g., Security Key, Security Algorithm) to be applied to the DRB. The base station exchanges a SecurityModeCommand message 3a-30 and a SecurityModeComplete message 3a-35 in order to set up security with the terminal.

When the security setting is completed, the base station transmits an RRCConnectionReconfiguration message to the terminal (3a-40). The message may include information indicative of whether to use an uplink data compression (UDC) method for each logical channel (logicalchannelconfig) or for each bearer or for each PDCP apparatus (PDCP-config). Furthermore, more specifically, the base station may indicate whether to use the UDC method for which IP flow or QoS flow only in each logical channel or bearer or each PDCP apparatus (or SDAP apparatus) (i.e., the base station may indicate each QoS flow regarding whether the SDAP apparatus will use the UDC method for the PDCP apparatus by configuring information on an IP flow or QoS flow for which whether the UDC method will be used or not in the SDAP apparatus or the PDCP apparatus may autonomously identify each QoS flow and determine whether to apply an uplink compression method). Furthermore, if the base station indicates that the UDC method should be used in the above description, it may indicate the ID of a pre-defined library or dictionary to be used in the UDC method or a buffer size to be used in the UDC method. Furthermore, the message may include a command to set up or release uplink decompression so that the uplink decompression is performed. Furthermore, when the base station configures the UDC method in the above description, it may always configure the UDC method using an RLC AM bearer (a mode not having loss of data because it includes an ARQ function or retransmission function), and may not configure the UDC method along with a header compression protocol (ROHC). Furthermore, the message includes configuration information of a DRB in which user data will be processed. The terminal configures a DRB by applying the information and transmits an RRCConnectionReconfigurationComplete message to the base station (3a-45). The base station that has completed the DRB set up with the terminal transmits an INITIAL CONTEXT SETUP COMPLETE message to an MME (3a-50). The MME that has received the message exchanges an S1 BEARER SETUP message and an S1 BEARER SETUP RESPONSE message in order to set up an S1 bearer with an S-GW (3a-55, 3a-60). The S1 bearer is a connection for data transmission set up between the S-GW and the base station, and corresponds to a DRB in a one-to-one manner. When the process is completed, the terminal transmits and receives data to and from the base station through the S-GW (3a-65, 3a-70).

As described above, a common data transmission process is basically configured with the three steps of RRC connection establishment, security setting, and DRB setup. Furthermore, the base station may transmit, to the terminal, an RRCConnectionReconfiguration message in order to newly provide a configuration to the terminal or to add or change a configuration for a given cause (3a-75). The message may include information indicative of whether to use an uplink data compression (UDC) method for each logical channel (logicalchannelconfig) or for each bearer or for each PDCP apparatus (PDCP-config). Furthermore, more specifically, the base station may indicate whether to use the UDC method for which IP flow or QoS flow only in each logical channel or bearer or each PDCP apparatus (or SDAP apparatus) (i.e., the base station may indicate each QoS flow regarding whether the SDAP apparatus will use the UDC method for the PDCP apparatus by configuring information on an IP flow or QoS flow for which whether the UDC method will be used or not in the SDAP apparatus or the PDCP apparatus may autonomously identify each QoS flow and determine whether to apply an uplink compression method). Furthermore, if the base station indicates that the UDC method should be used in the above description, it may indicate the ID of a pre-defined library or dictionary to be used in the UDC method or a buffer size to be used in the UDC method. Furthermore, the message may include a command to set up or release uplink decompression so that the uplink decompression is performed. Furthermore, when the base station configures the UDC method in the above description, it may always configure the UDC method using an RLC AM bearer (a mode not having loss of data because it includes an ARQ function or retransmission function), and may not configure the UDC method along with a header compression protocol (ROHC).

Figure 3B:
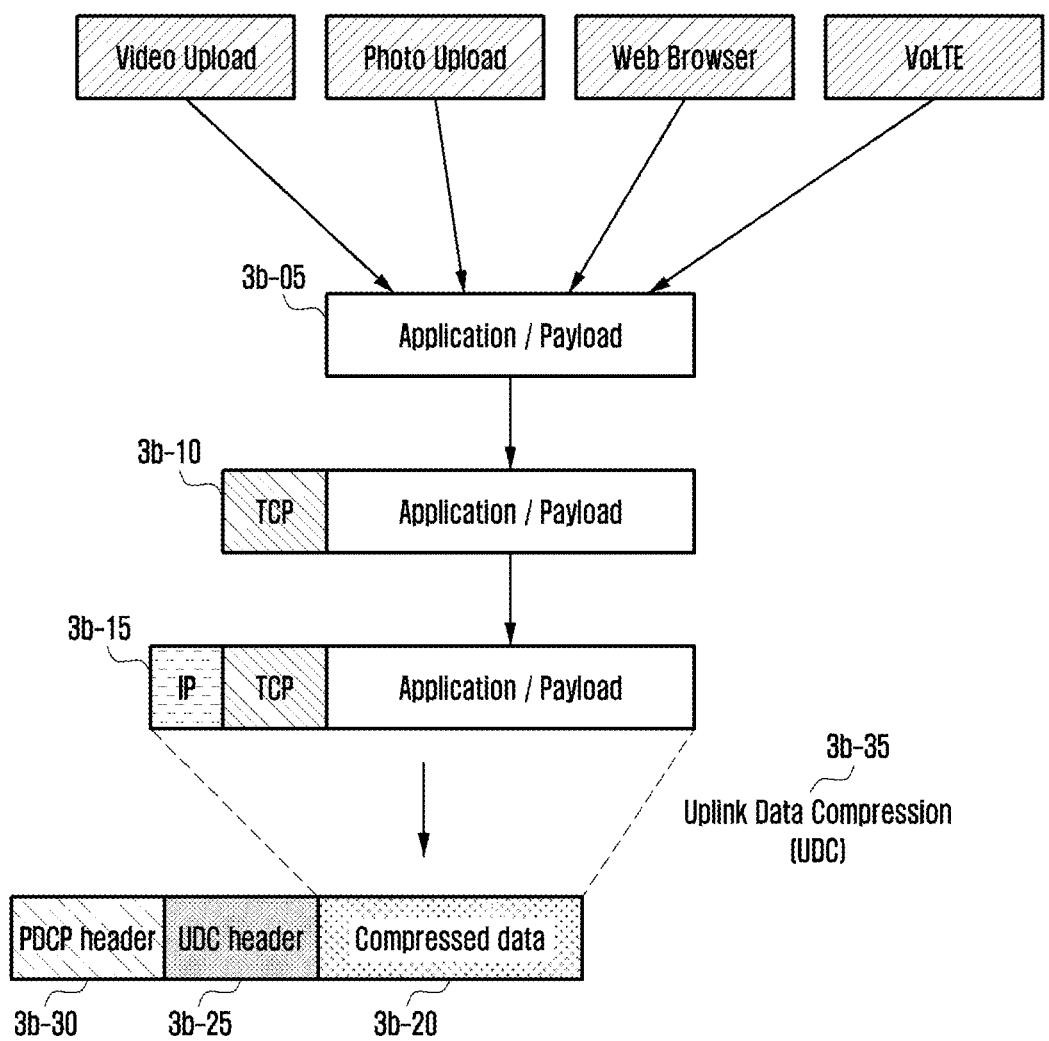
FIG. 3B illustrates a diagram of a procedure of performing uplink data compression and a data configuration, which are related to an embodiment of the disclosure.

FIG. 3B illustrates a diagram of a procedure of performing uplink data compression and a data configuration, which is proposed in the disclosure.

In FIG. 3B, uplink data 3b-05 may be generated as data corresponding to services, such as video transmission, photo transmission, web search and VoLTE. Data generated from an application layer apparatus is processed through a TCP/IP or UDP corresponding to a network data transport layer, and may be delivered to a PDCP layer after headers 3b-10 and 3b-15 are configured. The PDCP layer may perform the following procedure when receiving data (e.g., PDCP SDU) from a higher layer.

In FIG. 3A, if an uplink data compression (UDC) method has been configured to be used in the PDCP layer by an RRC message, such as 3a-10 or 3a-40 or 3a-75, the PDCP layer may compress the uplink data by performing the UDC method on a PDCP SDU like 3b-20, may configure a corresponding UDC header 3b-25 (header for the compressed uplink data), may perform ciphering on the compressed data except the UDC header, may perform integrity protection if it has been set up, and may configure a PDCP PDU by configuring a PDCP header 3b-30. In the above description, the PDCP layer apparatus includes a UDC/decompression apparatus, determines whether to perform a UDC procedure on each datum as configured in the RRC message, and uses the UDC/decompression apparatus. In a transmission stage, a transmission PDCP layer apparatus performs data compression using a UDC apparatus. In a reception stage, a reception PDCP layer apparatus performs data decompression using a UDC decompression apparatus.

The procedure of FIG. 3B may also be applied to downlink data compression in addition to a case where a terminal performs uplink data compression. Furthermore, the description of the uplink data may be identically applied to downlink data.

Figure 3C:
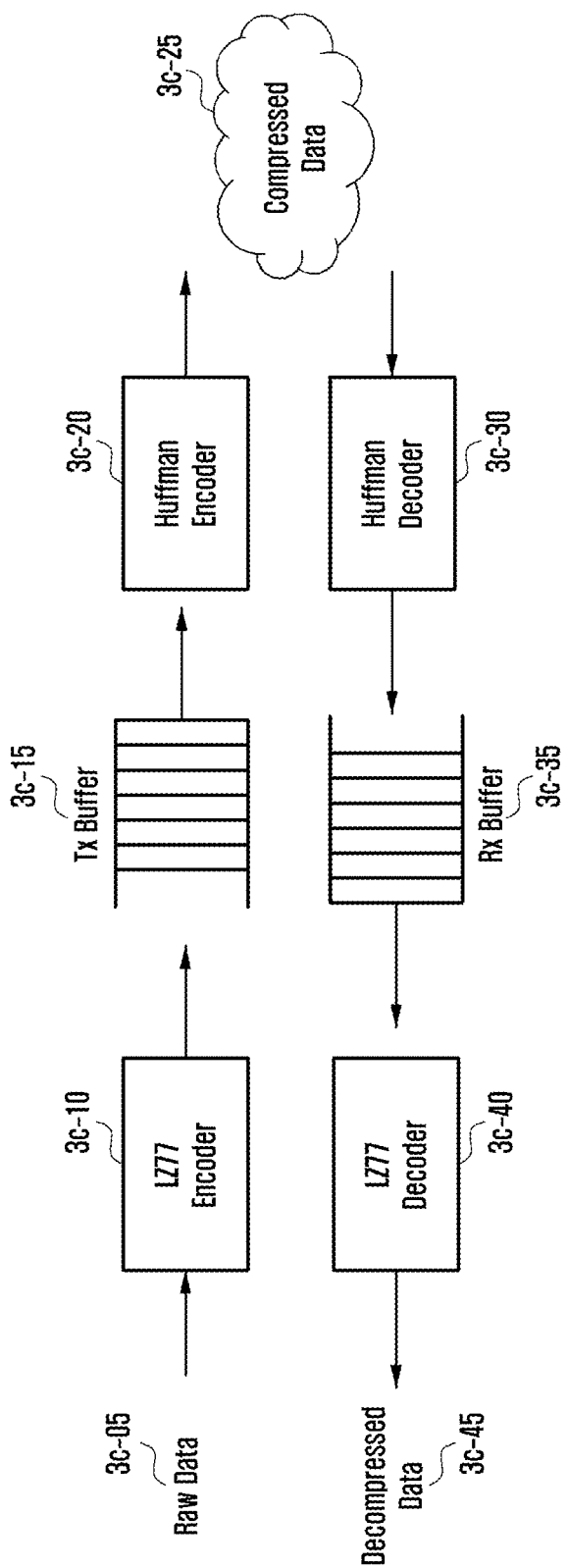
FIG. 3C illustrates a diagram of an embodiment of an uplink data compression method related to an embodiment of the disclosure.

FIG. 3C illustrates a diagram of an embodiment of a UDC method which may be applied in the disclosure.

FIG. 3C illustrates a diagram of a DEFLATE-based uplink data compression algorithm. The DEFLATE-based uplink data compression algorithm is a lossless compression algorithm. The DEFLATE-based uplink data compression algorithm compresses uplink data by basically combining an LZ77 algorithm and Huffman coding. The LZ77 algorithm performs an operation of searching for a redundant array of data, and searches for a redundant array within a sliding window through the sliding window when searching for the redundant array. If a redundant array is present, the LZ77 algorithm performs data compression by representing the location where the redundant array is present within the sliding window and a redundant degree as a length. The sliding window is also called a buffer in an uplink data compression (UDC) method, and may be set to 8 kilobytes or 32 kilobytes. That is, the sliding window or the buffer may write 8192 or 32768 letters, search for a redundant array, represent the redundant array using the location and length, and perform compression. Accordingly, the LZ77 algorithm is a sliding window method. That is, the LZ77 algorithm updates a buffer with previously coded data, and directly performs coding on next data, so consecutive data has a correlation. Accordingly, next data can be normally decoded only if previously coded data is normally decoded. In the above description, codes (i.e., expressions such as a location and a length) represented as the location and length and compressed by the LZ77 algorithm is further compressed through Huffman coding once more. While searching for redundant codes again, the Huffman coding performs compression once more using a short mark in a code having a great redundant degree and using a long mark in a code having a small redundant degree. The Huffman coding is a prefix code, and is an optimal coding method in which all codes are uniquely decodable.

As described above, a transmission stage may perform encoding (3c-10) by applying the LZ77 algorithm to raw data 3c-05, may update a buffer (3c-15), and may configure checksum bits for the content (or data) of the buffer in a UDC header by generating checksum bits. The checksum bits are used to determine the validity of a buffer state in a reception stage. The transmission stage may compress the codes, encoded using the LZ77 algorithm, through Huffman coding once more, and may transmit the compressed codes as uplink data (3c-25). A reception stage performs a decompression procedure on the received compressed data in opposition to the procedure of the transmission stage. That is, the reception stage performs Huffman decoding (3c-30), updates a buffer (3c-35), and checks the validity of the updated buffer using the checksum bits of the UDC header. If the checksum bits are determined to not have an error, the reception stage may decompress the data by performing decoding using the LZ77 algorithm (3c-40), may restore the raw data, and may deliver the data to a higher layer (3c-45).

As described above, the LZ77 algorithm is a sliding window method. That is, the LZ77 algorithm updates a buffer with previously coded data, and directly performs coding on next data, so consecutive data has a correlation. Accordingly, next data can be normally decoded only if previously coded data is normally decoded. Accordingly, a reception PDCP layer apparatus checks the PDCP serial number of a PDCP header, checks a UDC header (checks an indicator to indicate whether data compression has been performed), and performs a data decompression procedure on data to which a data compression procedure has been applied in ascending order of PDCP serial numbers.

The procedure for a base station to perform an uplink data compression (UDC) configuration in a terminal and the procedure for a terminal to perform UDC, which have been proposed in the disclosure, are as follows.

A base station may configure a terminal to perform uplink data compression in a bearer or logical channel in which an RLC AM mode has been set using an RRC message, such as 3a-10 or 3a-40 or 3a-75 in FIG. 3A, or may release the terminal. Furthermore, the base station may reset the UDC apparatus (or protocol) of a PDCP layer apparatus of the terminal using the RRC message. In the above description, to reset the UDC apparatus (or protocol) means that a UDC buffer for the uplink data compression of the terminal is reset, and is for purpose of synchronizing the UDC buffer of the terminal and a UDC buffer for the uplink data decompression of the base station. In the operation of resetting the buffer of the UDC apparatus, a new PDCP control PDU may be defined or may be defined by modifying the existing PDCP control PDU. The new PDCP control PDU may be used by a transmission stage (base station) to reset the UDC buffer of a reception stage (terminal) instead of the RRC message, and may be used for synchronization for user data compression and decompression between the transmission/reception stages. Furthermore, the base station may configure whether to perform uplink data compression for each bearer or for each logical channel or for each PDCP layer apparatus using the RRC message. More specifically, the base station may configure whether to perform uplink data decompression for each IP flow (or QoS flow) in one bearer or logical channel or PDCP layer apparatus.

Furthermore, a base station may set a PDCP discard timer value in a terminal using the RRC message. The base station may separately set a PDCP discard timer value for data on which uplink data compression is not performed and a PDCP discard timer value for data to which uplink data compression is applied.

If a terminal has been configured to perform uplink data compression on a given bearer or logical channel or PDCP layer apparatus (or some QoS flows of a given bearer or logical channel or PDCP layer apparatus) through the RRC message, the terminal resets the buffer in the UDC apparatus of the PDCP layer apparatus based on the configuration, and prepares an uplink data compression procedure. Furthermore, when data (e.g., PDCP SDU) is received from a higher layer, if a terminal has been configured to perform uplink data compression on the PDCP layer apparatus, it performs uplink data compression on the received data. If a terminal has been configured to perform uplink data compression on only given QoS flows of the PDCP layer apparatus, the terminal determines whether to perform uplink data compression by checking the indication of a higher SDAP layer or a QoS flow identifier, and performs uplink data compression.

If a terminal has performed uplink data compression (UDC) and updates the buffer based on the data compression, the terminal configures a UDC buffer. In the above description, if the UDC is performed, the terminal may compress a PDCP SDU, received from a higher layer, into UDC data (or UDC block) having a smaller size. Furthermore, the terminal configures a UDC header for the compressed UDC data. The UDC header may include an indicator whether uplink data compression has been performed (e.g., UDC is applied when a 1-bit indicator is 0 and UDC is not applied when a 1-bit indicator is 1 in the UDC header and vice versa). In the above description, a case where the terminal does not apply uplink data compression may include a case where data compression cannot be performed using the UDC method (DEFLATE algorithm) because a PDCP SDU data structure received from a higher layer does not have a repetitive data structure. In the above description, if uplink data compression (UDC) has been performed on data (e.g., PDCP SDU) received from a higher layer and the UDC buffer has been updated, the terminal may calculate checksum bits in order to confirm the validity of the updated UDC buffer in the reception stage PDCP layer apparatus, and may include the checksum bits in the UDC buffer (the checksum bits have a given length and may be configured with 4 bits, for example).

In the above description, if the terminal has been configured to perform ciphering on data to which uplink data decompression has been applied or not been applied, the terminal performs integrity protection and delivers the data to a lower layer.

Figure 3D:
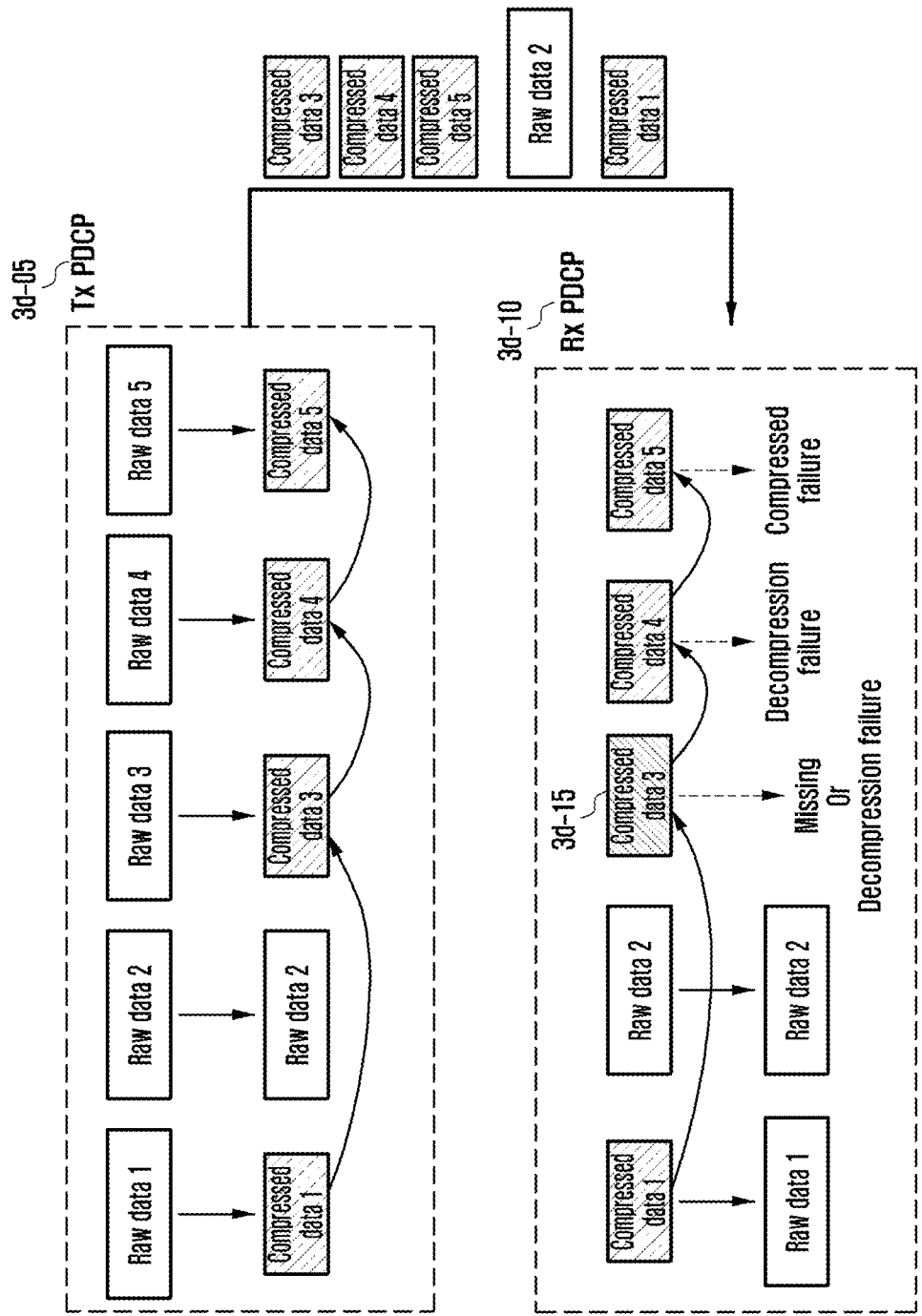
FIG. 3D illustrates a diagram of a problem in which a decompression failure occurs in an uplink data compression method, which is related to an embodiment of the disclosure.

FIG. 3D illustrates a diagram of a problem in which a decompression failure of the uplink data compression method described in the disclosure occurs.

As described with reference to FIG. 3C, the algorithm (i.e., DEFLATE algorithm for performing uplink data compression (UDC) (after the LZ77 algorithm is performed, Huffman coding is performed)) is a method of updating a buffer with previously compressed data when a transmission stage performs data compression, comparing the compressed data with data to be subsequently compressed based on the buffer, searching for a repetitive structure, and performing compression based on a location and length. Accordingly, a reception stage can successfully perform decompression only when the reception stage sequentially performs the decompression in the sequence that the transmission stage has performed the compression. For example, if a transmission stage has performed UDC on data having PDCP serial number Nos. 1, 3, 4, and 5 and has not performed UDC on data having a PDCP serial number No. 2 (3d-05), a reception stage can successfully perform decompression only if it performs decompression on received data in order of the PDCP serial number Nos. 1, 3, 4, and 5 in a PDCP layer apparatus. In the above description, if the transmission stage has performed UDC, the reception stage can determine whether UDC has been applied by checking the UDC header because whether UDC has been applied is indicated in the UDC header. In the process of performing a series of UDC decompression, if the PDCP serial number No. 3 (3d-15) is lost, subsequent UDC decompression fully fails. That is, UDC decompression cannot be performed on the data having the PDCP serial number Nos. 4 and 5 (3d-10). Accordingly, lost data (or packet) should not occur in an uplink decompression procedure, and a reception stage has to perform decompression in the sequence that a transmission stage has performed UDC on data. Accordingly, an operation needs to be performed in an RLC AM mode that is lossless and has a retransmission function.

However, the lost data may occur due to a PDCP discard timer of a PDCP layer apparatus. That is, the PDCP layer apparatus drives a timer based on a PDCP discard timer value set through the RRC message every data (or packet or PDCP SDU) received from a higher layer. Furthermore, when the timer expires, the PDCP layer apparatus discards data corresponding to the timer. Accordingly, when a timer for data on which UDC has been performed expires, the data may be discarded. Accordingly, a UDC decompression failure for data on which UDC has been performed may occur in a reception stage.

As described with reference to FIG. 3C of the disclosure, according to the algorithm for performing uplink data compression (UDC) (i.e., DEFLATE algorithm (perform Huffman coding after performing the LZ77 algorithm)), when a transmission stage performs UDC, it generates a checksum using current buffer content after performing the UDC, and configures the checksum in a UDC buffer. Furthermore, the above-described algorithm is a method of updating a buffer using the raw data of data on which compression has been performed, comparing the data with data to be subsequently compressed based on the buffer, searching for a repetitive structure, and performing compression based on a location and length. In the above description, checksum bits within a UDC header is used for the UDC apparatus (or function) of a reception stage PDCP layer apparatus to determine the validity of a current buffer state before performing data decompression. That is, a reception stage checks the validity of a current reception stage UDC buffer based on the checksum bits of the UDC header before it performs data decompression. If a checksum error is not present, the reception stage performs data decompression. If a checksum failure occurs, the reception stage should not perform data decompression and report the checksum failure to a transmission stage for recovery.

The reception stage can successfully perform decompression only when it performs the decompression in the sequence that the transmission stage has performed compression. For example, if a transmission stage has performed UDC on data having PDCP serial numbers. 1, 3, 4, and 5 and has not performed UDC on data having a PDCP serial number No 2, a reception stage can successfully perform decompression on received data only when it performs the decompression in order of the PDCP serial number Nos. 1, 3, 4, 5 in a PDCP layer apparatus. In the above description, if the transmission stage has performed UDC, the reception stage may determine whether UDC has been applied by checking the UDC header because whether UDC has been applied is indicated in the UDC header. In the process of performing a series of UDC decompression, if a checksum failure occurs in the PDCP serial number No. 3, subsequent UDC decompression may fully fail. That is, the reception stage cannot successfully perform UDC decompression on the data having the PDCP serial number Nos. 4 and 5.

The disclosure hereinafter proposes a checksum failure handling method for solving the above checksum failure problem.

Figure 3E:
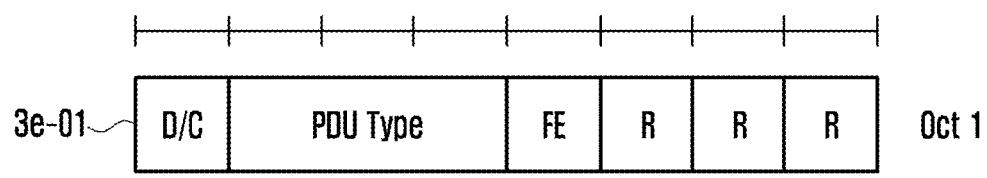
FIG. 3E illustrates a PDCP control PDU format which may be applied in a checksum failure handling method related to an embodiment of the disclosure.

FIG. 3E illustrates a PDCP control PDU format which may be applied to in a checksum failure handling method of the disclosure.

In FIG. 3E, a D/C field is a field that identifies whether data is common data or PDCP layer control information (or PDCP control PDU) in a PDCP layer. A PDU Type field is a field indicating that data corresponds to which information of PDCP layer control information. Furthermore, a 1-bit indicator (FE field), indicating whether a checksum failure has occurred, may be defined and used in the PDCP control PDU format for feedback in the checksum failure handling method proposed in the disclosure like 3e-01. When the 1-bit indicator value is 0, it indicates that UDC decompression is normally performed. When the 1-bit indicator value is 1, it indicates that a checksum failure has occurred upon UDC decompression and may indicate that the UDC buffer of a transmission PDCP layer apparatus should be reset.

In order to define the format 3e-01, a transmission stage and a reception stage may define a new PDCP control PDU by assigning a PDU type to reserved values (e.g., given reserved values between 011 or 100-111) so that a PDCP control PDU having the defined PDU type can function to feedback that performs a function indicative of a checksum failure. For example, in order to define the following PDU type, a method, such as Table 1, may be taken into consideration.

TABLE 1

| Bit | Description |
|---|---|
| 000 | PDCP status report |
| 001 | Interspersed ROHC feedback packet |
| 010 | LWA status report |
| 011 | UDC checksum failure feedback |
| 100-111 | Reserved |

In the disclosure, an embodiment proposed for the checksum failure handling method to which the PDCP control PDU proposed in FIG. 3E has been applied is as follows.

A reception stage (base station) indicates that a checksum failure has occurred by transmitting a PDCP Control PDU to a terminal if the reception stages identifies the checksum failure in a reception UDC buffer for data to which uplink data compression (UDC) release will be performed. A new PDCP Control PDU may be defined and used as the PDCP Control PDU, or a new indicator may be defined and included in the existing PDCP Control PDU and the existing PDCP Control PDU may be modified and used as the PDCP Control PDU. As another method, the reception stage may define an indicator, indicating that the UDC buffer should be reset because a checksum failure has occurred, instead of a PDCP serial number, and may indicate the indicator.

A reception stage operation: a reception stage resets a reception stage UDC buffer, and discards data whose indicator, indicating that a transmission stage UDC buffer has been reset due to a UDC checksum failure, has not have been included in the UDC header of newly received data and on which UDC has been performed. The reception stage may process data whose indicator, indicating that a transmission stage UDC buffer has been reset due to a UDC checksum failure, has not been included in the UDC header of newly received data and on which UDC has not been performed in ascending order of PDCP serial numbers if all the data has been received without a gap halfway in order of the PDCP serial numbers, and may deliver the data to a higher layer apparatus. Furthermore, the reception stage may start decompression again in ascending order of the PDCP serial numbers from data including an indicator, indicating that a transmission stage UDC buffer has been reset due to a UDC checksum failure, in the UDC header.

A transmission stage operation: when a transmission stage (terminal) receives a PDCP Control PDU, it resets a UDC transmission buffer. A UDC procedure is performed before the UDC transmission buffer is reset. The transmission stage discards data (e.g., PDCP PDU) that has not yet been transmitted, if any, among generated data. The transmission stage may perform uplink data compression (UDC) on the data that has not yet been transmitted again based on the reset transmission UDC buffer, may update the UDC buffer, may perform ciphering on a data part having checksum bits in a UDC header except the UDC header, may generate a PDCP header, may configure a PDCP PDU, and may deliver the PDCP PDU to a lower layer. Furthermore, the transmission stage may deliver the UDC header or PDCP header of the newly configured PDCP PDU, including an indicator indicating that the transmission stage buffer has been reset, and may newly assign PDCP serial numbers to the data that has not yet been transmitted in ascending order (in this case, a rule under which one ciphering and transmission is performed on one PDCP COUNT value may be followed because a danger of hacking is high if data that has been ciphered and transmitted using a PDCP serial number or HFN or COUNT value and a security key once is ciphered and retransmitted using the same PDCP COUNT value and security key). As another method, when an indication indicating that a checksum failure has occurred is received, the transmission stage may reset the transmission UDC buffer, may newly perform UDC on only data having a PDCP serial number greater than or equal to that of data that has not yet been delivered from the transmission stage to a lower layer or only a PDCP PDU to be newly configured, and may deliver the data to a lower layer. Furthermore, the transmission stage may deliver the UDC header or PDCP header of the newly configured PDCP PDU, including an indicator indicating that the transmission stage UDC buffer has been reset (or indicator indicating that a reception stage UDC buffer should be reset) (i.e., a rule under which one ciphering and transmission is performed on one PDCP COUNT value may be followed because a danger of hacking is high if data that has been ciphered and transmitted using a PDCP serial number or HFN or COUNT value and a security key once is ciphered and retransmitted using the same PDCP COUNT value and security key).

However, the above checksum failure may occur due to a PDCP discard timer of a PDCP layer apparatus. That is, the PDCP layer apparatus drivers a timer based on a PDCP discard timer value set through an RRC message every data (e.g., packet or PDCP SDU) received from a higher layer. Furthermore, the PDCP layer apparatus discards data corresponding to the timer when the timer expires. Accordingly, when a timer for data on which UDC has been performed expires, some of the UDC data may be discarded. Accordingly, a UDC decompression failure may occur in data on which UDC has been subsequently performed in a reception stage.

The disclosure proposes, as follows, a (3-1) embodiment capable of preventing a loss of data and reducing data having a checksum failure in a reception stage if data on which UDC has been performed is discarded based on a PDCP discard timer in a transmission PDCP layer apparatus as follows.

A transmission stage operation: if an uplink data compression procedure has been configured in a transmission PDCP layer apparatus, if a transmission stage discards data that has not yet been transmitted due to the expiration of a PDCP discard timer and on which UDC has been performed, the transmission stage may transmit data corresponding to a next PDCP serial number of the discarded data, may discard all the remaining data (i.e., data that has a PDCP serial number greater than a next PDCP serial number of the discarded data and on which user data compression has been applied and that has been stored without being transmitted), and may transmit, to a lower layer apparatus, an indicator indicating that the data should be discarded if the data has already been delivered to a lower layer apparatus. The transmission stage may suspend data transmission before it receives a PDCP control PDU indicating that a checksum failure has occurred with respect to a transmission PDCP layer apparatus. The reason for this is that it is evident that user data compression has been previously performed because middle or some data of the UDC-compressed data has been discarded and that a checksum failure may occur in data (e.g., PDCP PDU) having a higher PDCP serial number than the discarded data in a reception PDCP layer apparatus. Accordingly, if the transmission stage transmits data corresponding to a next PDCP serial number of discarded data, the reception PDCP layer apparatus can identify a checksum failure and expect that a PDCP control PDU will be transmitted.

Accordingly, when a PDCP control PDU indicating that a checksum failure has occurred is received or before the PDCP control PDU is received, the transmission PDCP layer apparatus resets a transmission buffer for user data compression (in this case, the transmission UDC buffer is not reset if it has already been reset). The transmission stage may perform a user data compression (UDC) procedure again from data whose PDCP discard timer has not yet expired and that has not yet been transmitted or from data whose PDCP discard timer has not yet expired and that has been finally transmitted (i.e., data transmitted because it corresponds to a next PDCP serial number of the discarded data), may assign a new PDCP serial number or the first PDCP serial number on data that has not yet been transmitted in ascending order, and may prepare data (e.g., PDCP PDU) by ciphering and generating the data. The transmission stage may resume the transmission of the newly generated and prepared data after receiving a PDCP control PDU, indicating that a checksum failure has occurred in the newly generated and prepared data. That is, the transmission stage may deliver the data to a lower layer apparatus.

Accordingly, if a user data compression procedure has been configured, if some of data that has been previously generated by a PDCP discard timer and to which user data compression has been applied is discarded, a checksum failure that may occur in data having a greater PDCP serial number than the discarded data can be reduced. Furthermore, a loss of data can be prevented because data is generated from data that has not yet been transmitted or from data that has been finally transmitted (i.e., data transmitted because it corresponds to a next PDCP serial number of the discarded data).

If a reception stage (base station) identifies a checksum failure in a reception UDC buffer for data on which uplink data compression (UDC) release will be performed, it indicates that the checksum failure has occurred by transmitting a PDCP Control PDU to a terminal. A new PDCP Control PDU may be defined and used as the PDCP Control PDU, or a new indicator may be defined and included in the existing PDCP Control PDU and the existing PDCP Control PDU may be modified and used as the PDCP Control PDU. As another method, the reception stage may define an indicator, indicating that the UDC buffer should be reset because a checksum failure has occurred, instead of a PDCP serial number, and may indicate the indicator.

A reception stage operation: a reception stage resets a reception stage UDC buffer, and discards data whose indicator, indicating that a transmission stage UDC buffer has been reset due to a UDC checksum failure, has not been included in the UDC header of newly received data and on which UDC has been performed. The reception stage may process data whose indicator, indicating that a transmission stage UDC buffer has been reset due to a UDC checksum failure, has not been included in the UDC header of newly received data and on which UDC has not been performed in ascending order of PDCP serial numbers if all the data has been received without a gap halfway in order of the PDCP serial numbers, and may deliver the data to a higher layer apparatus. Furthermore, the reception stage may start decompression again in ascending order of the PDCP serial numbers from data including an indicator, indicating that a transmission stage UDC buffer has been reset due to a UDC checksum failure, in the UDC header.

The disclosure proposes, as follows, a (3-2) embodiment capable of preventing a loss of data and reducing data having a checksum failure in a reception stage if data on which UDC has been performed is discarded based on a PDCP discard timer in a transmission PDCP layer apparatus as follows.

A transmission stage operation: if an uplink data compression procedure has been configured in a transmission PDCP layer apparatus, if data that has not yet been transmitted due to the expiration of a PDCP discard timer and on which UDC has been performed is discarded, a transmission stage may discard all data having a greater PDCP serial number than the discarded data, to which user data compression has been applied, that has been generated as a PDCP PDU, and that has been stored without being transmitted, and may transmit, to a lower layer apparatus, an indicator indicating that data should be discarded if the data has already been delivered to the lower layer apparatus. Furthermore, the transmission PDCP layer apparatus may reset a buffer (i.e., UDC buffer) for transmission user data compression, may assign a new PDCP serial number or a PDCP serial number that has not yet been transmitted in ascending order from the first data that has not yet been transmitted, may perform user data compression again, and may perform ciphering. Furthermore, the transmission stage may define and indicate a new 1-bit indicator in order to indicate that a buffer for transmission user data compression has been reset when generating a UDC header, and may indicate that a reception stage should reset a buffer for reception user data decompression. As another method, a transmission stage may indicate that a buffer for transmission user data compression has been reset and may indicate that a reception stage should reset a buffer for reception user data decompression using FR bits. That is, a terminal can trigger a procedure of resetting transmission and reception UDC buffers.

A transmission stage may indicate that a buffer for transmission of user data compression has been reset in a UDC header with respect to the newly generated and prepared data. On the reception side, a transmission PDCP layer apparatus may immediately start transmission sequentially or in ascending order of PDCP serial numbers from data indicating that a buffer for reception user data decompression should be reset. That is, the transmission stage may deliver data to a lower layer apparatus.

In the (3-2) embodiment, a terminal can autonomously trigger a procedure of resetting transmission and reception UDC buffers using a 1-bit indicator of a UDC header prior to a checksum failure.

Accordingly, if a user data compression procedure has been configured, if some of data that has been previously generated by a PDCP discard timer and to which user data compression has been applied is discarded, a checksum failure that may occur in data having a greater PDCP serial number that the discarded data can be reduced. Furthermore, a loss of data can be prevented because data that has not yet been transmitted is generated again.

A reception stage operation: if a transmission stage indicates that a buffer for transmission of user data compression has been reset in the UDC header of received data and indicates that a buffer for reception user data decompression should be reset on the reception side, the reception stage may reset the reception stage UDC buffer, may decode the received data in ascending order of PDCP serial numbers, may perform and process user data decompression, and may deliver the data to a higher layer apparatus.

Figure 3F:
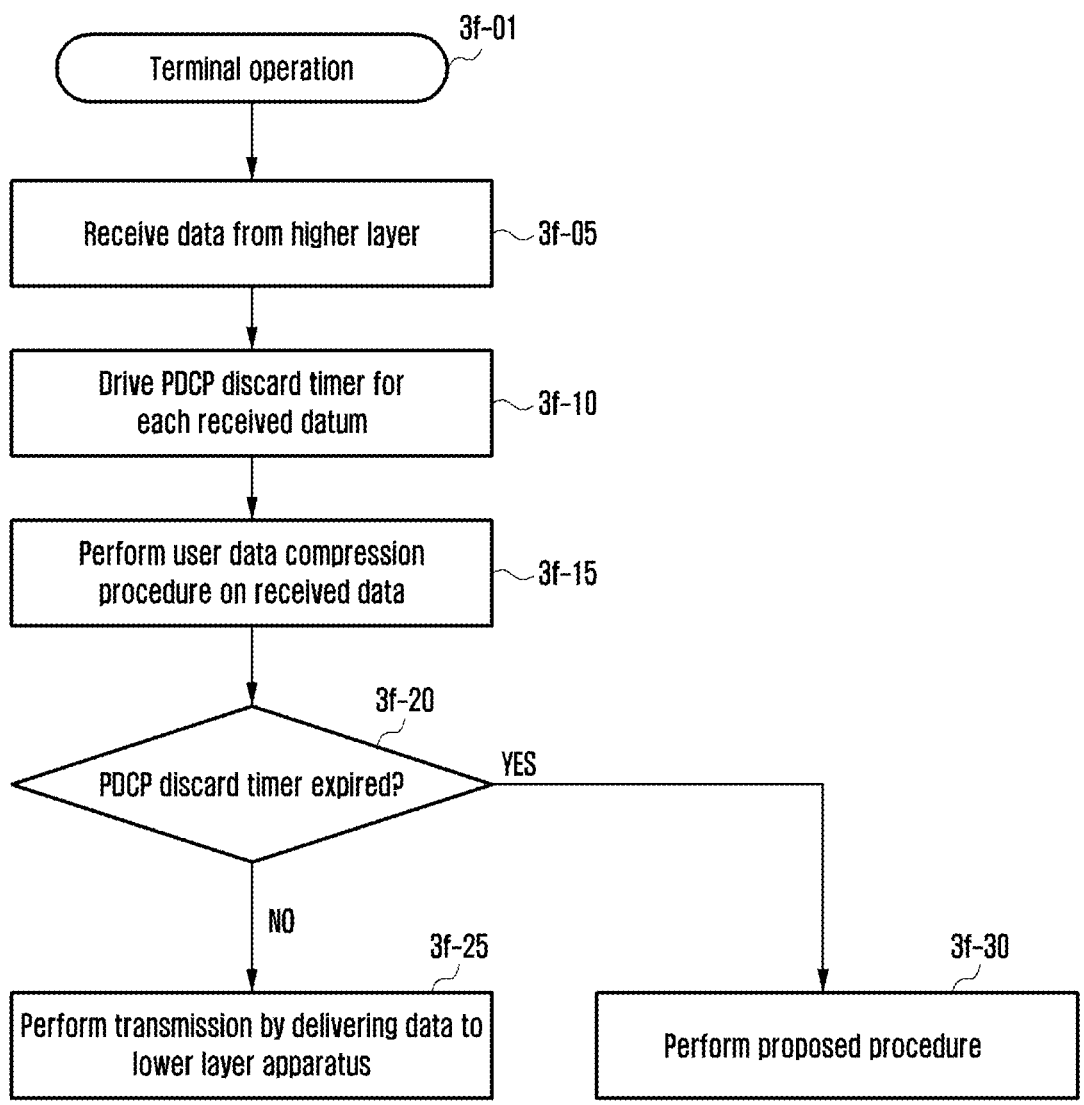
FIG. 3F illustrates a diagram of a terminal operation if a transmission stage PDCP layer apparatus drives a PDCP discard timer, data has not yet been transmitted due to the expiration of the PDCP discard timer, and data to which a user data compression (UDC) procedure has been applied is discarded according to an embodiment of the disclosure.

FIG. 3F illustrates a diagram of a terminal operation when a transmission stage PDCP layer apparatus drives a PDCP discard timer and data that has not yet been transmitted due to the expiration of the PDCP discard timer and to which user compression procedure (UDC) has been applied is discarded in the disclosure.

In FIG. 3F, a terminal 3f-01 may drive a PDCP discard timer (3f-10) for each received datum whenever data is received from a higher layer apparatus (3f-05). If the terminal has been configured to perform uplink data compression (UDC) on data (e.g., PDCP SDU) with respect to a PDCP layer apparatus, the terminal performs UDC on the received data. Furthermore, the terminal performs UDC, updates a buffer based on the data compression, and configures a transmission UDC buffer. If the terminal performs the UDC, it may compress a PDCP SDU, received from a higher layer, into UDC data (or UDC block) having a smaller size (3f-15). Furthermore, the terminal configures a UDC header for the compressed UDC data. The UDC header may include an indicator indicating whether UDC has been performed (e.g., UDC is applied if a 1-bit indicator is 0 and UDC is not applied if a 1-bit indicator is 1 in the UDC header).

In the above description, if the terminal has performed uplink data compression (UDC) on the data (e.g., PDCP SDU) received from a higher layer and updated the UDC buffer, it may calculate checksum bits in order to identify the validity of the updated UDC buffer and include them in the UDC buffer (the checksum bits have a given length and may be configured with 4 bits, for example).

If the terminal has been configured with respect to data to which uplink data decompression has been applied or has not been applied in the above description, the terminal performs integrity protection, performs ciphering, and delivers the data to a lower layer (3f-20).

If a transmission PDCP layer apparatus discards data that has not yet been transmitted due to the expiration of a PDCP discard timer and on which UDC has been performed (3f-30), the terminal may transmit data corresponding to a next PDCP serial number of the discarded data, may discard all the remaining data (i.e., data that has a PDCP serial number greater than a next PDCP serial number of the discarded data, to which UDC has been applied, and that has been stored without being transmitted), and may transmit, to a lower layer apparatus, an indicator indicating that data already delivered to the lower layer apparatus should be discarded if the data has already been delivered. The transmission stage may suspend data transmission until a PDCP control PDU indicating that a checksum failure has occurred is received. The reason for this is that it is evident that user data compression has been previously performed because middle or some data of the UDC-compressed data has been discarded and that a checksum failure may occur in data (e.g., PDCP PDU) having a higher PDCP serial number than the discarded data in a reception PDCP layer apparatus. Accordingly, if the transmission stage transmits data corresponding to a next PDCP serial number of discarded data, the reception PDCP layer apparatus can identify a checksum failure and expect that a PDCP control PDU will be transmitted.

Accordingly, when a PDCP control PDU indicating that a checksum failure has occurred is received or before the PDCP control PDU is received, the transmission PDCP layer apparatus resets a transmission buffer for user data compression (in this case, the transmission UDC buffer is not reset if it has already been reset). The transmission stage may perform a user data compression (UDC) procedure again from data whose PDCP discard timer has not yet expired and that has not yet been transmitted or from data whose PDCP discard timer has not yet expired and that has been finally transmitted (i.e., data transmitted because it corresponds to a next PDCP serial number of the discarded data), may assign a new PDCP serial number or the first PDCP serial number on data that has not yet been transmitted in ascending order, and may prepare data (e.g., PDCP PDU) by ciphering and generating the data. The transmission stage may resume the transmission of the newly generated and prepared data after receiving a PDCP control PDU, indicating that a checksum failure has occurred in the newly generated and prepared data. That is, the transmission stage may deliver the data to a lower layer apparatus. If the PDCP discard timer has not expired, the transmission stage performs transmission by delivering data on which UDC has been performed to a lower layer apparatus (3$f$-25).

Figure 3G:
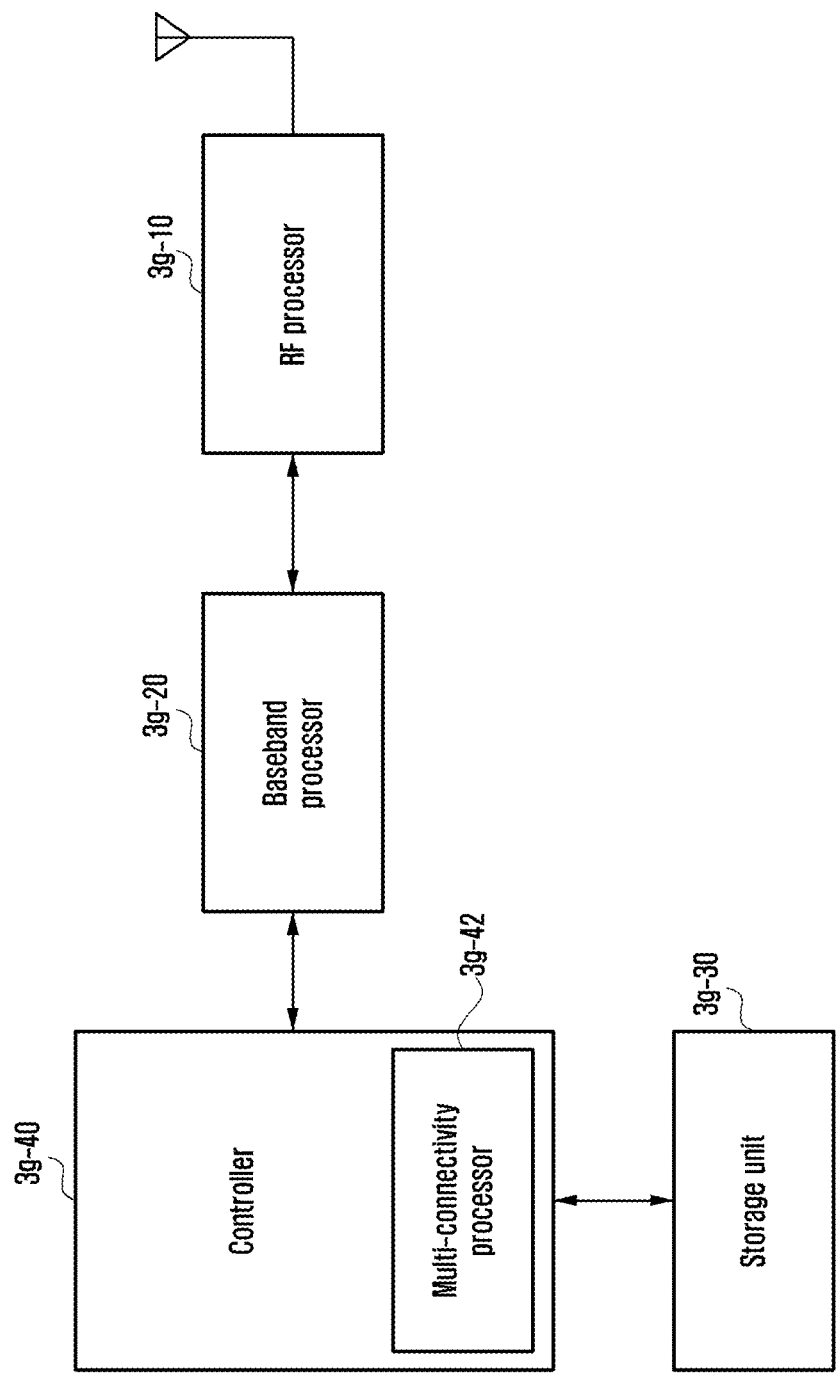
FIG. 3G illustrates the configuration of a terminal related to an embodiment of the disclosure.

FIG. 3G illustrates the configuration of a terminal to which an embodiment of the disclosure may be applied.

Referring to FIG. 3G, the terminal includes a radio frequency (RF) processor 3g-10, a baseband processor 3g-20, a storage unit 3g-30, and a controller 3g-40.

The RF processor 3g-10 performs functions for transmitting/receiving a signal through a radio channel, such as the band conversion and amplification of a signal. That is, the RF processor 3g-10 up-converts a baseband signal received from the baseband processor 3g-20 into an RF band signal, transmits the RF band signal through an antenna, and down-converts an RF band signal received through the antenna into a baseband signal. For example, the RF processor 3g-10 may include a transmission filter, a reception filter, an amplifier, a mixer, an oscillator, a digital to analog convertor (DAC), and an analog to digital convertor (ADC). In FIG. 3G, only one antenna has been illustrated, but the UE may include multiple antennas. Furthermore, the RF processor 3g-10 may include multiple RF chains. Furthermore, the RF processor 3g-10 may perform beamforming. For the beamforming, the RF processor 3g-10 may adjust the phase and size of each of signals transmitted/received through multiple antennas or antenna elements. Furthermore, the RF processor may perform MIMO. When the MIMO operation is performed, the RF processor may receive multiple layers.

The RF processor 3g-10 may properly configure multiple antenna or antenna elements under the control of the controller, and may perform received beam swiping or adjust the direction and beam width of the received beam so that the received beam cooperates with a transmitted beam.

The baseband processor 3g-20 performs a baseband signal and inter-bit stream conversion function based on the physical layer standard of a system. For example, when data is transmitted, the baseband processor 3g-20 generates complex symbols by coding and modulating a transmission bit stream. Furthermore, when data is received, the baseband processor 3g-20 reconstructs a reception bit stream from a baseband signal received from the RF processor 3g-10 through demodulation and decoding. For example, if an orthogonal frequency division multiplexing (OFDM) scheme is applied, when data is transmitted, the baseband processor 3g-20 generates complex symbols by coding and modulating a transmission bit stream, maps the complex symbols to subcarriers, and then configures OFDM symbols through inverse fast Fourier transform (IFFT) operation and cyclic prefix (CP) insertion. Furthermore, when data is received, the baseband processor 3g-20 segments a baseband signal received from the RF processor 3g-10 in an OFDM symbol unit, reconstructs signals mapped to subcarriers through fast Fourier transform (FFT) operation, and reconstructs a reception bit stream through demodulation and decoding.

The baseband processor 3g-20 and the RF processor 3g-10 transmit and receive signals as described above. Accordingly, the baseband processor 3g-20 and the RF processor 3g-10 may be called a transmitter, a receiver, a transceiver or a communication unit. Furthermore, at least one of the baseband processor 3g-20 and the RF processor 3g-10 may include multiple communication modules in order to support different multiple radio access technologies. Furthermore, at least one of the baseband processor 3g-20 and the RF processor 3g-10 may include different communication modules in order to process signals of different frequency bands. For example, the different radio access technologies may include an LTE network and an NR network. Furthermore, the different frequency bands may include a super high frequency (SHF) (e.g., 2.5 GHz, 5 GHz) band and a millimeter wave (e.g., 60 GHz) band.

The storage unit 3g-30 stores data, such as a basic program, an application program, and configuration information for the operation of the UE. The storage unit 3g-30 provides stored data in response to a request from the controller 3g-40.

The controller 3g-40 controls an overall operation of the UE. For example, the controller 3g-40 transmits/receives a signal through the baseband processor 3g-20 and the RF processor 3g-10. Furthermore, the controller 3g-40 writes data in the storage unit 3g-40 and reads data from the storage unit 3g-40. To this end, the controller 3g-40 may include at least one processor. For example, the controller 3g-40 may include a communication processor (CP) performing control for communication and an application processor (AP) controlling a higher layer, such as an application program. Furthermore, the controller 3g-40 may include a multi-connectivity processor 3g-42 configured to perform processing for an operation in a multi-connection mode.

Figure 3H:
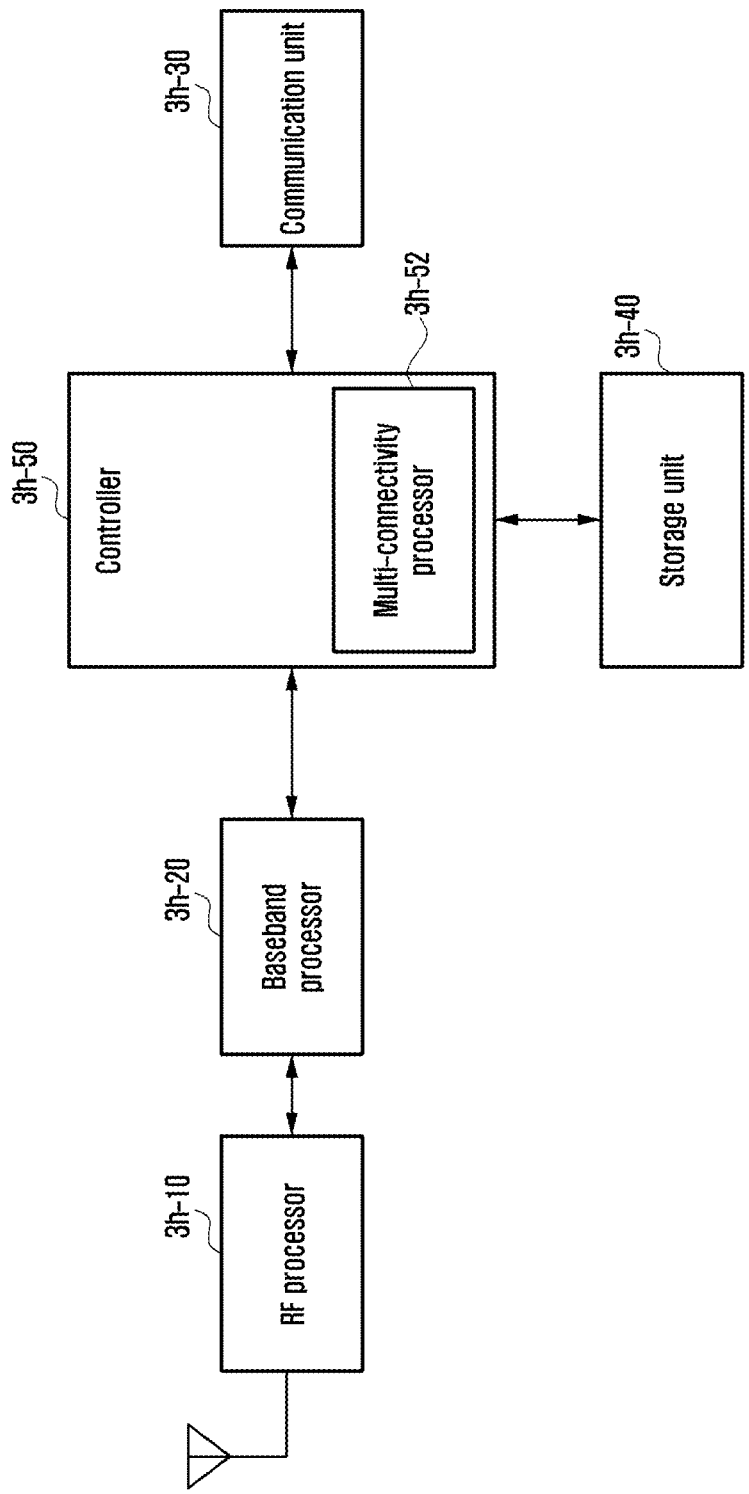
FIG. 3H illustrates a block diagram of a TRP in a wireless communication system related to an embodiment of the disclosure.

FIG. 3H illustrates a block diagram of a TRP in a wireless communication system to which an embodiment of the disclosure may be applied.

As shown in FIG. 3H, the base station is configured to include an RF processor 3h-10, a baseband processor 3h-20, a backhaul communication unit 3h-30, a storage unit 3h-40 and a controller 3h-50.

The RF processor 3h-10 performs a function for transmitting/receiving a signal through a radio channel, such as the band conversion and amplification of a signal. That is, the RF processor 3h-10 up-converts a baseband signal received from the baseband processor 3h-20 into an RF band signal, transmits the RF band signal through an antenna, and down-converts an RF band signal received through the antenna into a baseband signal. For example, the RF processor 3h-10 may include a transmission filter, a reception filter, an amplifier, a mixer, an oscillator, a DAC, and an ADC. In FIG. 3H, only one antenna has been illustrated, but the first access node may include multiple antennas. Furthermore, the RF processor 3h-10 may include multiple RF chains. Furthermore, the RF processor 3h-10 may perform beamforming. For the beamforming, the RF processor 3h-10 may adjust the phase and size of each of signals transmitted/received multiple antennas or antenna elements. The RF processor may perform a downlink MIMO operation by transmitting one or more layers.

The baseband processor 3h-20 performs a baseband signal and inter-bit stream conversion function based on the physical layer standard of a first radio access technology. For example, when data is transmitted, the baseband processor 3h-20 generates complex symbols by coding and modulating a transmission bit stream. Furthermore, when data is received, the baseband processor 3h-20 reconstructs a reception bit stream from a baseband signal received from the RF processor 3h-10 through demodulation and decoding. For example, if the OFDM scheme is applied, when data is transmitted, the baseband processor 3h-20 generates complex symbols by coding and modulating a transmission bit stream, maps the complex symbols to subcarriers, and configures OFDM symbols through IFFT operation and CP insertion. Furthermore, when data is received, the baseband processor 3h-20 segments a baseband signal received from the RF processor 3h-10 in an OFDM symbol unit, reconstructs signals mapped to subcarriers through FFT operation, and then reconstructs a reception bit stream through demodulation and decoding. The baseband processor 3h-20 and the RF processor 3h-10 transmit and receive signals as described above. Accordingly, the baseband processor 3h-20 and the RF processor 3h-10 may be called a transmitter, a receiver, a transceiver, a backhaul communication unit or a wireless backhaul communication unit.

The backhaul communication unit 3h-30 provides an interface for performing communication with other nodes within a network.

The storage unit 3h-40 stores data, such as a basic program, an application program, and configuration information for the operation of the base station. Specifically, the storage unit 3h-40 may store information on a bearer allocated to an accessed UE and measurement results reported by an accessed UE. Furthermore, the storage unit 3h-40 may store information, that is, a criterion by which whether to provide a UE with multiple connections is determined. Furthermore, the storage unit 3h-40 provides stored data in response to a request from the controller 3h-50.

The controller 3h-50 controls an overall operation of the primary base station. For example, the controller 3h-50 transmits/receives a signal through the baseband processor 3h-20 and the RF processor 3h-10 or through the backhaul communication unit 3h-30. Furthermore, the controller 3h-50 writes data in the storage unit 3h-40 and reads data from the storage unit 3h-40. To this end, the controller 3h-50 may include at least one processor. Furthermore, the controller 3h-50 may include a multi-connectivity processor 3h-52 configured to perform processing for an operation in a multi-connection mode.

Hereinafter, the disclosure proposes a method of effectively performing the user data compression method (or uplink data compression (UDC) proposed in the disclosure if an SDAP layer apparatus has been configured or an SDAP header has been configured.

The disclosure proposes a (3-3-1) embodiment in which the user data compression method is efficiently performed if an SDAP layer apparatus has been configured or an SDAP header has been configured through an RRC message as follows. In the (3-3-1) embodiment, an SDAP header is compressed using a user data compression method and a UDC header is ciphered. Accordingly, due to such characteristics, convenience of an implementation can be improved because the same procedure can be performed on higher layer data regardless of whether an SDAP header is present, and security can be enhanced by ciphering a UDC header.

Figure 3I:
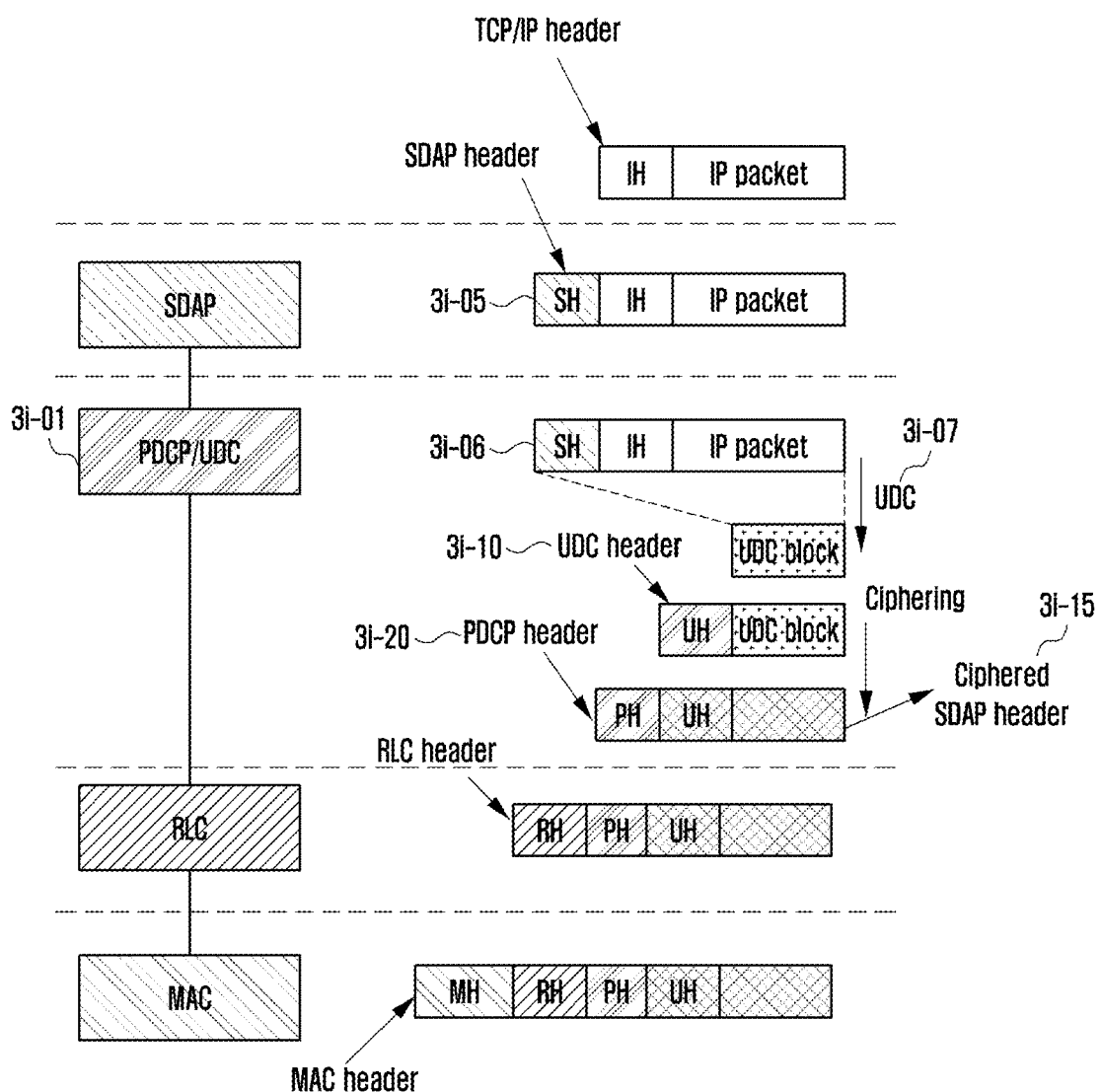
FIG. 3I illustrates a diagram of an embodiment in which an SDAP layer apparatus efficiently performs a user data compression method if a configuration or SDAP header has been configured through an RRC message according to an embodiment of the disclosure.

FIG. 3I illustrates a diagram of the (3-3-1) embodiment in which a user data compression method is efficiently performed if an SDAP layer apparatus has been configured or an SDAP header has been configured through an RRC message in the disclosure.

In FIG. 3I, if an SDAP layer apparatus has been configured to be used or an SDAP header has been configured to be used through an RRC message, such as 3a-10 or 3a-40 or 3a-75 in FIG. 3A, and if user data compression (or uplink data compression) (UDC) has been configured, when data is received from a higher layer, the SDAP layer apparatus may generate and configure an SDAP header (SH) like 3i-05, and may deliver the SDAP header to a PDCP layer apparatus. The PDCP layer apparatus may perform user data compression on a PDCP SDU (i.e., SDAP header and IP packet) 3i-06 received from the higher SDAP layer apparatus (3i-07). Furthermore, the PDCP layer apparatus may calculate a checksum field, may configure whether UDC has been applied, and may generate and attach a UDC header (UH) (3i-10). Furthermore, the PDCP layer apparatus may perform ciphering on the UDC header and a compressed UDC block, may generate and configure a PDCP header (PH) 3i-20, and may attach the PDCP header and deliver it to a lower layer. Accordingly, an RLC layer apparatus and an MAC layer apparatus may perform data processing.

In the procedure described in FIG. 3I, the SDAP header is compressed using a user data compression method and a UDC header is ciphered. Accordingly, due to such characteristics, convenience of an implementation can be improved because the same procedure can be performed on higher layer data regardless of whether an SDAP header is present, and security can be enhanced by ciphering a UDC header.

The disclosure proposes a (3-3-2) embodiment in which a user data compression method is efficiently performed if an SDAP layer apparatus has been configured or an SDAP header has been configured through an RRC message as follows. In the (3-3-2) embodiment, a user data compression method is not applied to an SDAP header, an SDAP header is not ciphered, and a UDC header is ciphered. Accordingly, there is an advantage in that a transmission stage or a reception stage can use QoS information of an SDAP header without a need for a deciphering procedure for information of the SDAP header due to such characteristics. For example, a base station may use QoS information for scheduling. Furthermore, even in a terminal implementation, a UDC procedure and ciphering can be performed through a hardware accelerator without a need to generate an SDAP header whenever higher layer data is received, and an SDAP header can be attached later. Accordingly, a terminal implementation is made easy. Furthermore, security can be enhanced because a UDC header is ciphered.

Figure 3J:
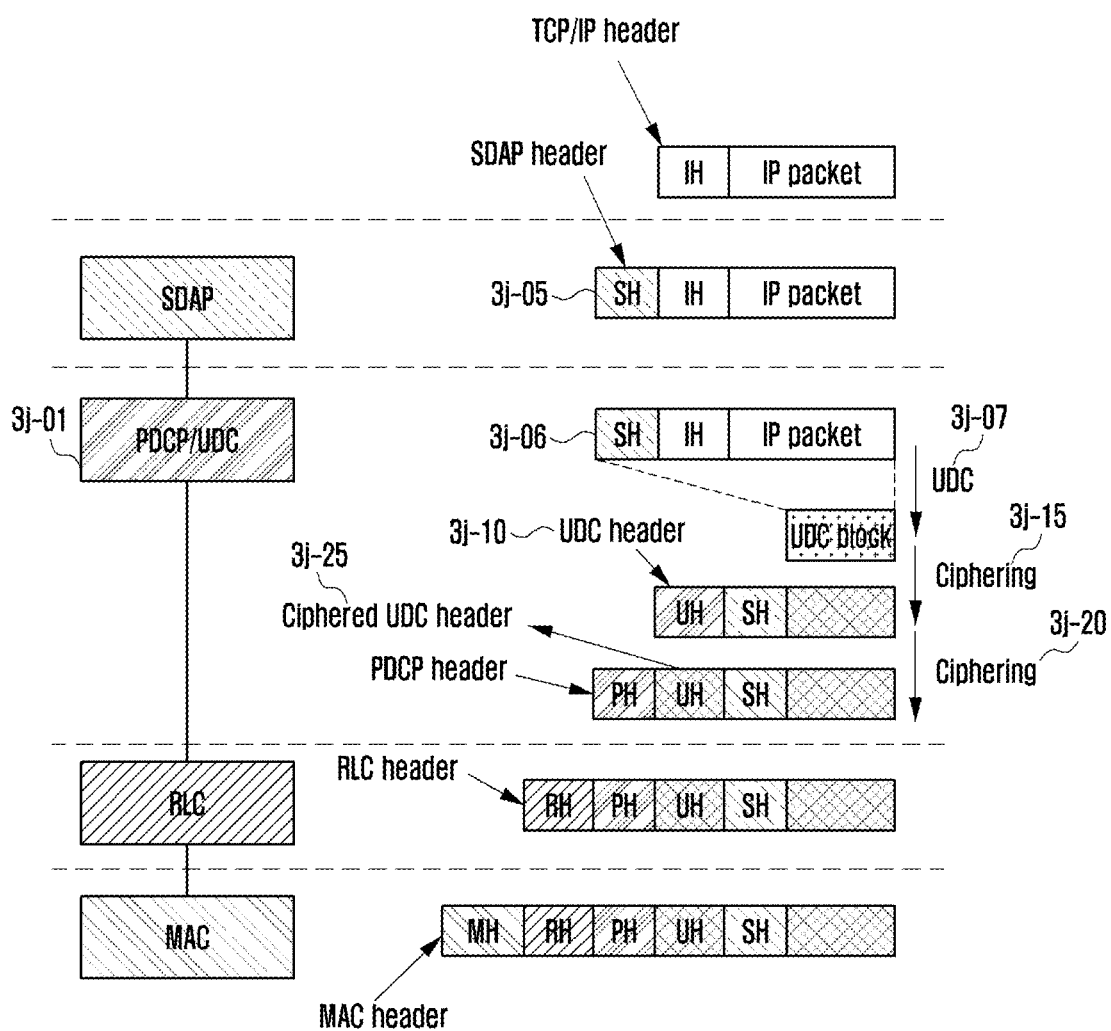
FIG. 3J illustrates a diagram of another embodiment in which an SDAP layer apparatus efficiently performs a user data compression method if a configuration or SDAP header has been configured through an RRC message according to an embodiment of the disclosure.

FIG. 3J illustrates a diagram of the (3-3-2) embodiment in which a user data compression method is efficiently performed if an SDAP layer apparatus has been configured or an SDAP header has been configured through an RRC message in the disclosure.

In FIG. 3J, if an SDAP layer apparatus has been configured to be used or an SDAP header has been configured to be used through an RRC message, such as 3a-10 or 3a-40 or 3a-75 in FIG. 3A, and if user data compression (or uplink data compression) (UDC) has been configured, when data is received from a higher layer, the SDAP layer apparatus may generate and configure an SDAP header (SH) like 3j-05 and deliver the SDAP header to a PDCP layer apparatus. The PDCP layer apparatus may perform a user data compression (UDC) procedure on the remaining data part of a PDCP SDU (i.e., SDAP header and IP packet) 3j-06, received from the higher SDAP layer apparatus, except the SDAP header (SH) (3j-07). Furthermore, the PDCP layer apparatus may calculate a checksum field, may configure whether UDC has been applied, may generate a UDC header (UH), and may attach the UDC header (UH) ahead of the SDAP header (SH) (3j-10). Furthermore, if integrity protection has been configured, the PDCP layer apparatus may apply integrity protection to the UDC header and a compressed UDC block prior to a ciphering procedure, may perform ciphering on the UDC block in order to perform ciphering on the UDC header and the compressed UDC block, and may also separately perform ciphering on the UDC header (3j-15, 3j-20). If the ciphering procedure is to be performed only, the SDAP header may be detached halfway, and ciphering may be performed on the UDC header and the UDC block only once. The PDCP layer apparatus may configure data by inserting an enciphered SDAP header between the UDC header and the UDC block again, may generate and configure a PDCP header (PH) 3j-20, may attach it to the data, and may deliver the data to a lower layer. Accordingly, an RLC layer apparatus and an MAC layer apparatus may perform data processing.

The disclosure proposes a (3-3-3) embodiment in which a user data compression method is efficiently performed if an SDAP layer apparatus has been configured or an SDAP header has been configured through an RRC message as follows. In the (3-3-3) embodiment, a user data compression method is not applied to an SDAP header, an SDAP header is not ciphered, and a UDC header is not ciphered. Due to such characteristics, there is an advantage in that a transmission stage or a reception stage can use QoS information of an SDAP header without a need for a deciphering procedure for information of an SDAP header. For example, a base station may use QoS information for scheduling. Furthermore, even in a terminal implementation, a UDC procedure can be performed and ciphering can be performed through a hardware accelerator without a need to generate an SDAP header whenever higher layer data is received, and the SDAP header can be attached later. Accordingly, a terminal implementation is made easy. Furthermore, since a UDC header is not ciphered, the SDAP layer apparatus may continue to perform a user data compression procedure and ciphering procedure on data received from a higher layer through a hardware accelerator. An SDAP header and UDC header and PDCP header generated after data processing for a PDCP layer apparatus is completed may be attached to the front of data on which data processing has been completed at the tail end, and may be delivered to a lower layer. Accordingly, there is an advantage in that an implementation of a terminal is simplified. Furthermore, if ciphering is not performed on the UDC header in the procedure, a reception stage can identify the validity of UDC buffer content by first reading and calculating the checksum field of the UDC header before performing deciphering. Accordingly, if a checksum failure occurs, the reception stage may immediately discard corresponding data without performing a deciphering procedure, and may perform a checksum failure handling procedure. Accordingly, a processing handling burden can be reduced.

Figure 3K:
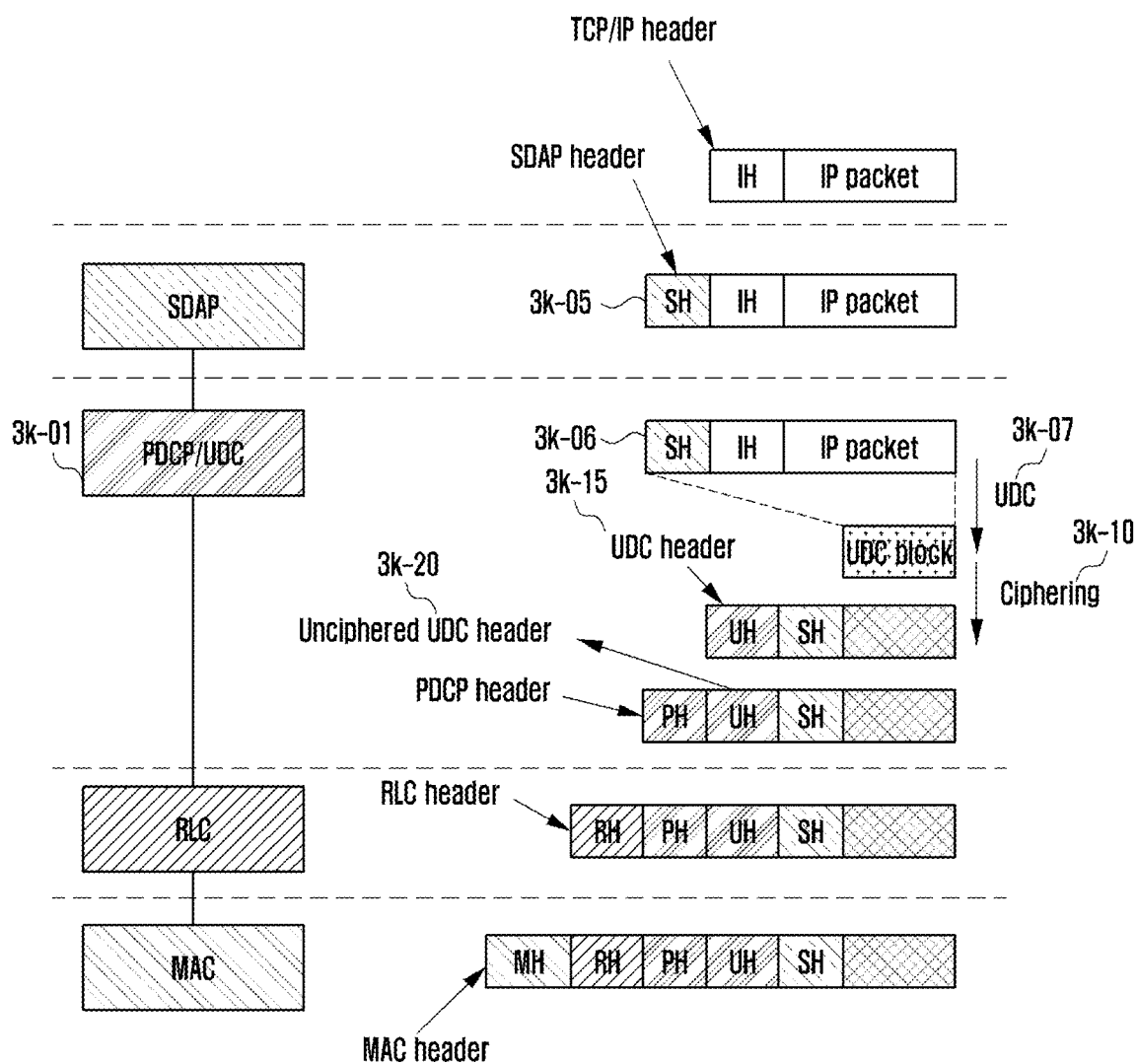
FIG. 3K illustrates a diagram of yet another embodiment in which an SDAP layer apparatus efficiently performs a user data compression method if a configuration or SDAP header has been configured through an RRC message according to an embodiment of the disclosure.

FIG. 3K illustrates a diagram of the (3-3-3) embodiment in which a user data compression method is efficiently performed if an SDAP layer apparatus has been configured or an SDAP header has been configured through an RRC message in the disclosure.

In FIG. 3K, if the SDAP layer apparatus has been configured to use an SDAP layer apparatus function or to use an SDAP header through an RRC message, such as 3a-10 or 3a-40 or 3a-75 in FIG. 3A, and user data compression (or uplink data compression) (UDC) has been configured, when data is received from a higher layer, the SDAP layer apparatus may generate and configure an SDAP header (SH) like 3k-05, and may deliver the SDAP header to a PDCP layer apparatus. The PDCP layer apparatus may perform user data compression on the remaining data part of a PDCP SDU (i.e., SDAP header and IP packet) 3k-06, received from the higher SDAP layer apparatus, except the SDAP header (3k-07). Furthermore, if integrity protection has been configured, the PDCP layer apparatus may apply integrity protection on a UDC block and a UDC header (UH), SDAP header and PDCP header compressed by the user data compression prior to a ciphering procedure. Furthermore, the PDCP layer apparatus may apply ciphering to only the UDC block, compressed by the user data compression, except the UDC header and the SDAP header (3k-10). Furthermore, the PDCP layer apparatus may calculate a checksum field, may configure whether UDC has been applied, and may generate and attach a UDC header (UH) (3k-15 and 3k-20). Furthermore, after a PDCP header is generated, configured and attached, the PDCP layer apparatus may deliver the PDCP header to a lower layer. An RLC layer apparatus and an MAC layer apparatus may perform data processing. If a UDC header is not applied to an SDAP header and ciphering is not applied to a UDC header as proposed above, a user data compression procedure and a ciphering or deciphering procedure are simplified in terminal and base station implementations. Furthermore, a handling procedure of an implementation can be simplified and a processing burden can be reduced because a complicated procedure is obviated.

The disclosure proposes a (3-3-4) embodiment in which a user data compression method is efficiently performed if an SDAP layer apparatus has been configured or an SDAP header has been configured through an RRC message as follows. In the (3-3-4) embodiment, a user data compression method may not be applied to an SDAP header, an SDAP header may not be ciphered, a UDC header may be ciphered, a UDC header may be attached behind an SDAP header or a UDC header may be attached right ahead of a compressed UDC block, and an SDAP header may be attached ahead of a UDC header. Due to such characteristics, there is an advantage in that a transmission stage or reception stage can use QoS information of an SDAP header without a deciphering procedure. For example, a base station can use the QoS information for scheduling. Furthermore, even in a terminal implementation, a UDC procedure can be performed through a hardware accelerator without a need to generate an SDAP header whenever higher layer data is received, UDC can be directly generated and attached, ciphering can be performed, and an SDAP header can be attached later. Accordingly, a terminal implementation is made easy. Furthermore, security can be enhanced by ciphering a UDC header. Furthermore, in the embodiment, the location of an SDAP header and the location of a UDC header are shifted. Accordingly, there are advantages in that when a user data compression procedure is performed, an unnecessary procedure of performing processing except the SDAP header or performing processing after the SDAP header is detached can be reduced and a single unified procedure can be performed on a UDC header and a UDC data block.

Figure 3L:
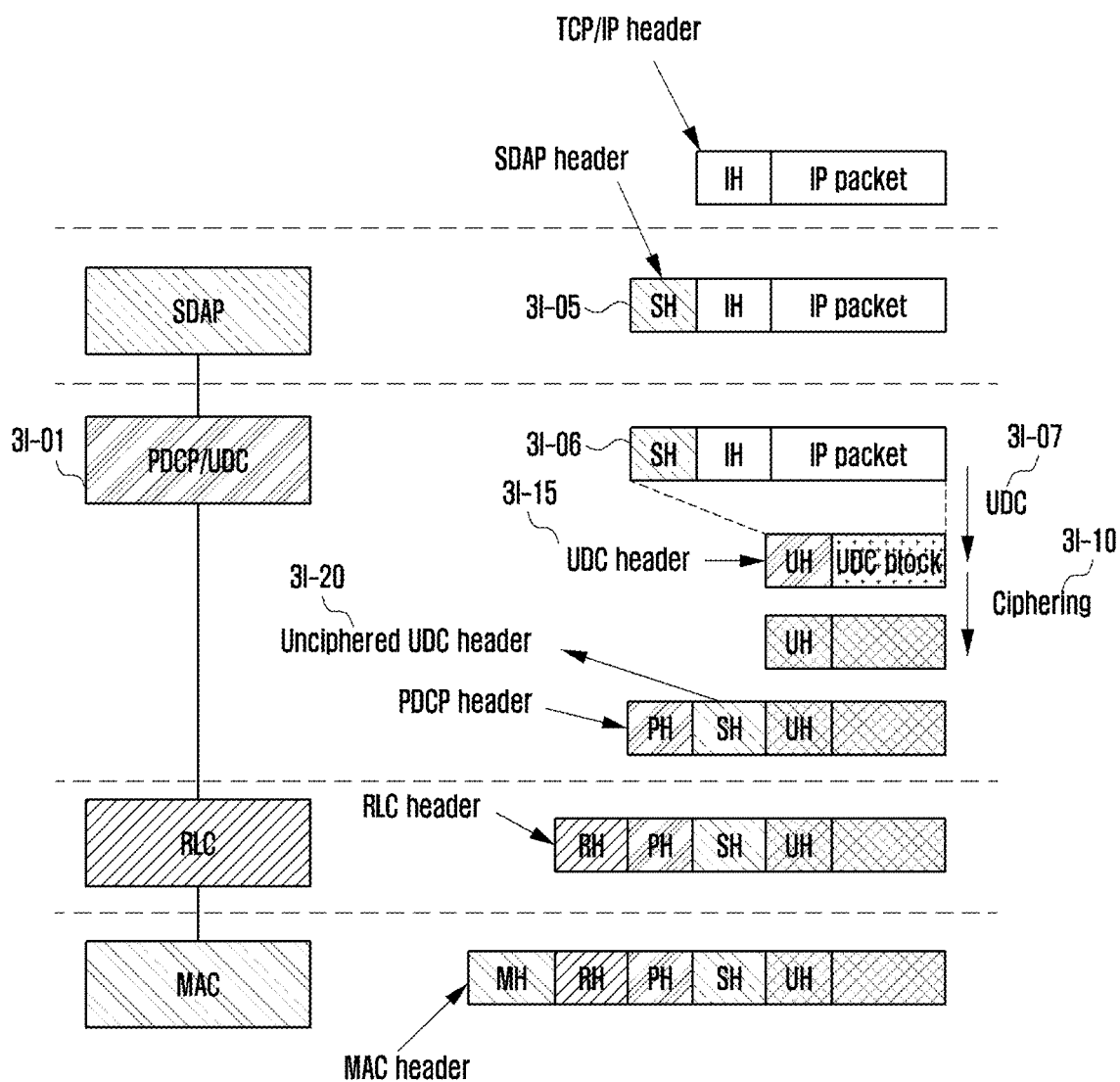
FIG. 3L illustrates a diagram of yet another embodiment in which an SDAP layer apparatus efficiently performs a user data compression method if a configuration or SDAP header has been configured through an RRC message according to an embodiment of the disclosure.

FIG. 3L illustrates a diagram of a (3-3-4) embodiment in which a user data compression method is efficiently performed if an SDAP layer apparatus has been configured or an SDAP header has been configured through an RRC message in the disclosure.

In FIG. 3L, if the SDAP layer apparatus has been configured to be used or the SDAP header has been configured to be used through an RRC message, such as 3a-10 or 3a-40 or 3a-75 in FIG. 3A, and user data compression (or uplink data compression) (UDC) has been configured, when data is received from a higher layer, the SDAP layer apparatus may generate and configure an SDAP header (SH) like 3l-05, and may deliver the SDAP header to a PDCP layer apparatus. The PDCP layer apparatus may perform a user data compression (UDC) procedure on the remaining data part of a PDCP SDU (i.e., SDAP header and IP packet) 3l-06, received from the higher SDAP layer apparatus, except the SDAP header (3l-07). Furthermore, the PDCP layer apparatus may calculate a checksum field, may configure whether UDC has been applied, may generate a UDC header (UH), and may attach the UDC header right ahead of the compressed UDC data block (or behind the SDAP header (SH)) (3l-10). Furthermore, if integrity protection has been configured, the PDCP layer apparatus may apply integrity protection to the SDAP header and UDC header and compressed UDC block and PDCP header before performing a ciphering procedure, and may perform ciphering on the UDC header and the compressed UDC block. The PDCP layer apparatus may configure data, may generate and configure a PDCP header (PH) 3l-20, may first attach the SDAP header, and may attach the PDCP header and deliver it to a lower layer. Accordingly, an RLC layer apparatus and an MAC layer apparatus may perform data processing.

The disclosure proposes a (3-3-5) embodiment in which a user data compression method is efficiently performed if an SDAP layer apparatus has been configured or an SDAP header has been configured through an RRC message as follows. In the (3-3-5) embodiment, a user data compression method may not be applied to an SDAP header, an SDAP header may not be ciphered, a UDC header may not be ciphered, a UDC header may be attached behind an SDAP header or a UDC header may be attached right ahead of a compressed UDC block, and an SDAP header may be attached ahead of a UDC header.

Due to such characteristics, there is an advantage in that a transmission stage or reception stage can use QoS information of an SDAP header without a need for a deciphering procedure for information of an SDAP header. For example, a base station may use the QoS information for scheduling. Furthermore, even in a terminal implementation, a UDC procedure and ciphering may be performed through a hardware accelerator without a need to attach an SDAP header whenever higher layer data is received, UDC may be directly generated and attached, and an SDAP header may be attached later. Accordingly, a terminal implementation is made easy. Furthermore, in an implementation, an SDAP layer apparatus may perform a user data compression (UDC) procedure and ciphering procedure on data received from a higher layer through a hardware accelerator, may generate an SDAP header, a UDC header and a PDCP header in parallel, may attach the headers ahead of data, generated as the results of the hardware accelerator, at a time, and may deliver the data to a lower layer. Accordingly, terminal implementation complexity can be reduced.

Furthermore, in the embodiment, the location of an SDAP header and the location of a UDC header are shifted. Accordingly, there are advantages in that when a user data compression procedure is performed, an unnecessary procedure of performing processing except the SDAP header or performing processing after the SDAP header is detached can be reduced and a single unified procedure can be performed on a UDC header and a UDC data block. Furthermore, there are advantages in that a reception stage can first identify whether a checksum failure occurs before performing deciphering because a UDC header is not ciphered, and if a checksum failure occurs, the reception stage data can discard data and directly perform a checksum failure handling procedure before performing deciphering.

Figure 3M:
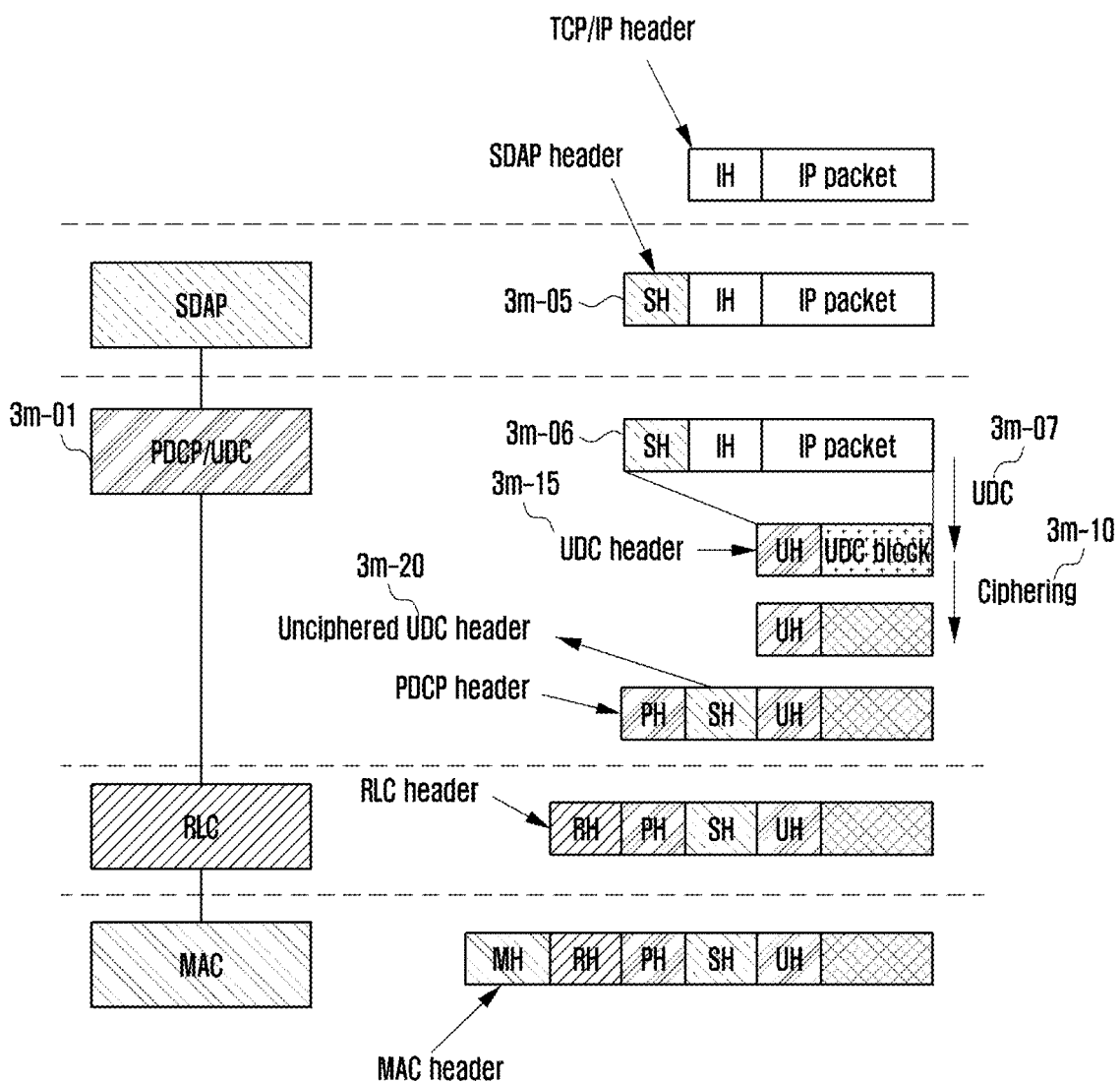
FIG. 3M illustrates a diagram of yet another embodiment in which an SDAP layer apparatus efficiently performs a user data compression method if a configuration or SDAP header has been configured through an RRC message according to an embodiment of the disclosure.

FIG. 3M illustrates a diagram of a (3-3-5) embodiment in which a user data compression method is efficiently performed if an SDAP layer apparatus has been configured or an SDAP header has been configured through an RRC message in the disclosure.

In FIG. 3M, if an SDAP layer apparatus has been configured to be used or an SDAP header has been configured to be used through an RRC message, such as 3a-10 or 3a-40 or 3a-75 in FIG. 3A, and user data compression (or uplink data compression) (UDC) has been configured, when data is received from a higher layer, the SDAP layer apparatus may generate and configure an SDAP header (SH) like 3m-05 and deliver the SDAP header to a PDCP layer apparatus. A PDCP layer apparatus may perform a user data compression (UDC) procedure on the remaining data part of a PDCP SDU (i.e., SDAP header and IP packet) 3m-06, received from the higher SDAP layer apparatus, except the SDAP header (3m-07). Furthermore, the PDCP layer apparatus may calculate a checksum field, may configure whether UDC has been applied, may generate a UDC header (UH), and may attach the UDC header right ahead of the compressed UDC data block (behind the SDAP header) (3m-10). Furthermore, if integrity protection has been configured, the PDCP layer apparatus may apply integrity protection on the SDAP header, UDC header, compressed UDC block and PDCP header before performing a ciphering procedure, and then may perform ciphering on only the compressed UDC block except the SDAP header and the UDC header. Furthermore, the PDCP layer apparatus may configure data, may generate and configure a PDCP header (PH) 3m-20, may first attach the SDAP header and then attach the PDCP header, and may deliver them to a lower layer. Accordingly, an RLC layer apparatus and an MAC layer apparatus may perform data processing.

The disclosure proposes a (3-3-6) embodiment in which a user data compression method is efficiently performed if an SDAP layer apparatus has been configured or an SDAP header has been configured through an RRC message as follows. In the (3-3-6) embodiment, an SDAP header is compressed using a user data compression method and a UDC header is not ciphered. Due to such characteristics, there is an advantage in that convenience of an implementation can be improved because the same procedure can be performed on higher layer data regardless of whether an SDAP header is present. Furthermore, there are advantages in that a reception stage can first identify whether a checksum failure occurs before performing deciphering because a UDC header is not ciphered and if a checksum failure occurs, the reception stage can discard data and directly perform a checksum failure handling procedure before performing deciphering.

Figure 3N:
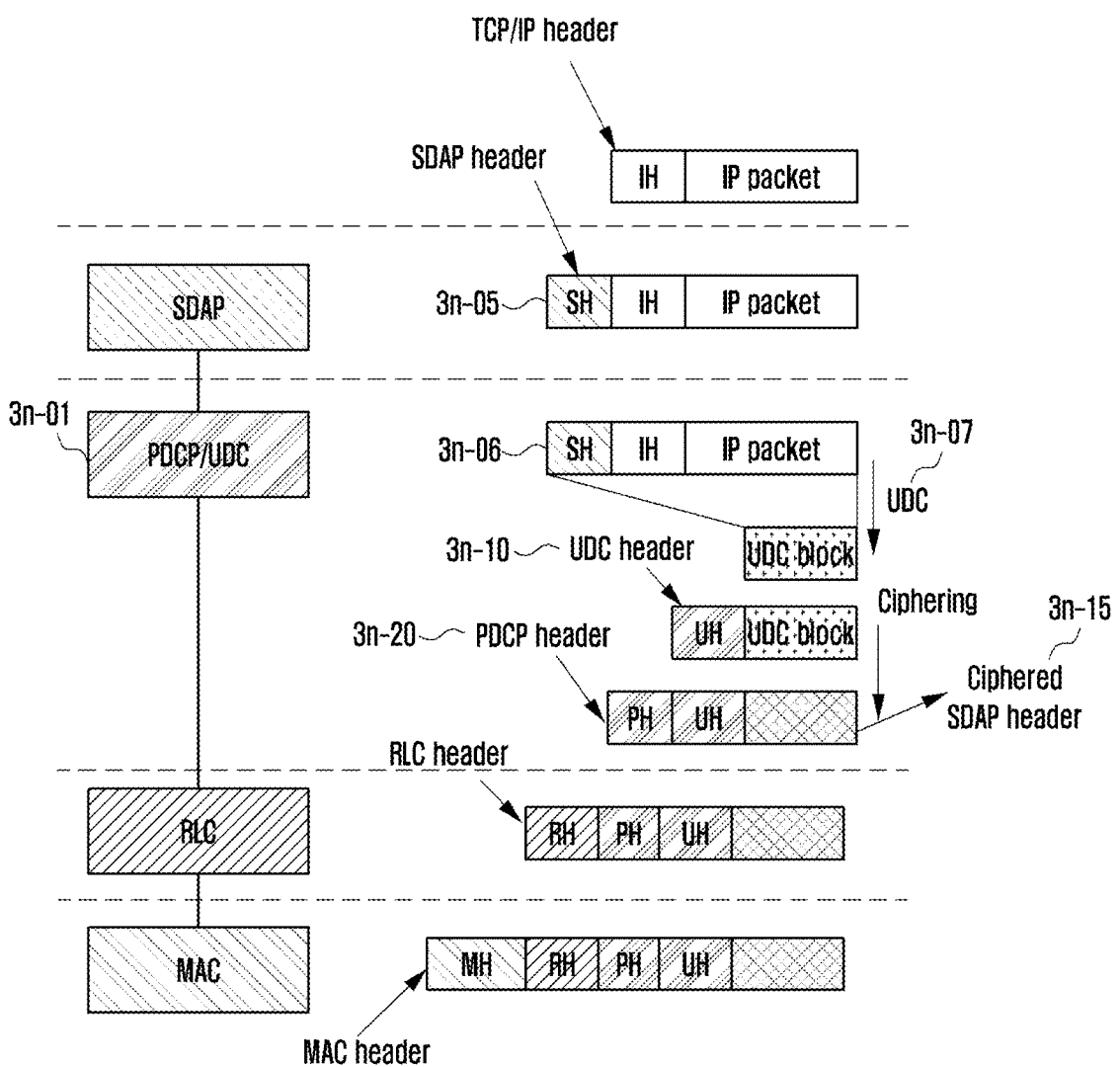
FIG. 3N illustrates a diagram of yet another embodiment in which an SDAP layer apparatus efficiently performs a user data compression method if a configuration or SDAP header has been configured through an RRC message according to an embodiment of the disclosure.
Figure 30:
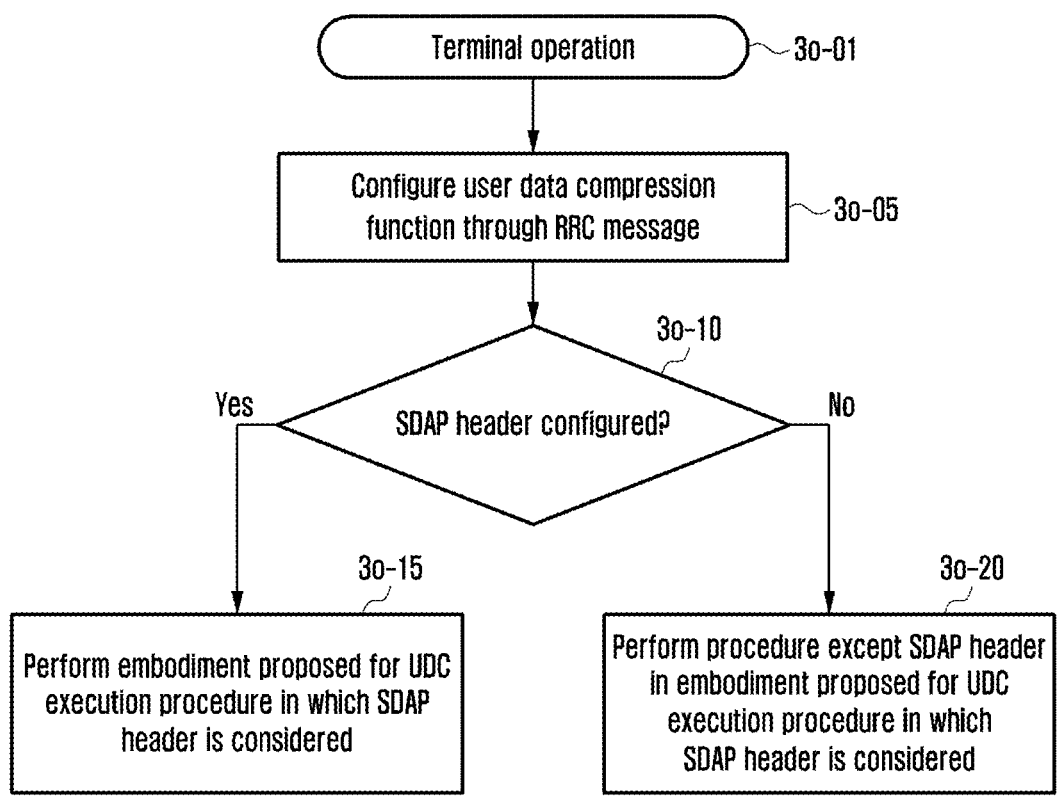

FIG. 3N illustrates a diagram of a (3-3-6) embodiment in which a user data compression method is efficiently performed if an SDAP layer apparatus has been configured or an SDAP header has been configured through an RRC message in the disclosure.

In FIG. 3N, if the SDAP layer apparatus has been configured to be used or the SDAP header has been configured to be used through an RRC message, such as 3a-10 or 3a-40 or 3a-75 in FIG. 3A, and user data compression (or uplink data compression) (UDC) has been configured, when data is received from a higher layer, the SDAP layer apparatus may generate and configure an SDAP header (SH) like 3n-05, and may deliver the SDAP header to a PDCP layer apparatus. The PDCP layer apparatus may perform user data compression (UDC) on a PDCP SDU (i.e., SDAP header and IP packet) 3n-06 received from the higher SDAP layer apparatus (3n-07). Furthermore, the PDCP layer apparatus may calculate a checksum field, may configure whether UDC has been applied, and may generate and attach a UDC header (UH) (3n-10). Furthermore, the PDCP layer apparatus may perform ciphering on only the compressed UDC block except the UDC header, may generate and configure a PDCP header (PH) 3n-20, may attach the PDCP header and the UDC header, and may deliver them to a lower layer. Accordingly, an RLC layer apparatus and an MAC layer apparatus may perform data processing.

FIG. 3O is a diagram illustrating a terminal operation proposed in the disclosure.

In FIG. 3O, a terminal 3o-01 may be configured to apply a user data compression function by an RRC message, such as 3a-10 or 3a-40 or 3a-75 in FIG. 3A (3o-05). Furthermore, if an SDAP layer apparatus has been configured to be used or an SDAP header has been configured to be used through the RRC message (3o-10), the terminal may perform the (3-3-1) or (3-3-2) or (3-3-3) or (3-3-4) or (3-3-5) or (3-3-6) embodiment in which a user data compression method is efficiently performed if an SDAP layer apparatus has been configured or an SDAP header has been configured in the disclosure (3o-15). If an SDAP layer apparatus has not been configured to be used or an SDAP header has not been configured to be used through the RRC message (3o-10), however, the terminal may perform, without any change, a procedure other than data processing for an SDAP header in the (3-3-1) or (3-3-2) or (3-3-3) or (3-3-4) or (3-3-5) or (3-3-6) embodiment in which a user data compression method is efficiently performed if an SDAP layer apparatus has been configured or an SDAP header has been configured in the disclosure in the disclosure.

The disclosure has proposed various cases which may occur due to the generation and ciphering procedures of an SDAP header and an uplink data compression procedure (or uplink data compression) (UDC) and the implementation methods according to the cases.

In the above description, whether to use an SDAP header for each bearer may be configured by a base station through an RRC message as described with reference to FIG. 3A. Whether UDC has been applied for each bearer may be configured by a base station through an RRC message as described above.

The disclosure proposes that an SDAP header and UDC cannot be used for one bearer at the same time when a base station configures whether to use an SDAP header and whether to apply UDC for each bearer through an RRC message. That is, the SDAP header cannot be configured for a DRB configured with UDC or both the SDAP header and the UDC cannot be configured for a DRB or either the SDAP header or the UDC can be configured for a the DRB, not both. That is, a base station may prevent whether to use an SDAP header and whether to apply UDC from being configured for one bearer at the same time through an RRC message. As described above, when a UDC procedure is performed on a bearer in which UDC has been configured, the UDC procedure becomes complicated and implementation complexity is increased due to the generation and non-ciphering of an SDAP header. The UDC is applied to uplink data. A case where an SDAP header is applied to uplink data corresponds to a case where re-mapping between a bearer and a flow is configured. Such a case may not be an appropriate case if UDC is used. The reason for this is that it is very inefficient to perform re-mapping between a bearer and flows on a bearer to which UDC has been applied because a transmission stage and a reception stage need to be synchronized for data compression in a UDC procedure.

Accordingly, if the use of an SDAP header and the configuration of UDC are not configured for one bearer at the same time in order to solve such complexity, the above complicated problems do not occur. Accordingly, as another embodiment, the disclosure proposes that a base station does not permit a terminal to configure the use of an SDAP hearer and the configuration of UDC for one bearer at the same time.

In the above description, the base station may cipher a UDC header for security enhancement purposes when it does not configure the use of an SDAP hearer and the configuration of UDC for one bearer at the same time in a terminal. That is, when higher layer data is received, the terminal may perform data compression using a UDC procedure and may generate a UDC header. Thereafter, the terminal may perform ciphering on the UDC header and compressed UDC data block, may generate a PDCP header ahead of the ciphered UDC header and UDC data block, and may connect and transmit them to a lower layer.

As another method, in the above description, when a base station does not configure the use of an SDAP hearer and the configuration of UDC for one bearer at the same time with respect to a terminal, the terminal may be configured to rapidly check the checksum field of a UDC header and to rapidly determine whether to discard UDC data, thereby being capable of reducing the number of deciphering procedures. That is, the terminal may not cipher the UDC header. That is, when higher layer data is received, the terminal may perform data compression using a UDC procedure, may perform ciphering on the compressed data block, may generate a UDC header and a PDCP header, may connect the UDC header and PDCP header ahead of the ciphered UDC data block, and may deliver them to a lower layer. Accordingly, a reception PDCP layer apparatus may identify the UDC header before performing deciphering, and may identify the validity of UDC based on a checksum field. If the validity of UDC is not valid, the reception PDCP layer apparatus may directly discard the received data without performing deciphering. The reception PDCP layer apparatus may perform deciphering and a user data decompression procedure on only data whose validity has been identified based on a checksum field.

Furthermore, likewise, a complicated implementation problem may occur when an integrity protection procedure is configured for one bearer along with whether to use an SDAP header or whether to apply UDC. Accordingly, a base station may not permit that the use of an SDAP header and integrity protection are configured for one bearer at the same time. Furthermore, a base station may not permit the configuration of integrity verification and whether to apply UDC for one bearer at the same time.

In the following of the disclosure, in order to increase the reliability of data or to maintain security against a hacker's attach, embodiments of a method of configuring integrity protection in a data bearer are described below.

Figure 3P:
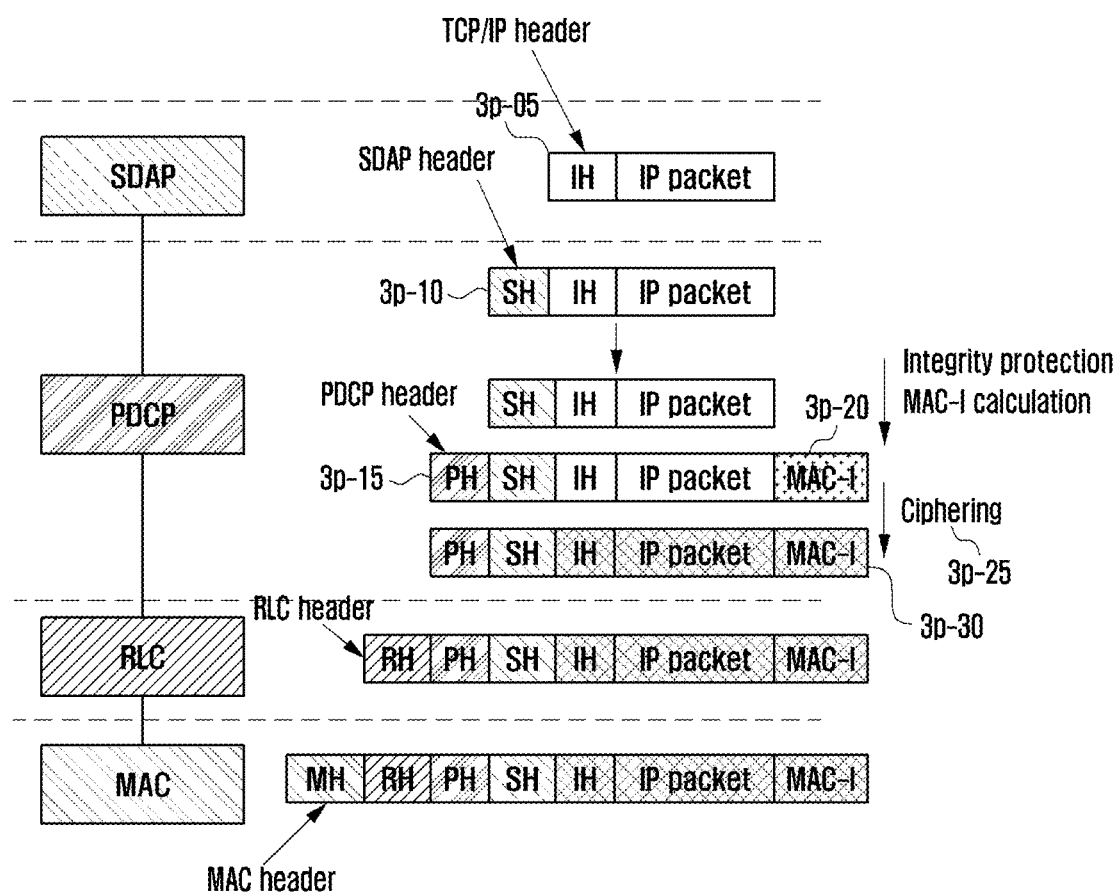
FIG. 3P illustrates a diagram of an embodiment in which integrity protection is configured in a data bearer in an embodiment of the disclosure.

FIG. 3P illustrates a diagram of a method of configuring integrity protection in a data bearer in order to increase the reliability of data or to maintain security against a hacker's attach in the disclosure.

A terminal may configure an integrity protection function for each bearer through an RRC message, such as 3a-10 or 3a-40 or 3a-75 in FIG. 3A, may configure the configuration or non-configuration or activation or deactivation of an integrity protection function for each data bearer (DRB) or control bearer (SRB), and may suspend or resume the integrity protection function for a bearer in which integrity protection has been configured using reconfigwithSync configuration information of an RRCReconfiguration message in the case of handover between base stations or handover within a base station.

FIG. 3P illustrates a procedure of processing data in the protocol of a terminal when integrity protection is configured, activated or resumed for a data bearer (DRB) or a control bearer (SRB).

If an SDAP layer apparatus or an SDAP header (SH) 3p-10 has been configured, when data is received from a higher layer apparatus, the terminal attaches the SDAP header and delivers the data to a PDCP layer apparatus. When the data (e.g., PDCP SDU) is received from a higher layer, the PDCP layer apparatus generates a PDCP header (PH) because the integrity protection has been configured, applies an algorithm to the PDCP header 3p-15, the SDAP header and the data in order to configure the integrity protection, and calculates an MAC-I value 3p-20. The size of the MAC-I value may be a given length, and may be 4 bytes, for example. When the MAC-I value is calculated, the PDCP layer apparatus may attach the MAC-I field to the last of the data received from a higher layer, may apply ciphering 3p-25 to the data and the MAC-I field except the PDCP header and the SDAP header, and may deliver the data to a lower layer so that the data processing of the lower layer is performed.

When the data is received, a reception stage performs deciphering, and performs integrity verification check in order to check whether there is an error in the PDCP header, the SDAP header and the data by performing inverse calculation using the MAC-I field value. If the integrity verification fails and an error occurs, the reception stage may discard the data in order to prevent the data having an error from being delivered to a higher layer, and may function to distinguish between data randomly transmitted by a hacker.

The disclosure proposes an operation of a terminal for each bearer when integrity protection is suspended or the configuration of integrity protection is released or integrity protection is configured again or resumed in response to an instruction from a network if the terminal moves from a current cell to another cell and performs handover within a base station or handover between base stations. The cause of suspending or resuming the integrity protection may include a case where the reliability of service or requirements for QoS are changed due to a change in mapping information of a QoS flow mapped to a bearer, and may include a case where the signal of a target cell on which handover has been performed is good or poor. A processing burden of a terminal can be reduced by changing whether to configure an integrity protection function in such a case.

A terminal may suspend or resume an integrity protection function based on an RRC message, such as 3a-10 or 3a-40 or 3a-75 in FIG. 3A, that is, based on reconfigwithSync configuration information of an RRCReconfiguration message.

In the disclosure, the first embodiment of a terminal is as follows when an integrity protection function is suspended or resumed based on an RRC message, that is, reconfigwithSync configuration information of an RRCReconfiguration message.

If the terminal receives the RRC message and has received an indication that the terminal should suspend or configure an integrity protection function based on reconfigwithSync configuration information, In the above description, if a bearer indicated to suspend its integrity protection function is a control bearer (SRB), the PDCP layer apparatus of the terminal does not calculate an MAC-I value for data received from a higher layer as described above in the disclosure, but may perform padding on an MAC-I field, that is, may inset all values of 0 into the MAC-I field, may continuously attach an MAC-I field having a given length, for example, 4 bytes behind the data, and may cipher and transmit the data. The reason why the PDCP layer apparatus of the terminal continues to attach the MAC-I field although the integrity protection for the control bearer has been suspended is for facilitating the transmission and reception processing of the terminal for the control bearer by unifying the data formats of the PDCP layer apparatus for the control bearer into one. That is, in this case, the PDCP layer apparatus of the terminal can continue to generate data using the same procedure without a format change although integrity protection is resumed.

In the above description, if a bearer indicated to suspend its integrity protection function is a data bearer (DRB), the PDCP layer apparatus of the terminal may not calculate an MAC-I value for data received from a higher layer as described above in the disclosure, may no longer add or attach an MAC-I field behind the data, may process the data by ciphering the data without an MAC-I field, and may transmit the data to a lower layer. The reason why an MAC-I field is not attached when integrity protection for a data bearer is suspended is that overhead for an MAC-I field can be reduced with respect to the data bearer and that a processing burden attributable to the calculation of an MAC-I value and the attachment of an MAC-I field can be reduced because a data bearer has a high data transfer rate unlike a control bearer.

If the terminal receives the RRC message and has received an indication that the terminal should resume or configure an integrity protection function again based on reconfigwithSync configuration information, In the above description, if a bearer indicated to resume its integrity protection function is a control bearer (SRB), the PDCP layer apparatus of the terminal may perform the calculation of an MAC-I value for data received from a higher layer again as described above in the disclosure, may suspend padding for an MAC-I field, may insert the calculated value, may continue to attach an MAC-I field having a given length, for example, 4 bytes behind the data, and may cipher and transit the data.

In the above description, if a bearer indicated to resume its integrity protection function is a data bearer (DRB), the PDCP layer apparatus of the terminal may perform the calculation of an MAC-I value for data received from a higher layer again as described above in the disclosure, may add or attach an MAC-I field behind the data, may perform ciphering and processing on the data, and may transmit the data to a lower layer.

In the disclosure, the second embodiment of a terminal is as follows when an integrity protection function is suspended or resumed based on an RRC message, that is, reconfigwithSync configuration information of an RRCReconfiguration message.

If the terminal receives the RRC message and has received an indication that the terminal should suspend or configure an integrity protection function based on reconfigwithSync configuration information, In the above description, if a bearer indicated to suspend its integrity protection function is a control bearer (SRB), the PDCP layer apparatus of the terminal does not calculate an MAC-I value for data received from a higher layer as described above in the disclosure, but may perform padding on an MAC-I field, that is, may inset all values of 0 into the MAC-I field, may continuously attach an MAC-I field having a given length, for example, 4 bytes behind the data, and may cipher and transmit the data. The reason why the PDCP layer apparatus of the terminal continues to attach the MAC-I field although the integrity protection for the control bearer has been suspended is for facilitating the transmission and reception processing of the terminal for the control bearer by unifying the data formats of the PDCP layer apparatus for the control bearer into one. That is, in this case, the PDCP layer apparatus of the terminal can continue to generate data using the same procedure without a format change although integrity protection is resumed.

In the above description, if a bearer indicated to suspend its integrity protection function is a data bearer (DRB), the PDCP layer apparatus of the terminal does not calculate an MAC-I value for data received from a higher layer as described above in the disclosure, but may perform padding on an MAC-I field, that is, may inset all values of 0 into the MAC-I field, may continuously attach an MAC-I field having a given length, for example, 4 bytes behind the data, and may cipher and transmit the data. The reason why the PDCP layer apparatus of the terminal continues to attach the MAC-I field although the integrity protection for the data bearer has been suspended is for facilitating the transmission and reception processing of the terminal for the data bearer by unifying the data formats of the PDCP layer apparatus for the data bearer into one. That is, in this case, the PDCP layer apparatus of the terminal can continue to generate data using the same procedure without a format change although integrity protection is resumed.

If the terminal receives the RRC message and has received an indication that the terminal should resume or configure an integrity protection function again based on reconfigwithSync configuration information, In the above description, if a bearer indicated to resume its integrity protection function is a control bearer (SRB), the PDCP layer apparatus of the terminal may perform the calculation of an MAC-I value for data received from a higher layer again as described above in the disclosure, may suspend padding for an MAC-I field, may insert the calculated value, may continue to attach an MAC-I field having a given length, for example, 4 bytes behind the data, and may cipher and transit the data.

In the above description, if a bearer indicated to resume its integrity protection function is a data bearer (DRB), the PDCP layer apparatus of the terminal may perform the calculation of an MAC-I value for data received from a higher layer again as described above in the disclosure, may suspend padding for an MAC-I field, may insert the calculated value, may continue to attach an MAC-I field having a given length, for example, 4 bytes behind the data, and may cipher and transit the data.

According to an embodiment of the disclosure, a transmission resource can be efficiently used through a method of reducing overhead of an Ethernet frame in a next-generation mobile communication system using an Ethernet protocol.

According to another embodiment of the disclosure, an operation when an event to suspend the bearer or protocol layer apparatus (e.g., SDAP layer apparatus or PDCP layer apparatus or RLC layer apparatus or MAC layer apparatus or PHY layer apparatus) of a terminal in a next-generation mobile communication system occurs can be improved. Specifically, there is proposed a scheme for a terminal to efficiently process a bearer or protocol layer apparatuses depending on whether the terminal is a terminal (i.e., NB-IoT terminal) supporting services using a narrow bandwidth or a terminal (i.e., common terminal) supporting services using a wide bandwidth, if the terminal needs to switch to an RRC inactive mode in response to an instruction from a network.

In the above description, if the common terminal needs to switch to an RRC inactive mode in response to an instruction from a network, the common terminal first stores terminal context. Furthermore, if the common terminal stores data stored in a bearer or protocol layer apparatus until it is subsequently reconnected, unnecessary retransmission may be caused and it is inefficient for buffer management. Accordingly, a procedure for discarding the data stored in the bearer or protocol layer apparatus needs to be performed, and parameter values applied as a security key need to be reset. Furthermore, when data is received, if the received data is not delivered to a higher layer, the received data may be directly delivered to a higher layer in order to reduce transmission latency. Furthermore, additional data transmission or reception can be suspended by suspending a bearer.

In the above description, however, if the NB-IoT terminal needs to switch to an RRC suspension mode in response to an instruction from a network, the NB-IoT terminal first stores terminal context. However, the NB-IoT terminal (e.g., sensor) does not require a procedure for efficiently managing a buffer unlike the common terminal because the NB-loT terminal uses a narrow bandwidth and does not transmit and receive a lot of data. Furthermore, even a reception stage does not require a procedure for reducing transmission latency because the NB-IoT terminal is not sensitive to transmission latency.

According to another embodiment of the disclosure, there are proposed a procedure for a terminal to compress data when transmitting the data in uplink and for a base station to decompress the data in a wireless communication system, detailed header formats, and a support method for a data transmission and reception procedure in which a transmission stage compresses and transmits data and a reception stage decompresses the data, such as a solution upon decompression failure. Furthermore, the support method may also be applied to a procedure for a base station to compress and transmit downlink data when transmitting the downlink data to a terminal and for the terminal to receive and decompress the compressed downlink data. As described above, the disclosure has effects in that a transmission stage can transmit more data and improve coverage by compressing and transmitting data.

Furthermore, in the disclosure, if an uplink data compression procedure has been configured, if a transmission PDCP layer apparatus discards data that has not yet been transmitted due to the expiration of a PDCP discard timer and on which UDC has been performed, the transmission PDCP layer apparatus may transmit data corresponding to a next PDCP serial number of the discarded data, may discard all the remaining data (i.e., data that has a PDCP serial number greater than a next PDCP serial number of the discarded data, to which user data compression has been applied, and that has been stored without being transmitted), and may transmit, to a lower layer apparatus, an indicator to discard data already delivered to a lower layer apparatus if the data has already been delivered. Data transmission may be suspended until a PDCP control PDU, indicating that a checksum failure has occurred with respect to the transmission PDCP layer apparatus, is received. The reason for this is that it is evident that user data compression has been previously performed because middle or some data of the UDC-compressed data has been discarded and that a checksum failure may occur in data (e.g., PDCP PDU) having a higher PDCP serial number than the discarded data in a reception PDCP layer apparatus. Accordingly, if the transmission PDCP layer apparatus transmits data corresponding to a next PDCP serial number of the discarded data, the reception PDCP layer apparatus can identify a checksum failure and expect that a PDCP control PDU will be transmitted.

Accordingly, when a PDCP control PDU indicating that a checksum failure has occurred is received or before the PDCP control PDU is received, the transmission PDCP layer apparatus resets a transmission buffer for user data compression (in this case, the transmission UDC buffer is not reset if it has already been reset). The transmission PDCP layer apparatus may perform a user data compression (UDC) procedure again from data whose PDCP discard timer has not yet expired and that has not yet been transmitted or from data whose PDCP discard timer has not yet expired and that has been finally transmitted (i.e., data transmitted because it corresponds to a next PDCP serial number of the discarded data), may assign a new PDCP serial number or the first PDCP serial number on data that has not yet been transmitted in ascending order, and may prepare data (e.g., PDCP PDU) by ciphering and generating the data. The transmission PDCP layer apparatus may resume the transmission of the newly generated and prepared data after receiving a PDCP control PDU, indicating that a checksum failure has occurred in the newly generated and prepared data. That is, the transmission PDCP layer apparatus may deliver the data to a lower layer apparatus.

Accordingly, if a user data compression procedure has been configured, if some of data that has been previously generated by a PDCP discard timer and to which user data compression has been applied is discarded, a checksum failure that may occur in data having a greater PDCP serial number than the discarded data can be reduced. Furthermore, a loss of data can be prevented because data is generated from data that has not yet been transmitted or from data that has been finally transmitted (i.e., data transmitted because it corresponds to a next PDCP serial number of the discarded data).

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
suspending an acknowledged mode (AM) data radio bearer (DRB) and a packet data convergence protocol (PDCP) entity based on a suspend configuration for a radio resource control (RRC) inactive state;
transmitting, to a base station, a first control message for requesting a resumption of a suspended RRC connection;
receiving, from the base station, a second control message for resuming the suspended RRC connection, the second control message requesting a re-establishment of the PDCP entity;
identifying, for the suspended AM DRB based on the second control message, a first PDCP service data unit (SDU) among at least one PDCP SDU associated with a PDCP sequence number (SN), wherein a successful delivery of a corresponding PDCP protocol data unit (PDU) has not been confirmed by a lower layer for the first PDCP SDU;
considering the at least one PDCP SDU associated with the PDCP SN as received from a higher layer;
associating, from the first PDCP SDU, a count value corresponding to a state variable which was set to an initial value based on the suspend configuration to the at least one PDCP SDU; and
transmitting, to the base station, the at least one PDCP SDU starting from the first PDCP SDU in ascending order of the associated count value.

2. The method of claim 1, wherein the PDCP entity is suspended by setting the state variable to the initial value based on the suspend configuration.

3. The method of claim 1, wherein the at least one PDCP SDU is transmitted without restarting a discard timer for the at least one PDCP SDU.

4. The method of claim 1, wherein the first PDCP SDU is a PDCP SDU with a lowest count value or a lowest PDCP SN.

5. The method of claim 1, wherein the suspend configuration is configured based on a control message for releasing an RRC connection.

6. A method performed by a base station in a wireless communication system, the method comprising:
receiving, from a terminal being in a radio resource control (RRC) inactive state with suspending an acknowledged mode (AM) data radio bearer (DRB) and a packet data convergence protocol (PDCP) entity based on a suspend configuration, a first control message for requesting a resumption of a suspended RRC connection;

transmitting, to the terminal, a second control message for resuming the suspended RRC connection and requesting a re-establishment of the PDCP entity, wherein the second control message is for identifying a first PDCP service data unit (SDU) among at least one PDCP SDU associated with a PDCP sequence number (SN) for the suspended AM DRB, wherein a successful delivery of a corresponding PDCP protocol data unit (PDU) has not been confirmed by a lower layer for the first PDCP SDU; and receiving, from the terminal, the at least one PDCP SDU,
wherein the at least one PDCP SDU associated with the PDCP SN is considered as received from a higher layer and a count value corresponding to a state variable which was set to an initial value based on the suspend configuration is associated to the at least one PDCP SDU from the first PDCP SDU, and
wherein the at least one PDCP SDU is received starting from the first PDCP SDU in ascending order of the associated count value.

7. The method of claim 6, wherein the PDCP entity is suspended by setting the state variable to the initial value based on the suspend configuration.

8. The method of claim 6, wherein the at least one PDCP SDU is received without restarting a discard timer for the at least one PDCP SDU.

9. The method of claim 6, wherein the first PDCP SDU is a PDCP SDU with a lowest count value or a lowest PDCP SN.

10. The method of claim 6, wherein the suspend configuration is configured based on a control message for releasing an RRC connection.

11. A terminal in a wireless communication system, the terminal comprising:
a transceiver configured to transmit or receive a signal; and
a controller coupled with the transceiver and configured to:
suspend an acknowledged mode (AM) data radio bearer (DRB) and a packet data convergence protocol (PDCP) entity based on a suspend configuration for a radio resource control (RRC) inactive state,
transmit, to a base station, a first control message for requesting a resumption of a suspended RRC connection,
receive, from the base station, a second control message for resuming the suspended RRC connection, the second control message requesting a re-establishment of the PDCP entity,
identify, for the suspended AM DRB based on the second control message, a first PDCP service data unit (SDU) among at least one PDCP SDU associated with a PDCP sequence number (SN), wherein a successful delivery of a corresponding PDCP protocol data unit (PDU) has not been confirmed by a lower layer for the first PDCP SDU,
consider the at least one PDCP SDU associated with the PDCP SN as received from a higher layer, associate, from the first PDCP SDU, a count value corresponding to a state variable which was set to an initial value based on the suspend configuration to the at least one PDCP SDU, and
transmit, to the base station, the at least one PDCP SDU starting from the first PDCP SDU in ascending order of the associated count value.

12. The terminal of claim 11, wherein the PDCP entity is suspended by setting the state variable to the initial value based on the first information.

13. The terminal of claim 11, wherein the at least one PDCP SDU is transmitted without restarting a discard timer for the at least one PDCP SDU.

14. The terminal of claim 11, wherein the first PDCP SDU is a PDCP SDU with a lowest count value or a lowest PDCP SN.

15. The terminal of claim 11, wherein the suspend configuration is configured based on a control message for releasing an RRC connection.

16. A base station in a wireless communication system, the base station comprising:
a transceiver configured to transmit or receive a signal; and
a controller coupled with the transceiver and configured to:
receive, from a terminal being in a radio resource control (RRC) inactive state with suspending an acknowledged mode (AM) data radio bearer (DRB) and a packet data convergence protocol (PDCP) entity based on a suspend configuration, a first control message for requesting a resumption of a suspended RRC connection,
transmit, to the terminal, a second control message for resuming the suspended RRC connection and requesting a re-establishment of the PDCP entity, wherein the second control message is for identifying a first PDCP service data unit (SDU) among at least one PDCP SDU associated with a PDCP sequence number (SN) for the suspended AM DRB, wherein a successful delivery of a corresponding PDCP protocol data unit (PDU) has not been confirmed by a lower layer for the first PDCP SDU, and
receive, from the terminal, the at least one PDCP SDU,
wherein the at least one PDCP SDU associated with the PDCP SN is considered as received from a higher layer and a count value corresponding to a state variable which was set to an initial value based on the suspend configuration is associated to the at least one PDCP SDU from the first PDCP SDU, and
wherein the at least one PDCP SDU is received starting from the first PDCP SDU in ascending order of the associated count value.

17. The base station of claim 16, wherein the PDCP entity is suspended by setting the state variable to the initial value based on the suspend configuration.

18. The base station of claim 16, wherein the at least one PDCP SDU is received without restarting a discard timer for the at least one PDCP SDU.

19. The base station of claim 16, wherein the first PDCP SDU is a PDCP SDU with a lowest count value or a lowest PDCP SN.

20. The base station of claim 16, wherein the suspend configuration is configured based on a control message for releasing an RRC connection.

* * * * *